(12) United States Patent
Angeletti et al.

(10) Patent No.: US 10,431,900 B2
(45) Date of Patent: Oct. 1, 2019

(54) ARRAY ANTENNA WITH OPTIMIZED ELEMENTS POSITIONS AND DIMENSIONS

(71) Applicant: Agence Spatiale Europeenne, Paris (FR)

(72) Inventors: Piero Angeletti, Lisse (NL); Giovanni Toso, Haarlem (NL); Gianfranco Ruggerini, Rome (IT)

(73) Assignee: Agence Spatiale Europeenne, Paris (FR)

( * ) Notice: Subject to any disclaimer, the term of this patent is extended or adjusted under 35 U.S.C. 154(b) by 1040 days.

(21) Appl. No.: 14/761,162

(22) PCT Filed: Aug. 28, 2013

(86) PCT No.: PCT/IB2013/058050
§ 371 (c)(1),
(2) Date: Jul. 15, 2015

(87) PCT Pub. No.: WO2014/114993
PCT Pub. Date: Jul. 31, 2014

(65) Prior Publication Data
US 2015/0333412 A1    Nov. 19, 2015

(30) Foreign Application Priority Data
Jan. 24, 2013 (WO) .................. PCT/IB2013/000675

(51) Int. Cl.
*H01Q 21/00* (2006.01)
*G06F 17/14* (2006.01)
(Continued)

(52) U.S. Cl.
CPC ..... *H01Q 21/0087* (2013.01); *G05B 19/4097* (2013.01); *G06F 17/14* (2013.01); *H01Q 21/20* (2013.01); *H01Q 21/22* (2013.01)

(58) Field of Classification Search
CPC .... H01Q 21/0087; H01Q 21/20; H01Q 21/22; G05B 19/4097; G06F 17/14
(Continued)

(56) References Cited

U.S. PATENT DOCUMENTS

| 4,797,682 A * | 1/1989 | Klimczak ............. H01Q 21/22 343/770 |
| 6,404,404 B1 * | 6/2002 | Chen ................... H01Q 21/0025 343/844 |

(Continued)

FOREIGN PATENT DOCUMENTS

| EP | 2 090 995 A1 | 8/2009 |
| WO | WO 2012/140471 A1 | 10/2012 |

OTHER PUBLICATIONS

International Search Report and Written Opinion for Application No. PCT/IB2013/058050 dated Jan. 29, 2014.
(Continued)

*Primary Examiner* — Rehana Perveen
*Assistant Examiner* — Justin C Mikowski
(74) *Attorney, Agent, or Firm* — Alston & Bird LLP

(57) ABSTRACT

A method of manufacturing an array antenna comprising: a design phase wherein an array layout of said array antenna is synthesized and radiating elements are designed to be arranged according to said array layout; and a phase of physically making said array antenna wherein the radiating elements are arranged according to said array layout. The design phase comprises the steps of: defining a continuous reference aperture; subdividing said continuous reference aperture into a plurality of elementary cells with assigned power levels; determining, within each said elementary cell, a position for at least one maximum efficiency radiating element; determining a size and an aperture field amplitude of each said maximum efficiency radiating element, such that a variation of a cumulative field distribution of the resulting array antenna aperture over each said elementary cell is substantially equal to a variation of a cumulative field distribution of said reference aperture over the same elementary cell, subject to size constraints.

26 Claims, 45 Drawing Sheets

(51) Int. Cl.
  *H01Q 21/20*    (2006.01)
  *H01Q 21/22*    (2006.01)
  *G05B 19/4097*  (2006.01)

(58) Field of Classification Search
  USPC .......................................................... 703/13
  See application file for complete search history.

(56) References Cited

U.S. PATENT DOCUMENTS

| | | | | |
|---|---|---|---|---|
| 2007/0273599 | A1* | 11/2007 | Haziza | H01Q 3/22 343/772 |
| 2008/0048922 | A1* | 2/2008 | Haziza | H01Q 13/00 343/772 |
| 2008/0117114 | A1* | 5/2008 | Haziza | H01Q 13/00 343/786 |
| 2009/0211079 | A1* | 8/2009 | Toso | H01P 11/00 29/600 |
| 2014/0104107 | A1* | 4/2014 | Mangenot | H01Q 3/26 342/371 |

OTHER PUBLICATIONS

Bucci, O. M. et al., *A Generalized Hybrid Approach for the Synthesis of Uniform Amplitude Pencil Beam Ring-Arrays*, IEEE Transactions on Antennas and Propagation, vol. 60, No. 1. (Jan. 2012) pp. 174-183.

Bucci, O. M. et al., *Density and Element-Size Tapering for the Design of Arrays With a Reduced Number of Control Points and High Efficiency*, Antennas and Propagation (EUCAP), 2010 Proceedings of the Fourth European Conference (Apr. 12, 2010) 4 pages.

\* cited by examiner

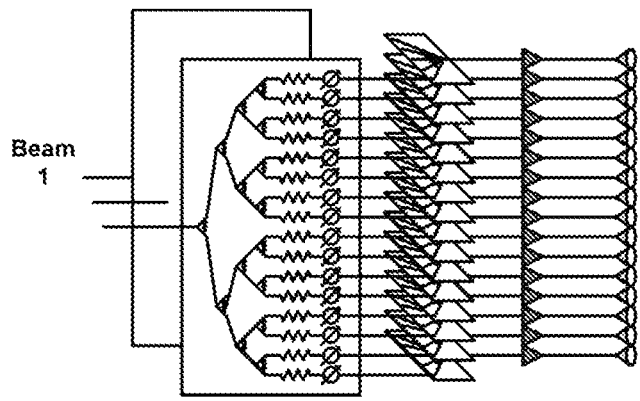 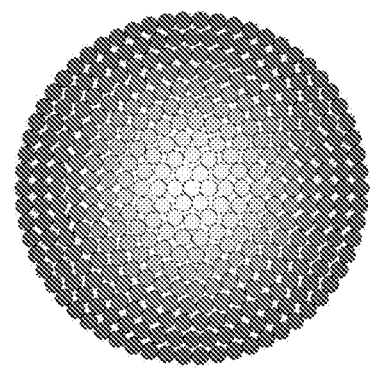
FIG.1A  FIG.1B
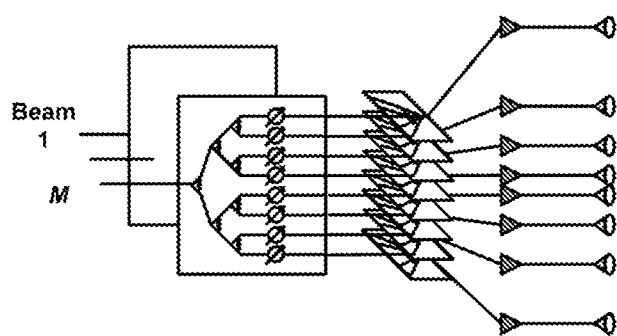 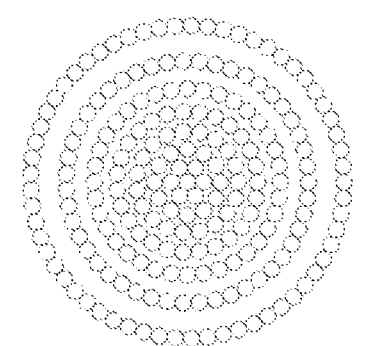
FIG.1C  FIG.1D

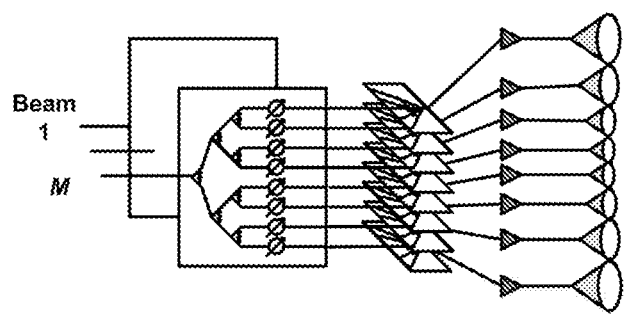
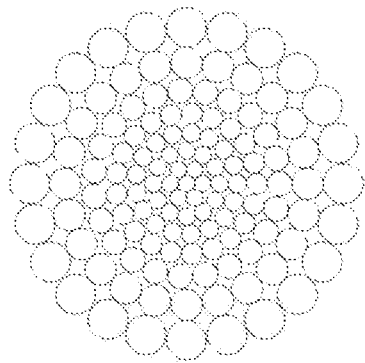
FIG.2A    FIG.2B
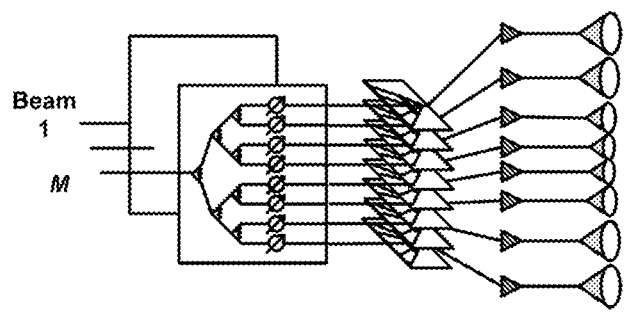
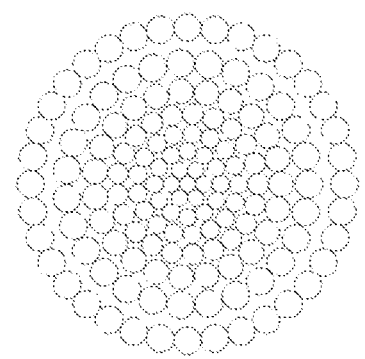
FIG.2C    FIG.2D

| | Reference Continuous Distribution | Tapered Ring Array with Identical ME Elements (2 λ) | Circular Ring Array with identical ME Elements (2 λ) | Annular Ring Array with ME Elements (unconstrained size) | Annular Ring Array with ME Elements (constrained size) (3.4 λ) | Design Method |
|---|---|---|---|---|---|---|
| | -0.41 dB | [314 REs] -1.52 dB (-0.41 dB tapering; -1.11 dB aperture) | [209 REs] -3.85 dB | [137 REs] -1.71 dB | [151 REs] -2.13 dB | Cumulative Centre |
| | | | | [128 REs] -1.55 dB | [143 REs] -1.99 dB | Annulus Centre |
| | | -4.6 dB Unused RF Power | | | | |

FIG. 27

ARRAY ANTENNA WITH OPTIMIZED ELEMENTS POSITIONS AND DIMENSIONS

INTRODUCTION

Array antennas can provide significant advantages in flexibility and versatility with respect to more conventional antennas e.g.: the array pattern may be completely reconfigured changing the complex feeding excitations (in amplitude and phase), the array excitation may be closely controlled to generate low sidelobe patterns; etc.

In order to keep under control the cost and the complexity of large direct radiating arrays, it is crucial to reduce the number of active elements and to simplify the beamforming network.

Aperiodic arrays with equiamplitude elements represent an interesting solution especially when the array has to generate pencil beams with a limited scanning range. In aperiodic arrays, the variable spacing between the elements can be used as an additional degree of freedom [2]-[22]. A "virtual tapering" is realized playing on the elements' positions rather than on their excitation amplitudes, i.e. by using a "density tapering" of the array elements.

Using uniform (amplitude) excitation is very advantageous in active array antennas, especially in transmit because it allows operating the power amplifiers feeding the array elements at their point of maximum efficiency. Moreover, using uniform excitation drastically simplifies the beam-forming network and reduces the corresponding losses.

Despite the several advantages offered by equi-amplitude fed (isophoric) aperiodic arrays with identical radiating elements, a major disadvantage consists in the fact that the "density tapering" equivalent to a an "amplitude tapering" of a continuous aperture with low sidelobes leads to large inter-element spacing with poor filling of the aperture and associated illumination efficiency.

To overcome this problem, design solutions have been developed (in the framework of an activity funded by the European Space Agency) that allows the presence of two (or more) radiating elements with different size (also called "size tapering") in such a way to guarantee a better filling of the aperture.

The difficulty of the optimization problem justifies why several authors have been resorting to stochastic approaches and state-of-the-art design techniques [24][25][26] can only rely on stochastic global optimizers based on Genetic Algorithms.

An object of the present invention is to provide a simple, yet effective, method for designing and manufacturing array antennas by exploiting all the available degrees of freedom of the array (i.e. element positions, element dimensions, and number of elements).

In particular, the invention allows using the element positions together with the element dimensions permitting to drastically reduce the costs and the complexity of the array antenna while maximizing the aperture filling factor and the associated aperture efficiency and directivity. Furthermore the design method of the invention is fully deterministic and analytical.

The resulting antenna architecture is considered extremely promising for the design of arrays generating a multibeam coverage on the Earth from a geostationary satellite.

The present invention regards the architecture and the design methodology of an innovative active array.

The novelty of the architecture relates to the optimal joint use of elements' positions and elements' dimensions in conjunction to identical Power Amplifiers and a method to optimize it in such a way that the resulting active array satisfies the required radiative performances while guarantying the optimal efficiency of the Power Amplifiers.

The proposed architecture realizes all the benefit of aperiodic array configurations superseding limitations of existing designs and drastically improving efficiency performances.

The invention applies in particular to the fields of satellite communications, remote sensing and global navigation systems.

The invention describes the design of the radiating part of an array, nevertheless it applicable to all known active or passive antenna architectures comprising an array as a sub-system of the antenna system (such as discrete lens antennas, array fed reflectors, array fed dielectric lens antennas etc.).

The invention will be described considering the case of a transmit antenna, however it can also apply to the case of a receive antenna.

It is known in the art that the transmit and receive pattern of a radiating structure are proportional to each other. Therefore, according to the invention, an array antenna to be used in reception can by designed starting from its equivalent transmit pattern. What changes is the beam-forming network, where high-power amplifiers used in transmission are replaced by receive amplifiers. The "power levels" determined when synthesizing a transmit antenna correspond to the power amplification levels when the antenna is used in reception.

PRIOR ART

Several methods have been introduced to design linear and planar arrays.

A large number of design techniques known from the prior art usually consider periodic array antennas constituted by equispaced antenna elements. The mathematical properties associated to the periodicity simplifies the analysis and synthesis of such antennas. A non-exhaustive list of the most famous synthesis techniques includes: the Fourier Transform method, the Schelkunoff method, the Woodward-Lawson synthesis, the Taylor method, the Dolph-Chebyshev synthesis, the Villeneuve synthesis, etc. For a good overview of these methods the textbook [1] and all the related bibliography may be consulted. According to these techniques, an overall number of array element and a fixed inter-element spacing are determined, and then the most appropriate excitations, in amplitude and/or in phase, in order to guarantee the required performances are identified.

Unequally spaced arrays have interesting characteristics and offer several advantages with respect to periodic arrays. Since the pioneering work of Unz [2], who first introduced aperiodic arrays in '50, several techniques have been presented in the literature to design sparse array antennas [3]-[26].

In the majority of the proposed synthesis techniques, the radiation pattern of a continuous aperture (or of periodic array) with a non-uniform excitation is approximately reproduced by an aperiodic array with uniform excitation and identical radiating elements. These sparse array configurations with identical elements suffer from high aperture efficiency and directivity limitations due to the reduced aperture filling factor.

Several different configurations have been considered in prior art; for sake of completeness, and in order to benchmark the proposed solution with respect to prior-art, a short summary of their pros and cons follows.

A—Array with Continuous Amplitude Tapering (FIG. 1A-FIG. 1B)

In this configuration, shown in FIG. 1A, each Radiating Element (RE) is fed by a High Power Amplifier (HPA). Beam signals are distributed with appropriate amplitude and phase to each HPA.

The array synthesis can be performed sampling a desired continuous illumination function at the positions of the discrete array elements which are defined on a periodic lattices (e.g. triangular or square lattices) or on contiguous circular rings (FIG. 1B). The element excitation is proportional to illumination function and the amplifiers work at very different power levels (different gray scale in FIG. 1B). The configuration shows very poor power efficiency; radiation performances are very good.

B—Aperiodic Array with Identical Radiating Elements (FIG. 1C-FIG. 1D)

In this configuration, (exemplified in FIG. 1C), each radiating element is fed by a High Power Amplifier (HPA). Beam signals are distributed with appropriate phase to each HPA. All the amplifiers work at the same operating point on a power pooling base.

In the array synthesis techniques, the radiation pattern of a continuous aperture is approximately reproduced by an aperiodic array with uniform excitation and identical radiating elements (e.g. FIG. 1D).

The configuration offers good power efficiency but aperture efficiency is limited.

Analysis of Required Improvements and Objective of the Invention

A fundamental goal (inventive step) that has been taken into consideration in the development of the innovative architecture disclosed in the present document, and indicated as configuration C, is the:
  improvement in aperture efficiency
of the sought solution, while obtaining prior-art objectives:
  maximum DC-to-RF power efficiency of High Power Amplifiers (all working at the same operating point),
  reduced number of Radiating Elements (REs),
  reduced number of High Power Amplifiers (HPAs),
  reduced complexity of the Beamforming Network (BFN),
  desired radiative performances in terms of Side-Lobe Level (SSL).

In a second architecture, indicated as configuration D, the fundamental goal (inventive step) in improving the aperture efficiency is obtained while achieving prior-art objectives indicated above additionally to the objective of:
  desired radiative performance under beam scanning within a Region of Interest (ROI).

An exemplificative block diagram of the embodiment of configuration C is shown in FIG. 2A and FIG. 2B.

In the array layout shown in FIG. 2B, the element positions are used together with the element dimensions permitting to maximize the aperture filling factor and the associated aperture efficiency and directivity.

An exemplificative block diagram of the embodiment of configuration D is shown in FIG. 2C and FIG. 2D.

In the array layout shown in FIG. 2D, the element positions are used together with the element dimensions with an additional constraint on the maximum element dimensions accordingly to the beam scanning requirements.

The aperture filling factor and the associated aperture efficiency and directivity are optimized compatibly with the scanning requirement constraints.

The obtained improvements can be quantified in the following key figure of merit:
  20-40% reduction in number of Radiating Elements (REs)/Power Amplifiers (PAs),
  1.5-2 dB improvement in directivity and aperture efficiency,
with respect to state-of-the-art solutions based on sparse arrays.

A limited number of configurations has been already proposed in prior-art that make use of two [24][25][26] or three [23] different types of radiating elements placed on concentric rings but the elaborated design procedures are limited in using stochastic global optimizers (e.g. based on Genetic Algorithms) or heuristic design rules (e.g. in [23] the claimed rule is to have a sequence of at least three concentric rings of elements with the size of the elements of the second ring larger than the elements of the first and third ring). Both the approaches provide unsatisfactory results in terms of aperture efficiency and directivity loss and total number of elements to be used to populate the array aperture.

DESCRIPTION OF THE INVENTION

The first step of the method of the invention is to define the desired radiative properties of the array to be designed. This is the same as in the prior art. Usually a specified Gain (G), a beamwidth (BW) and a peak sidelobe level (SLL) are indicated.

Then, an aperture field distribution ("reference aperture") able to guarantee these radiative characteristics is identified. The reference pattern, which represents the target of the performances of the aperiodic array, may be obtained with a number of standard techniques to design continuous apertures. As an example, Taylor amplitude distribution laws for linear [27] and circular [28] apertures can be considered.

According to the prior art, discrete sampling of the continuous aperture distribution may be directly used to realize a periodic array antenna with continuous amplitude tapering (Configuration A). Nevertheless, the direct implementation of the discrete field distribution with a specific dynamic range of the amplitude may be difficult, expensive and inefficient in terms of DC-to-RF power conversion at HPA level. In facts, especially when the requirements in terms of SLL are very stringent, the feeding distribution of the antenna aperture presents a high variability as a function of the position.

One of the strongest motivations to introduce aperiodic arrays with equi-amplitude excited elements consists in the necessity to reduce complexity and cost of an array antenna including its beamforming network and amplification section.

An effective solution to the problem of approximating a desired radiation pattern of a reference linear continuous taper function with an aperiodic linear array of uniformly excited omnidirectional radiating elements has been first proposed by Doyle [6] (as reported in [7]). Doyle approach consists in a weighted least-mean-square approximation of the desired radiation pattern with the array factor of the aperiodic array.

The original Doyle's design method was first extended to different weighted least-mean-square criteria and array geometries by Toso and Angeletti in [15] and recently refined, improved and applied to circular arrays in a number of works [18]-[26].

Linear Approximation Problem (Prior-Art)

The first problem that we consider is that of approximating a desired radiation pattern $F_0(u)$, generated by a linear source of continuous amplitude field $i_0(x)$, with the radiation pattern $F_a(u)$ of a discrete aperiodic array with amplitude field $i_a(x)$.

In the far-field approximation, the radiation pattern of a linear continuous aperture is given by the Fourier transform of the aperture field:

$$F(u) = F(i(x)) = \int_{-\infty}^{\infty} i(x) e^{jk_0 ux} dx \quad (1)$$

with $$k_0 = \frac{2\pi}{\lambda}, u = \sin(\vartheta) \quad (2)$$

the angle $\vartheta$, representing the observation direction, is measured with respect to the direction perpendicular to the antenna aperture.

A particularly effective solution consists in exploiting a Weighted Mean Square Error (W-MSE) minimization of the difference between the reference pattern and the unknown one. The following equality, first observed by Doyle, can be demonstrated to hold true:

$$\int_{-\infty}^{\infty} \frac{1}{u^2} |F_0(u) - F_a(u)|^2 du = c \int_{-\infty}^{\infty} |I_0(x) - I_a(x)|^2 dx \quad (3)$$

where, the cumulative function $I(x)$ of the aperture field distribution $i(x)$ is introduced, $$I(x) = \int_{-\infty}^{x} i(\xi) d\xi \quad (4)$$

and it is assumed that the amplitude fields $i_0(x)$ and $i_a(x)$ are both normalised such that, $$\int_{-\infty}^{\infty} i(\xi) d\xi = I(\infty) = 1 \quad (5)$$

To derive expression (3) we can follow Doyle reasoning evaluating the difference of the far-field radiation patterns:

$$F_0(u) - F_a(u) = F(i_0(x) - i_a(x)) = = \int_{-\infty}^{\infty} (i_0(x) - i_a(x)) e^{jk_0 ux} dx \quad (6)$$

Integrating by parts, $$\int_{-\infty}^{\infty} (i_0(x) - i_a(x)) e^{jk_0 ux} dx = = \left( \int (i_0(x) - i_a(x)) dx \right) \quad (7)$$

$$e^{jk_0 ux} \Big|_{-\infty}^{\infty} - \int_{-\infty}^{\infty} \left( \int (i_0(x) - i_a(x)) dx \right) \left( \frac{d}{dx} e^{jk_0 ux} \right) dx =$$

$$(I_0(x) - I_a(x)) e^{jk_0 ux} \Big|_{-\infty}^{\infty} - jk_0 u \int_{-\infty}^{\infty} (I_0(x) - I_a(x)) e^{jk_0 ux} dx$$

Being $e^{jk_0 ux}$ bounded and provided that $(I_0(x) - I_a(x))$ vanishes as $x \to -\infty$ and $x \to \infty$, the first term nullifies and we have:

$$F(I_0(x) - I_a(x)) = -\frac{F_0(u) - F_a(u)}{jk_0 u} \quad (8)$$

To obtain Doyle equation (3) we now need to apply the Parseval-Plancherel theorem, $$\int_{-\infty}^{\infty} |F(i(x))|^2 du = \frac{2\pi}{k_0} \int_{-\infty}^{\infty} |i(x)|^2 dx \quad (9)$$

which is derived below for sake of completeness and correctness of the multiplying constants.

$$\int_{-\infty}^{\infty} |F(u)|^2 du = \int_{-\infty}^{\infty} F(i(x)) F*(i(x)) du = \quad (10)$$

$$= \int_{-\infty}^{\infty} \int_{-\infty}^{\infty} i(y) e^{jk_0 uy} dy \int_{-\infty}^{\infty} i*(x) e^{-jk_0 ux} dx du =$$

$$= \int_{-\infty}^{\infty} i*(x) \int_{-\infty}^{\infty} i(y) \left( \int_{-\infty}^{\infty} e^{jk_0 u(y-x)} du \right) dy dx =$$

$$= \int_{-\infty}^{\infty} i*(x) \int_{-\infty}^{\infty} i(y) \frac{2\pi}{k_0} \delta(y - x) dy dx =$$

$$= \frac{2\pi}{k_0} \int_{-\infty}^{\infty} i*(x) i(x) dx =$$

$$= \frac{2\pi}{k_0} \int_{-\infty}^{\infty} |i(x)|^2 dx$$

Central to this derivation is the representation of the Dirac delta function by means of a complete set of orthogonal functions [Arfken and Weber pp. 88-89] which leads to the closure equation for the continuous spectrum of plane waves [Arfken and Weber pp. 90]:

$$\int_{-\infty}^{\infty} e^{j2\pi u(y-x)} du = \delta(y - x) \quad (11)$$

By applying the Parseval-Plancherel theorem (9) to expression (8) we obtain Doyle equality:

$$\int_{-\infty}^{\infty} \frac{1}{(k_0 u)^2} |F_0(u) - F_a(u)|^2 du = \frac{2\pi}{k_0} \int_{-\infty}^{\infty} |I_0(x) - I_a(x)|^2 dx \quad (12)$$

The left term in Equation (12) represents a weighted mean square error (W-MSE) of the patterns with an inverse quadratic weighting function. The right term is a mean square error (MSE) of the cumulative functions of the field distributions.

The synthesis problem is so made equivalent to the identification of an array cumulative function $I_a(x)$ optimally fitting the reference cumulative function $I_0(x)$.

Synthesis of a Linear Array of Omnidirectional Elements (Prior-Art)

A solution to the problem of synthesizing a linear array of omnidirectional radiating elements with assigned number of elements N and amplitude excitations $\{a_k; k=1 \div N\}$ was discussed in Angeletti and Toso [19]. The referenced work extends Doyle approach [6]-[7] which is valid for uniform excitations $$\left(\text{i.e. } a_k = \frac{1}{N}\right).$$

We recall that for an array of omnidirectional radiating elements with amplitude excitations $\{a_k; k=1 \div N\}$ and phase centres $\{x_k; k=1 \div N\}$ we have:

$$i_a(x) = \sum_{k=1}^{N} a_k \, \delta(x - x_k) \tag{13}$$

$$F_a(u) = \sum_{k=1}^{N} a_k e^{jk_0 x_n u} \tag{14}$$

The method proposed in Angeletti and Toso [19] is based on the observation that the k-th element of the array, positioned in $x_k$, defines an elementary cell $(t_{k-1}, t_k)$, with $x_k \in (t_{k-1}, t_k)$, such that, $$I_a(t_{k-1}) \sum_{n=1}^{k-1} a_n = I_0(t_{k-1}) \tag{15}$$

$$I_a(t_k) = \sum_{n=1}^{k} a_n = I_0(t_k) \tag{16}$$

or equivalently, $$I_a(t_k) - I_a(t_{k-1}) = a_k = I_0(t_k) - I_0(t_{k-1}) \tag{17}$$

Equations (15) and (16) provide a direct mean to derive the boundaries of the elementary cells by inversion of the reference cumulative curve $I_0(x)$:

$$\left\{t_k : I_0(t_k) = \sum_{n=1}^{k} a_n; k = 1 \div N\right\} \tag{18}$$

The element position can be then determined inverting the following equation [6][7][18]

$$I_0(x_k) = \frac{I_0(t_k) + I_0(t_{k-1})}{2} \tag{19}$$

An alternative element position determination, based on the centroid of the field distribution function for each elementary cell, is discussed in [18] and provides similar performances.

A General Interpretation of the Known Results

The solution of the linear array synthesis with omnidirectional radiating elements, often analysed from an integral point of view, offer also a differential interpretation that will allow a broader generalization.

Under the assumption of a high number of elements, the dimensions of the elementary cells $\Delta t_k = t_k - t_{k-1}$ will reduce to the limit that $\Delta t_k \to 0$ for $N \to \infty$. Equation (17) can be reinterpreted as, $$I_0(t_k) - I_0(t_{k-1}) = \int_{t_{k-1}}^{t_k} i_0(\xi) d\xi \simeq i_0(x_k) \Delta t_k = a_k = I_a(t_k) - I_a(t_{k-1}) \tag{20}$$

This linear differential form can be considered as a particular form of the general expression, $$e(x_k) \Delta t_k = a_k \tag{21}$$

and the boundaries $t_k$ of the elementary cells can be determined by inversion of the primitive function $E(x)$ of $e(x)$:

$$E(x) = \int e(x) dx \tag{22}$$

$$\left\{t_k : E(t_k) = \sum_{n=1}^{k} a_n; k = 1 \div N\right\} \tag{23}$$

where it is assumed the normalization $$E(\infty) = \sum_{n=1}^{N} a_n \tag{24}$$

It is worth noting that the primitive function $E(x)$ acts like a "grading function", i.e. the ordinate values $$A_k = \sum_{n=1}^{k} a_n$$

determines by inversion the searched abscissa values $t_k$. Similarly, the values $A_k$ (or equivalently the steps $a_k$) act like a "grading scale" that determine the ordinate values to be inverted by means of $E(x)$ In the following we will exploit this generalized differential form of the cumulative approximation condition to solve the problem of synthesizing element positions and element dimensions of aperiodic arrays with maximum efficiency radiating elements.

It will be understood that maximum efficiency condition refers to the almost constancy, on the radiating element aperture, of the electromagnetic field generated exciting the radiating element itself.

Synthesis of a Linear Aperiodic Array with Maximum Efficiency Radiating Elements (Invention)

We now introduce the synthesis of a linear aperiodic array with linear radiating elements of maximum efficiency.

Assuming an assigned number of elements N, and assigned power excitations $\{p_k; k=1 \div N\}$ we want to determine the element positions, $x_k$, and element aperture $\Delta x_k$ such that a desired radiation pattern $F_0(u)$, generated by a linear source of continuous amplitude field $i_0(x)$, is approximated with the radiation pattern $F_a(u)$ of a discrete aperiodic array with amplitude field $i_s(x)$ $$i_a(x) = \sum_{k=1}^{N} b_k i_k(x - x_k) \tag{25}$$

where, $i_k(x)$ is the aperture field the of the k-th radiating element referred to its phase center, $x_k$. The element radiation pattern referred to the element phase center, $x_k$, will be indicated as $g_k(u)$, $$g_k(u) = \int_{-\frac{\Delta x_k}{2}}^{\frac{\Delta x_k}{2}} i_k(x) e^{jk_0 ux} \, dx \quad (26)$$

and the following equation provides the array radiation pattern:

$$F_a(u) = \sum_{k=1}^{N} b_k g_k(u) e^{jk_0 x_n u} \quad (27)$$

For the linear elements with maximum efficiency we will assume a constant aperture field on the element aperture, $$i_k(x) = U\left(x + \frac{\Delta x}{2}\right) - U\left(x - \frac{\Delta x}{2}\right) \quad (28)$$

where $U(x)$ is the unit step function, and the element radiation pattern referred to the element phase center, $x_k$, is:

$$g_k(u) = \int_{-\frac{\Delta x_k}{2}}^{\frac{\Delta x_k}{2}} e^{jk_0 ux} dx = \frac{\sin\frac{k_0 u \Delta x_k}{2}}{\frac{k_0 u}{2}} \quad (29)$$

The radiation power associated to the k-th radiation element can be determined, apart inessential impedence factors, integrating the square of the aperture field, $$p_k = \int_{-\frac{\Delta x_k}{2}}^{\frac{\Delta x_k}{2}} |b_k i_k(x)|^2 \, dx = |b_k|^2 \int_{-\frac{\Delta x_k}{2}}^{\frac{\Delta x_k}{2}} dx = |b_k|^2 \Delta x_k \quad (30)$$

In case the power of the k-th radiation element is pre-assigned, the following relationship between the aperture field amplitude and linear radiating element dimension must be respected:

$$b_k = \sqrt{\frac{p_k}{\Delta x_k}} \quad (31)$$

We now turn our attention to cumulative approximation condition in its differential form (20), that mutatis mutandis becomes:

$$i_0(x_k)\Delta t_k = b_k \Delta x_k \quad (32)$$

Under the additional hypothesis that the k-th radiation element has a linear dimension $\Delta x_k$ almost equal to its elementary cell, $$\Delta x_k \approx \Delta t_k \quad (33)$$

substituting (33) and (31) in (32) we obtain the following optimality condition, $$i_0(x_k)\Delta t_k = \sqrt{p_k \Delta t_k} \quad (34)$$

This expression can be reduced to a linear differential form in $\Delta t_k$ by simple manipulations, $$I_0^2(x_k)\Delta t_k = p_k \quad (35)$$

It can be observed that the resulting optimality condition correspond to a partitioning of the reference aperture field in elementary cells with assigned power levels, $$\int_{t_{k-1}}^{t_k} i_0^2(\xi) \, d\xi \approx i_0^2(x_k) \Delta t_k = p_k \quad (36)$$

Nevertheless, the coincidence of the field approximation with the power approximation is strictly linked to the use of maximal efficiency linear elements and is not generally true with other elements (e.g. with omnidirectional radiating elements).

From equation (35) it can be derived that $i_0^2(x)$ acts as derivative of the "grading function" and $p_k$ as "grading scale".

The synthesis can be performed determining, in a first step, the boundaries $t_k$ of the elementary cells by inversion of the "grading function" $E(x) = \int i_0^2(x) dx$:

$$\left\{ t_k : \frac{\int_{-\infty}^{t_k} i_0^2(x) dx}{\int_{-\infty}^{\infty} i_0^2(x) dx} = \frac{\sum_{n=1}^{k} p_n}{\sum_{n=1}^{N} p_n}; k = 1 \div N \right\} \quad (37)$$

In a second step the k-th element positions, $x_k$, can be determined accordingly either to a Doyle-like optimality condition (19) i.e. $x_k$ is such that, $$I_0(x_k) = \frac{I_0(t_k) + I_0(t_{k-1})}{2} \quad (38)$$

or simply considering $x_k$ the centre of the elementary cell, $$x_k = \frac{t_k + t_{k-1}}{2} \quad (39)$$

In a third step, the k-th element dimensions, $\Delta x_k$, can be determined such to contemporarily fulfil the cumulative field distribution approximation condition, $$a_k \triangleq I_0(t_k) - I_0(t_{k-1}) = I_e(t_k) - I_e(t_{k-1}) = \quad (40)$$
$$= \int_{t_{k-1}}^{t_k} b_k i_k(x) \, dx$$
$$= b_k \Delta x_k$$

the assigned power condition (30)-(31), $$b_k^2 \Delta x_k = p_k \quad (41)$$

and the feasibility condition, $$\Delta x_k \leq \Delta x_k^{max} \triangleq 2 \min((x_k - t_{k-1}), (t_k - x_k)) \quad (42)$$

which can be combined together obtaining, $$\Delta x_k = \frac{\frac{a_k^2}{p_k}}{\max_k \left( \frac{1}{\Delta x_k^{max}}, \frac{a_k^2}{p_k} \right)} \quad (43)$$

The aperture field amplitude coefficients $b_k$ can be derived from equation (40) using $\Delta x_k$ from equation (43), $$b_k = \frac{a_k}{\Delta x_k} \quad (44)$$

Circular Aperture Approximation Problem

We now turn our attention to the problem of approximating a desired radiation pattern $F_0(\theta,\varphi)$, generated by an aperture with circular symmetric continuous amplitude field $i_0(\rho)$, with the radiation pattern $F_a(\theta,\varphi)$ of a planar aperiodic array with elements disposed on circular rings of non-commensurable radius (aperiodic ring array).

An aperture function with circular symmetry can be expressed as:

$$i(x(\rho,\varphi), y(\rho,\varphi)) = i(\rho) \begin{cases} x(\rho,\varphi) = \rho\cos\varphi \\ y(\rho,\varphi) = \rho\sin\varphi \end{cases} \quad (45)$$

The far field radiation pattern generated by a circular symmetric field distribution $i(\rho)$ varying only in a radial direction $\rho$ is given by a Hankel transform of order zero of the field distribution $i(\rho)$:

$$F(u) = H_0(i(\rho)) = \qquad (46)$$
$$= 2\pi \int_0^\infty i(\rho)\rho J_0(k_0 u\rho)\,d\rho$$

with, $$k_0 = \frac{2\pi}{\lambda}, \qquad (47)$$
$$u = \sin(\vartheta)$$

In the following we will use the definition of the Hankel transform of n-th order accordingly to the well-known Hankel integral formula [Watson, p. 453], $$f(\rho) = \int_0^\infty \left(\int_0^\infty f(\rho)\rho J_n(u\rho)d\rho\right) u J_n(u\rho)\,du \qquad (48)$$

so that, for our purposes, the Hankel transform of n-th order will be defined as follows:

$$H_n(f(\rho)) = 2\pi \int_0^\infty f(\rho)\rho J_n(k_0 u\rho)\,d\rho \qquad (49)$$

where $J_n(x)$ is the Bessel function of order n.

Similarly to the linear case (6) we can evaluate the difference of the far-field radiation patterns:

$$F_0(u) - F_a(u) = H_0(i_0(\rho) - i_a(\rho)) = \qquad (50)$$
$$= 2\pi \int_0^\infty (i_0(\rho) - i_a(\rho))\rho J_0(k_0 u\rho)\,d\rho$$

Integrating by parts, $$\int_0^\infty (i_0(\rho) - i_a(\rho))\rho J_0(k_0 u\rho)\,d\rho = \qquad (51)$$
$$= \left(\int_0^\infty (i_0(\rho) - i_a(\rho))\rho d\rho\right)$$
$$J_0(k_0 u\rho)\Big|_0^\infty - \int_0^\infty$$
$$\left(\int (i_0(\rho) - i_a(\rho))\rho d\rho\right)$$
$$\left(\frac{d}{d\rho}J_0(k_0 u\rho)\right)d\rho =$$
$$= (I_0(\rho) - I_a(\rho))J_0(k_0 u\rho)\Big|_0^\infty +$$
$$k_0 u \int_0^\infty (I_0(\rho) - I_a(\rho))J_1(k_0 u\rho)\,d\rho$$

where it has been used the identity:

$$\frac{d}{dx}J_0(x) = -J_1(x) \qquad (52)$$

and the radial cumulative function of the circular aperture field is introduced:

$$I(\rho) = \int_0^\rho i(\xi)\xi\,d\xi \qquad (53)$$

Being $J_0(k_0 u\rho)$ bounded, and provided that $(I_0(\rho)-I_a(\rho))$ vanishes as $\rho\to 0$ and $\rho\to\infty$, the first term of (51) nullifies and we have, $$F_0(u) - F_a(u) = 2\pi k_0 u \int_0^\infty (I_0(\rho) - I_a(\rho))J_0(k_0 u\rho)\,d\rho \qquad (54)$$

which can be read as:

$$\frac{F_0(u) - F_a(u)}{k_0 u} = H_1\left(\frac{I_0(\rho) - I_a(\rho)}{\rho}\right) \qquad (55)$$

To obtain an equation similar to Doyle equation (3) we need to apply the Parseval-Plancherel theorem for Hankel transforms, $$\int_0^\infty |H_n(f(\rho))|^2 u\,du = \left(\frac{2\pi}{k_0}\right)^2 \int_0^\infty |f(\rho)|^2 \rho\,d\rho \qquad (56)$$

which, also in this case, is derived below for sake of completeness and correctness of the multiplying constants.

$$\int_0^\infty H_n(f(\rho))H_n^*(g(\rho))u\,du = \qquad (57)$$
$$= \int_0^\infty \left(2\pi \int_0^\infty f(\rho')\rho' J_0(k_0 u\rho')d\rho'\right)$$
$$\left(2\pi \int_0^\infty g^*(\rho)\rho J_0(k_0 u\rho)d\rho\right) u\,du =$$
$$= (2\pi)^2 \int_0^\infty \rho f^*(\rho) \int_0^\infty \rho' g(\rho')$$
$$\left(\int_0^\infty J_0(k_0 u\rho')J_0(k_0 u\rho)u\,du\right)d\rho'\,d\rho =$$
$$= (2\pi)^2 \int_0^\infty \rho g^*(\rho) \int_0^\infty \rho' f(\rho')\frac{1}{k_0^2 \rho'}\delta$$
$$(\rho' - \rho)d\rho'\,d\rho =$$
$$= \left(\frac{2\pi}{k_0}\right)^2 \int_0^\infty \rho g^*(\rho)f(\rho)d\rho =$$
$$= \left(\frac{2\pi}{k_0}\right)^2 \int_0^\infty f(\rho)g^*(\rho)\rho\,d\rho$$

Also in this case, the central element of the derivation is the representation of the Dirac delta function by means of a complete set of orthogonal functions [Arfken and Weber pp. 88-89] which leads to the closure equation for the continuum of Bessel functions [Arfken and Weber eq. 11-59, p. 696]:

$$\int_0^\infty J_\nu(\alpha\rho)J_\nu(\beta\rho)\rho d\rho = \frac{1}{\alpha}\delta(\alpha-\beta), \nu > -\frac{1}{2} \qquad (58)$$

By applying the Parseval-Plancherel theorem for hankel transforms (56) to expression (55) we obtain an equivalent Doyle equality for circular apertures:

$$\int_0^\infty \frac{1}{(k_0 u)^2}|F_0(u)-F_a(u)|^2 u du = \left(\frac{2\pi}{k_0}\right)^2 \int_0^\infty \frac{1}{\rho^2}|I_0(\rho)-I_a(\rho)|^2 \rho d\rho \qquad (59)$$

The left term in Equation (59) represents a weighted mean square error of the patterns with an inverse quadratic weighting function. In a symmetric way, the right term is a weighted mean square error of the radial cumulative functions of the circular field distributions.

Similarly to the linear case, the synthesis problem is made equivalent to the identification of an approximating radial cumulative function $I_a(\rho)$ optimally fitting the reference radial cumulative function $I_0(\rho)$.

Synthesis of an Array of Maximum Efficiency Annular-Rings (Invention)

We now introduce the synthesis of a stepwise radially-continuous aperture composed of a annular rings with maximum efficiency.

Assuming an assigned number of annular rings N, and assigned power excitations per ring $\{p_k;k=1 \div N\}$ we want to determine the annular ring mean radius, $r_k$, and the annular ring radial extension $\Delta r_k$ such that a desired radiation pattern $F_0(u)$, generated by a planar source with circularly symmetric continuous amplitude field $i_0(\rho)$, is approximated with the radiation pattern $F_a(u)$ and amplitude field $i_a(\rho)$ generated by an array of annular rings with maximum efficiency, $$i_a(\rho) = \sum_{k=1}^N b_k i_k(\rho) \qquad (60)$$

$$F_a(u) = \sum_{k=1}^N b_k g_k(u) \qquad (61)$$

where, $i_k(\rho)$ and $g_k(u)$ are, the circular aperture field, and the radiation pattern of the k-th annular ring, respectively.

Each annulus is defined by the area between two concentric circles of radii $$r_k - \frac{\Delta r_k}{2} \text{ and } r_k + \frac{\Delta r_k}{2},$$

and develops an area, $A_k = 2\pi r_k \Delta r_k$.

For an annular ring with maximum efficiency we will assume that the annular ring exhibits a constant aperture field $i_k(\rho)$ on the annulus, $$i_k(\rho) = U\left(\rho - \left(r_k - \frac{\Delta r_k}{2}\right)\right) - U\left(\rho - \left(r_k + \frac{\Delta r_k}{2}\right)\right) \qquad (62)$$

where $U(x)$ is the unit step function.

For the radiation pattern, $g_k(u)$, of the k-th annular ring with maximum efficiency, we have:

$$g_k(u) = 2\pi \int_0^\infty i_k(\rho)\rho J_0(k_0 u\rho) d\rho \qquad (63)$$

$$= 2\pi \int_{r_k - \frac{\Delta r_k}{2}}^{r_k + \frac{\Delta r_k}{2}} \rho J_0(k_0 u\rho) d\rho =$$

$$= \pi\left(r_k + \frac{\Delta r_k}{2}\right)^2 \Lambda_1\left(k_0 u\left(r_k + \frac{\Delta r_k}{2}\right)\right) - \pi\left(r_k - \frac{\Delta r_k}{2}\right)^2 \Lambda_1\left(k_0 u\left(r_k - \frac{\Delta r_k}{2}\right)\right)$$

where the lambda function is defined in Jahnke and Emde (p. 128 [30]), $$\Lambda_\rho(x) = 2^\rho \cdot \Gamma(\rho+1) \cdot \frac{J_\rho(x)}{x^\rho} \qquad (64)$$

and is normalized such that, $$\Lambda_\rho(0) = 1 \qquad (65)$$

The radiation power associated to the k-th annular ring can be determined, apart inessential impedence factors, integrating the square of the aperture field on the annulus, $$\rho_k = 2\pi \int_{r_k - \frac{\Delta r_k}{2}}^{r_k + \frac{\Delta r_k}{2}} |b_k i_k(\rho)|^2 \rho d\rho = \qquad (66)$$

$$= 2\pi |b_k|^2 \int_{r_k - \frac{\Delta r_k}{2}}^{r_k + \frac{\Delta r_k}{2}} \rho d\rho =$$

$$= |b_k|^2 2\pi r_k \Delta r_k = |b_k|^2 A_k$$

In case the power of the k-th annular ring is pre-assigned, the following relationship between the aperture field amplitude, $b_k$, and annulus area must be respected:

$$b_k = \sqrt{\frac{\rho_k}{A_k}} = \sqrt{\frac{\rho_k}{2\pi r_k \Delta r_k}} \qquad (67)$$

We now turn our attention to cumulative approximation condition, $$I_0(\rho_k) = I_a(\rho_k) \qquad (68)$$

which intrinsically define a partitioning in elementary annuli of radial boundaries $(\rho_{k-1}, \rho_k)$, and in its differential form (20), becomes:

$$I_0(\rho_k) - I_0(\rho_{k-1}) = \qquad (69)$$

$$\int_{\rho_{k-1}}^{\rho_k} i_0(\rho)\rho d\rho = i_0(\bar{\rho}_k)\bar{\rho}_k \Delta\rho_k == I_a(\rho_k) - I_a(\rho_{k-1}) =$$

$$\int_{\rho_{k-1}}^{\rho_k} i_a(\rho)\rho d\rho = b_k \int_{r_k - \frac{\Delta r_k}{2}}^{r_k + \frac{\Delta r_k}{2}} \rho d\rho = r_k \Delta r_k$$

where $\bar{\rho}_k$ is the mid radius of the elementary annulus of radial boundaries $(\rho_{k-1}, \rho_k)$, $$\overline{\rho}_k = \frac{\rho_{k-1} + \rho_k}{2} \quad (70)$$

We will now use the additional approximation that the k-th annular ring mid radius, $r_k$, almost coincides with the mid radius of the elementary annulus, $$r_k \approx \overline{\rho}_k \quad (71)$$

Clearly this approximation will be valid at the limit of a high number of annular rings, so that the radial dimensions of the elementary annuli will reduce and the quantities coincide. With this additional approximation equation (69) becomes, $$i_0(r_k)\Delta\rho_k = b_k \Delta r_k \quad (72)$$

This expression is fully equivalent to equation (32), which has been derived for the case of a linear aperiodic array with maximum efficiency radiating elements.

Under the additional hypothesis that the k-th annular ring has a radial extension $\Delta r_k$ almost equal to its elementary annulus, $$\Delta r_k \approx \Delta \rho_k \quad (73)$$

Substituting equations (73) and (67) in (72) we obtain the following optimality condition, $$i_0(r_k)\Delta\rho_k = \sqrt{\frac{\rho_k \Delta r_k}{2\pi r_k}} \quad (74)$$

This expression can be reduced to a linear differential form in $\Delta p_k$ by simple manipulations, $$2\pi i_0^2(r_k)r_k\Delta\rho_k = p_k \quad (75)$$

It is worth noting that, similarly to the case of a linear aperiodic array with maximum efficiency radiating elements, the resulting optimality condition correspond to a partitioning of the reference aperture field in elementary cells with assigned power levels, $$2\pi \int_{\rho_{k-1}}^{\rho_k} i_0^2(\xi)\xi d\xi \approx 2\pi i_0^2(r_k)r_k \Delta\rho_k = \rho_k \quad (76)$$

Still, the coincidence of the field approximation with the power approximation is strictly linked to the use of maximal efficiency linear elements and is not generally valid for other approximating functions.

From equation (76) it can be derived that $\rho i_0^2(\rho)$ acts as derivative of the "grading function" and $p_k$ as "grading scale".

The synthesis can be performed determining, in a first step, the boundaries $\rho_k$ of the elementary cells by inversion of the "grading function" $E(\rho) = \int \rho i_0^2(\rho)d\rho$:

$$\left\{\rho_k : \frac{\int_0^{\rho_k} \rho i_0^2(\rho)d\rho}{\int_0^{\infty} \rho i_0^2(\rho)d\rho} = \frac{\sum_{n=1}^{k} \rho_n}{\sum_{n=1}^{N} \rho_n}; k = 1 \div N\right\} \quad (77)$$

In a second step the k-th annular ring mid-radius, $r_k$, can be determined accordingly either to a Doyle-like optimality condition (19) i.e. $r_k$ is such that, $$I_0(r_k) = \frac{I_0(\rho_k) + I_0(\rho_{k-1})}{2} \quad (78)$$

or simply considering $r_k$ the centre of the elementary annulus, $$r_k = \frac{\rho_k + \rho_{k-1}}{2} = \overline{\rho}_k \quad (79)$$

In a third step, the k-th annular ring radial dimensions, $\Delta r_k$, can be determined such to contemporarily fulfil the cumulative field distribution approximation condition, $$a_x \triangleq I_0(\rho_k) - I_0(\rho_{k-1}) = I_a(\rho_k) - I_a(\rho_{k-1}) = b_k r_k \Delta r_k \quad (80)$$

the assigned power condition (66)-(67), $$b_k^2 2\pi r_k \Delta r_k = p_k \quad (81)$$

and the feasibility condition, $$\Delta r_k \leq \Delta r_k^{max} \triangleq 2 \min((r_k - \rho_{k-1}), (\rho_k - r_k)) \quad (82)$$

which can be combined together obtaining, $$\Delta r_k = \frac{\frac{a_k^2}{\rho_k r_k}}{\max_k\left(\frac{1}{\Delta r_k^{max}}, \frac{a_k^2}{\rho_k r_k}\right)} \quad (83)$$

The amplitude coefficients $b_k$ can be derived from equation (80) using $\Delta x_k$ from equation (83), $$b_k = \frac{a_k}{r_k \Delta r_k} \quad (84)$$

Synthesis of an Array of Maximum Efficiency Annular-Rings with Power Proportional to the Ring Circumference (Invention)

The general design procedure described in previous paragraph can be customised to different profiles of assigned power levels. An interesting profile of power level is such to have a power directly proportional to the ring diameter, $$p_k = 2\pi r_k p_0 \quad (85)$$

which can be substituted in equation (75), resulting in the following optimality condition in differential form, $$i_0^2(r_k)\Delta p_k = p_0 \quad (86)$$

From equation (86) it can be derived that, in this case, $i_0^2(\rho)$ acts as derivative of the "grading function" and the "grading scale" is uniform.

In this case, to perform the synthesis, in a first step the boundaries $p_k$ of the elementary cells are determined by inversion of the "grading function" $E(\rho) = \int i_0^2(\rho)d\rho$:

$$\left\{\rho_k : \frac{\int_0^{\rho_k} i_0^2(\rho)d\rho}{\int_0^{\infty} i_0^2(\rho)d\rho} = \frac{\sum_{n=1}^{k} \rho_n}{\sum_{n=1}^{N} \rho_n}; k = 1 \div N\right\} \quad (87)$$

In a second step, the annular ring mid-radius, $r_k$, can be determined accordingly to the second step described in previous paragraph.

In a third step, the k-th annular ring radial dimensions, $\Delta r_k$, are determined such to contemporarily fulfil the cumulative field distribution approximation condition (equation (80)), assigned power condition (equations (66), (67) and (85)), $$b_k^2 \Delta r_k = p_0 \tag{88}$$

and the feasibility condition, $$\Delta r_k \leq \Delta r_k^{max} \triangleq 2 \min((r_k - \rho_{k-1}), (\rho_k - r_k)) \tag{89}$$

which can be combined together obtaining, $$\Delta r_k = \frac{\frac{a_k^2}{r_k^2}}{\max_k \left( \frac{1}{\Delta r_k^{max}} \frac{a_k^2}{r_k^2} \right)} \tag{90}$$

The amplitude coefficients $b_k$ can be derived from equation (80) using $\Delta r_k$ from equation (90), $$b_k = \frac{a_k}{r_k \Delta r_k} \tag{91}$$

Synthesis of Annular Ring Aperiodic Arrays with Maximum Efficiency Radiating Elements (Invention)

Finally, we are ready to tackle the problem of synthesizing an aperiodic planar arrays with maximum efficiency radiating elements arranged on concentric annular rings of incommensurable radius, element dimensions proportional to the annular ring dimensions and assigned power excitations, $q_k$, per element of the same ring $\{q_k; k=1 \div N\}$.

In first approximation, each annular ring will exhibit a stepwise constant radial profile similar to an aperture with maximum efficiency annular-rings (refer to FIG. 9A) so that the results already developed will be fully applicable. In the final layout the continuous annular ring will be replaced by maximum efficiency radiating elements with radial element dimensions smaller than, and preferably equal to radial width of the corresponding annulus.

According to the invention, the number of maximum efficiency radiating elements arranged on each ring is proportional to the ratio between the radius of said ring and the radial width of said maximum efficiency radiating elements.

The invention will be described considering the case of circular radiating elements with element diameter proportional to the annular ring size (refer to FIG. 9B), nevertheless, according to the invention, different types of maximum efficiency radiating elements can be used (e.g. with aperture corresponding to circular—FIG. 31A, square, in which case the radial width correspond to the diagonal or side length—FIG. 31B, annulus sector—FIG. 31C, etc.).

Different technological solutions for the radiating element can used (e.g. horns, printed patches), similarly the radiating element may be constituted sub-arrays of smaller radiating elements.

Being the power of the maximum efficiency radiating elements of k-th annular ring is pre-assigned to $q_k$, the following relationship between the radiating element aperture field amplitude, $b_k$, and radiating element aperture area, $A_k^{RE}$, must be respected:

$$b_k = \sqrt{\frac{p_k}{A_k^{RE}}} \tag{92}$$

Circular radiating elements of diameter $d_k$ proportional to the annular ring radial dimensions, $\Delta r_k$, allows a minimisation of the unused area between annular rings. The area of the radiating element becomes, $$A_k^{RE} = \pi \left( \frac{\Delta r_k}{2} \right)^2 \tag{93}$$

With the additional hypothesis that the number of elements accommodated in each annular ring, $N_k$, is proportional to the ration between the annular ring circumference and the radiating element diameter (i.e. the radial width of the radiating element), $$N_k \approx \frac{2\pi r_k}{\Delta r_k} \tag{94}$$

we can evaluate the annular power level profile, that results being, $$p_k = N_k q_k \approx \frac{2\pi r_k}{\Delta r_k} q_k \tag{95}$$

which, substituted in equation (74), results in the following optimality condition in differential form, $$i_0(r_k) \Delta \rho_k = \sqrt{\frac{p_k \Delta r_k}{2\pi r_k}} = \sqrt{q_k} \tag{96}$$

From equation (76) it can be derived that $i_0(\rho)$ acts as derivative of the "grading function" and $\sqrt{q_k}$ as "grading scale".

The synthesis can be performed determining, in a first step, the boundaries $\rho_k$ of the elementary cells by inversion of the "grading function" $E(\rho) = \int i_0(\rho) d\rho$:

$$\left\{ \rho_k : \frac{\int_0^{\rho_k} i_0(\rho) d\rho}{\int_0^{\infty} i_0(\rho) d\rho} = \frac{\sum_{n=1}^{k} \sqrt{q_n}}{\sum_{n=1}^{N} \sqrt{q_n}}; k = 1 \div N \right\} \tag{97}$$

In a second step the k-th annular ring mid-radius, $r_k$ can be determined accordingly either to a Doyle-like optimality condition (19) i.e. $r_k$ is such that, $$I_0(r_k) = \frac{I_0(\rho_k) + I_0(\rho_{k-1})}{2} \tag{98}$$

or simply considering $r_k$ the centre of the elementary annulus, $$r_k = \frac{\rho_k + \rho_{k-1}}{2} = \bar{\rho}_k \tag{99}$$

In a third step, the k-th annular ring radial dimensions, $\Delta r_k$, are determined such to fulfil the feasibility condition of non-overlapping annular rings, $$\Delta r_k = \Delta r_k^{max} \triangleq 2 \min((r_k - \rho_{k-1}), (\rho_k - r_k)) \tag{100}$$

In a forth step, the number of elements per ring is defined accordingly to equation (94), $$N_k = \left\lfloor \frac{2\pi r_k}{\Delta r_k} \right\rfloor \quad (101)$$

where the symbols ⌊ ⌋ indicates the operator of maximum integer contained within the number in the brackets.

The final fifth step consists in placing the defined integer number of elements $N_k$ on the annular rings of mid-radius, $r_k$. The most obvious and most accurate choice is to put them at an equal angular distance. A deterministic or random rotation of the elements from annular ring to annular ring can be also employed, although the corresponding results do not change significantly especially for large arrays.

In case the array is designed such to have a central element, the some adaptation in the definition of the grading scale, $q_1'$, must be considered. In particular, being for the central element (k=1), $$r_1 = \frac{\Delta r_1}{2} \quad (102)$$

equation (95), to be applicable can be inverted finding, $$q_1' = \frac{1}{\pi} q_1;$$

furthermore, considering that the central element will exhibit a true coverage of the assigned area while circular radiating elements disposed on the other annular ring will suffer an area filling factor of $$\frac{\pi}{4},$$

the resulting value to be used for the grading scale will be:

$$q_1' = \frac{1}{4} q_1 \quad (103)$$

In case beam scanning requirements in a Region of Interest (ROI) are applicable, an additional constraint on the maximum element dimensions, $\Delta r^{max}$, can be imposed. The third step above must be complemented with the sub-step:

$$\Delta r_k = \min(\Delta r_k^{max}, \Delta r^{max}) \quad (104)$$

The fourth and fifth steps described above apply without modification and fully complying with the optimality conditions in differential form as expressed by Equation (96). This is basically due to the fact that the constitutive hypothesis (94) makes Equation (96) independent on the element size but only dependent on the assigned power level per element of the k-th ring. Nevertheless it must be understood that elements diameters comparable with the elementary annuli will improve the accuracy of the approximation of the cumulative function and in turn of the radiation pattern.

The aperture filling factor and the associated aperture efficiency and directivity are so optimized compatibly with the scanning requirement constraints.

Technical Results of the Invention

Linear Array Design Example

The described procedure has been applied, for exemplification, to the reference aperture field of FIG. 3A, with an amplitude field $i_0(x)$ relevant to a linear Taylor amplitude distribution law [27] obtaining a desired radiation pattern $F_0(u)$ (shown in FIG. 3B) with 20 dB of side-lobe level ($n_{bar}$=3; SLL=−20).

Assuming equal power per element, the boundaries $t_k$ of the elementary cells are determined by inversion of the "grading function" of Equation (37) on a uniform scale (due to the equi-power hypothesis). This first step is shown in FIG. 3C.

Second step of determining the element phase center positions accordingly to the cumulative function (38) is shown in FIG. 3D.

FIG. 3E and FIG. 3F show, respectively, the aperture fields and the cumulative functions of the linear array of maximum efficiency radiating elements (in black) and reference linear aperture (in gray).

In FIG. 3G and FIG. 3H, the aperture fields and the cumulative functions, respectively, of the linear array of maximum efficiency radiating elements (in black) and reference linear aperture (in gray) are compared with the linear array of omnidirectional radiating elements (dotted line). The resultant radiation patterns are reported in FIG. 3I, which indicates the goodness of the proposed synthesis solution for linear array of maximum efficiency radiating elements.

Circular Array Design Examples

Reference Aperture

The described procedures have been applied, for exemplification, to the reference circular aperture field of FIG. 4 (radial cut) with an aperture diameter D equal to 44λ (λ being the operating wavelength of the antenna) and with an amplitude field $i_0(\varphi)$ relevant to a circular Taylor amplitude distribution law [28] obtaining a desired radiation pattern $F_0(u)$ (shown in FIG. 5B) with 25 dB of side-lobe level ($n_{bar}$=2; SLL=−25).

Tapered Annular Rings Array (Configuration A)
[Prior Art]

An array layout according to prior-art Configuration A and relevant radiative performance are reported in FIG. 6 and FIG. 7A to 7F.

Figure 4:
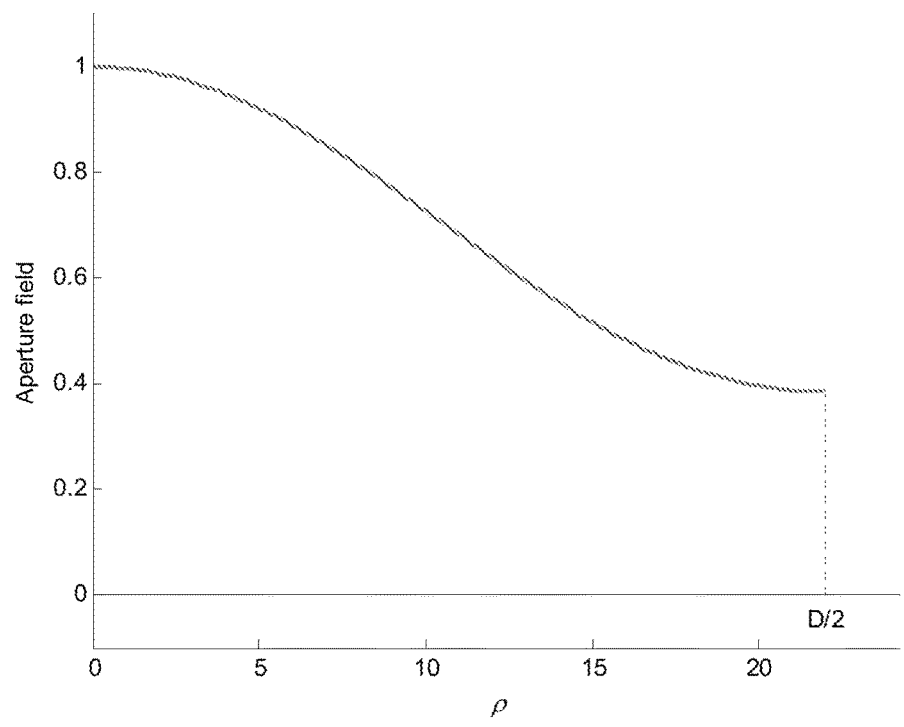
Figure 6:
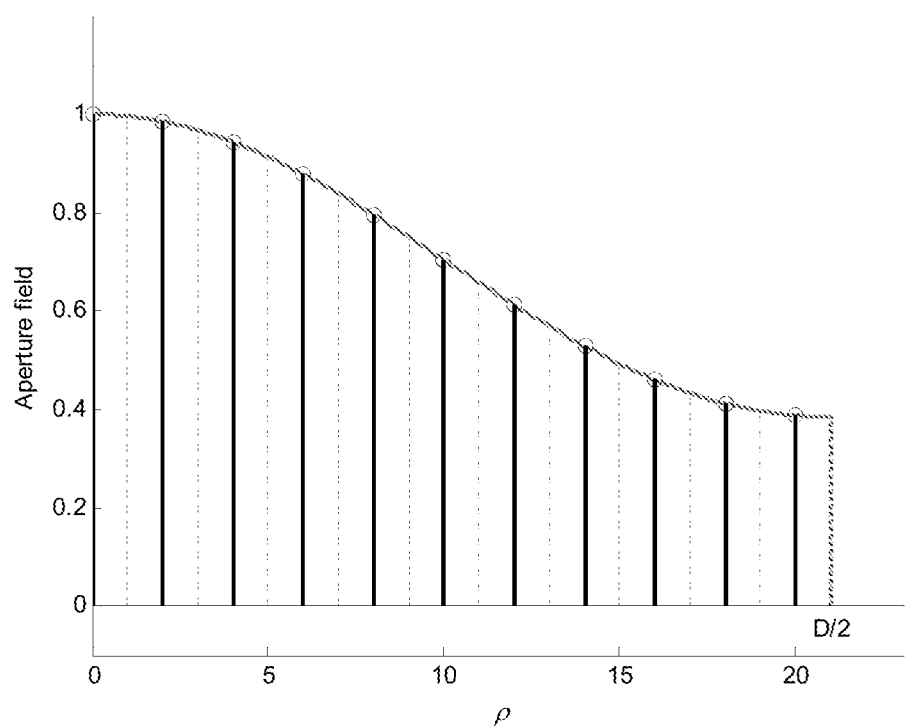

FIG. 6 shows how the reference circular aperture field of FIG. 4 can be radially sampled (at a period of 2λ) to derive the excitations of a ring array of equal sized elements (of 2λ diameter).

Figure 7A:
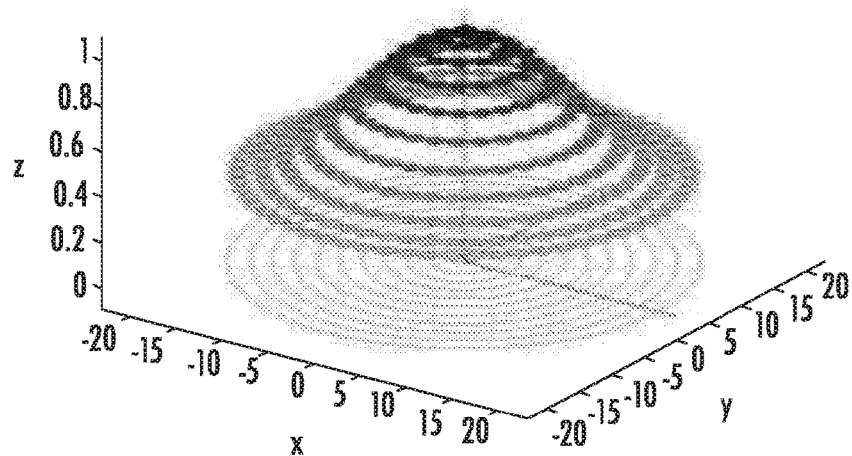
Figure 7B:
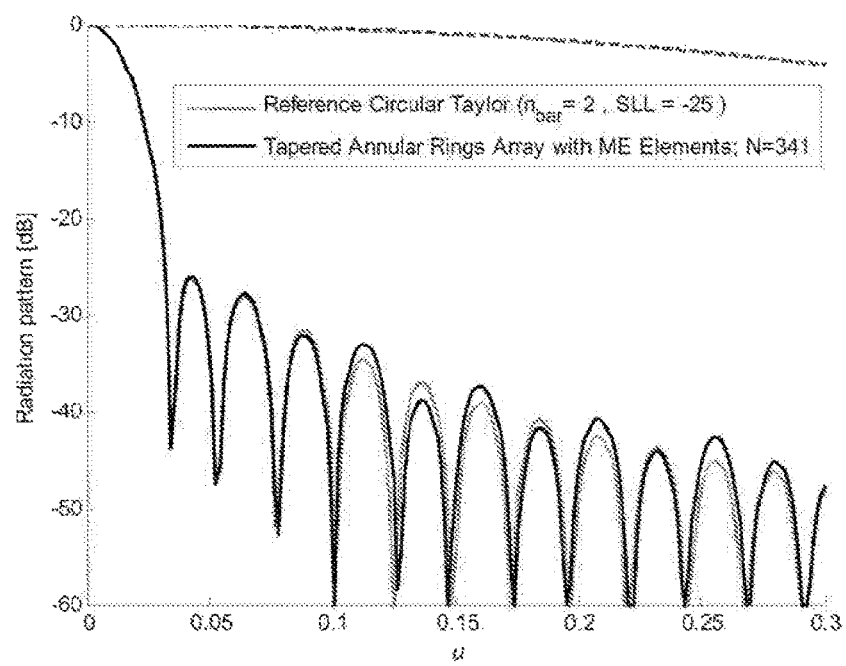
Figure 7C:
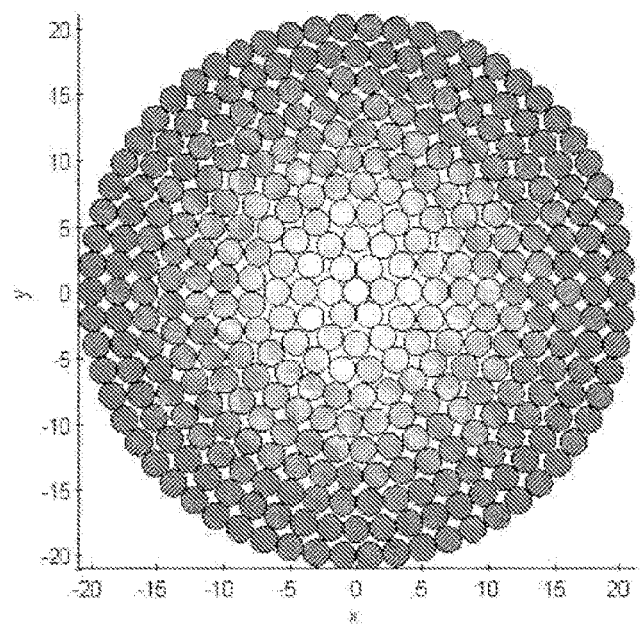

FIG. 7A and FIG. 7C show, respectively, a three-dimensional view and a colour plot of the aperture field of the Tapered Annular Rings Array.

In FIG. 7B, azimuthal cuts of the radiation pattern of the Tapered Annular Rings Array of FIG. 7A and FIG. 7C is compared with the desired radiation pattern of FIG. 4.

Figure 7D:
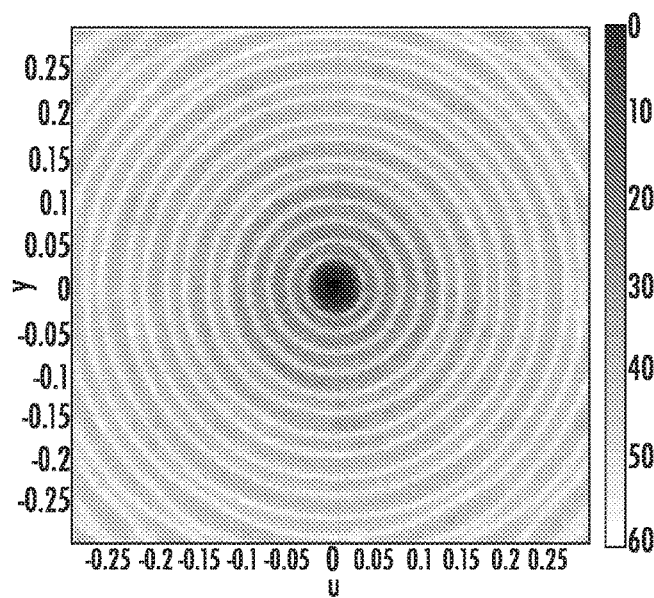
Figure 7E:
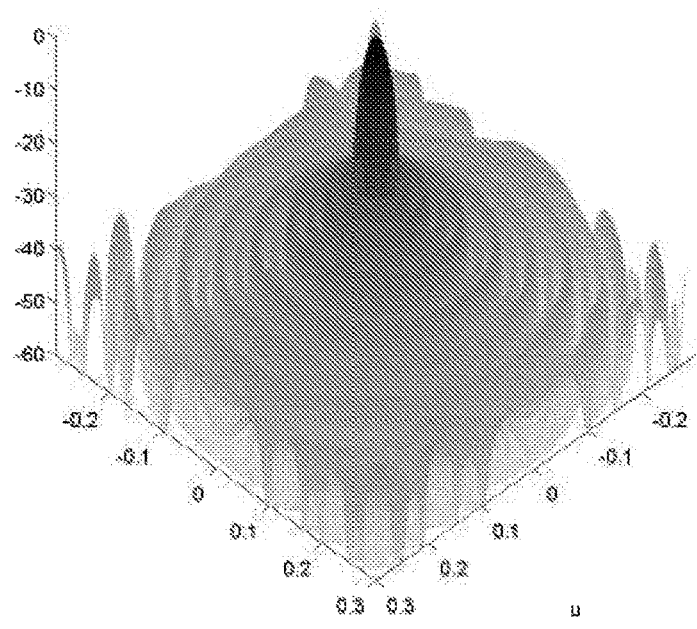
Figure 7F:
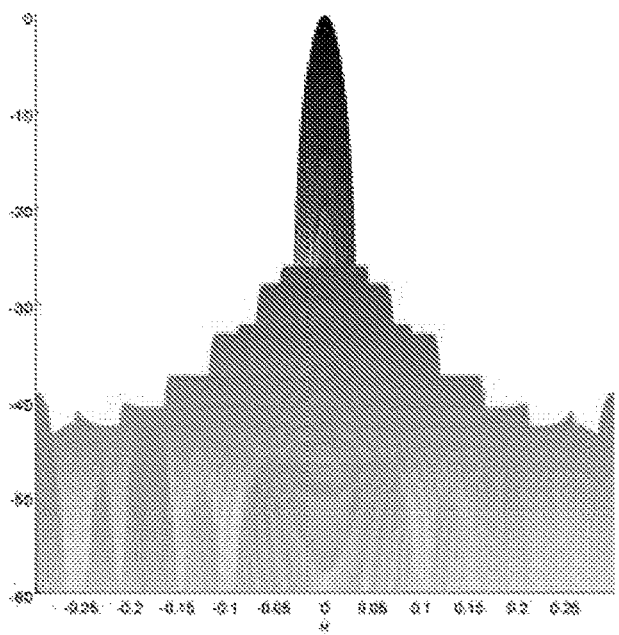

FIG. 7D shows a colour plot of the radiation pattern of the Tapered Annular Rings Array of FIG. 7A and FIG. 7C; and FIG. 7E; and FIG. 7F show three-dimensional views of the pattern.

Aperiodic Array with Identical Radiating Elements (Configuration B) [Prior Art]

An array layout according to prior-art Configuration B and relevant radiative performance are reported in FIG. 8A to 8F.

Figure 8A:
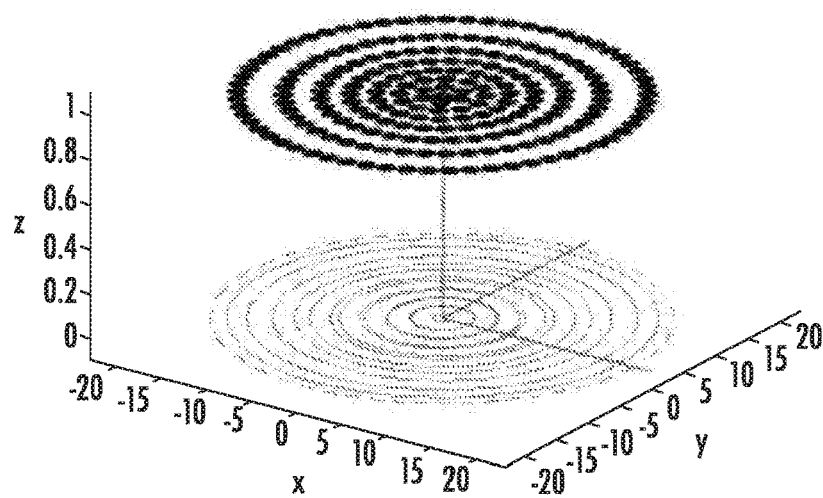
Figure 8B:
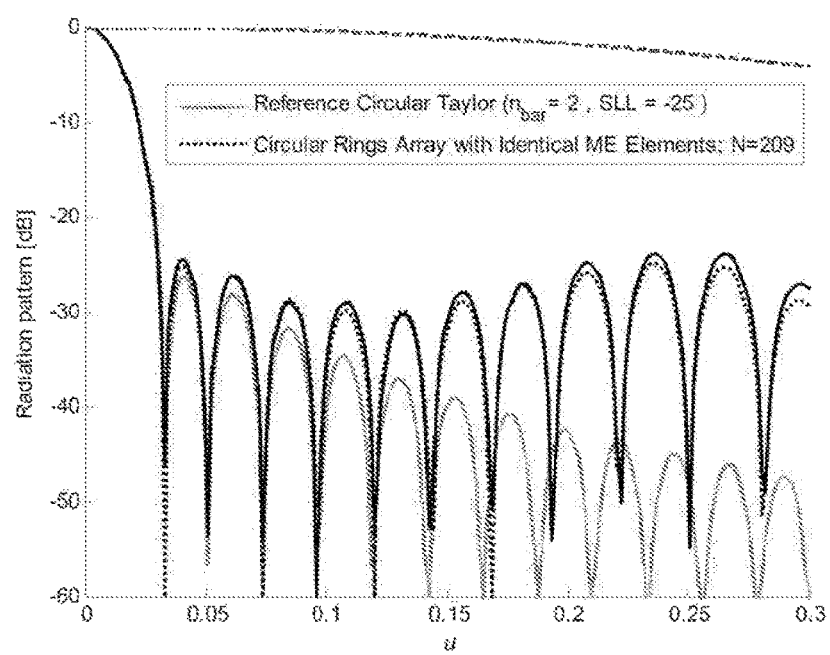
Figure 8C:
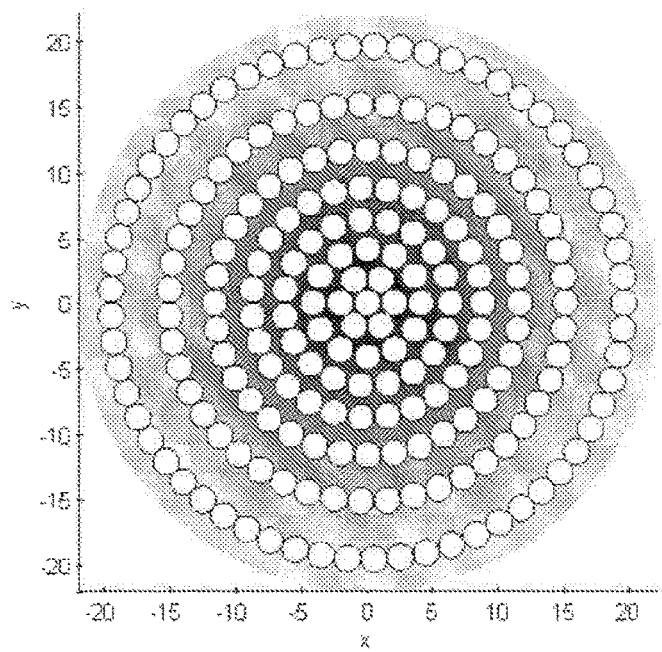

FIG. 8A and FIG. 8C show, respectively, a three-dimensional view and a colour plot of the aperture field of the Aperiodic Array with Identical Radiating Elements disposed on concentric circular rings.

In FIG. 8B, azimuthal cuts of the radiation pattern of the Aperiodic Array with Identical Radiating Elements of FIG. 8A and FIG. 8C is compared with the desired radiation pattern of FIG. 4.

Figure 8D:
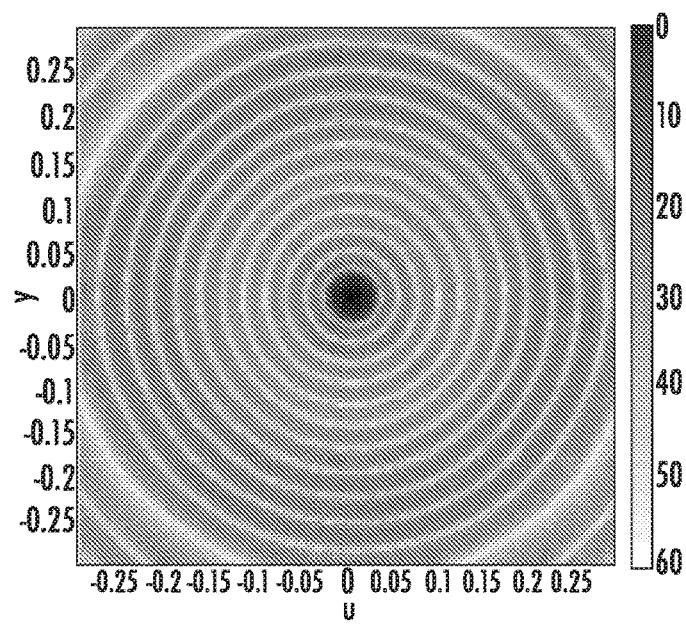
Figure 8E:
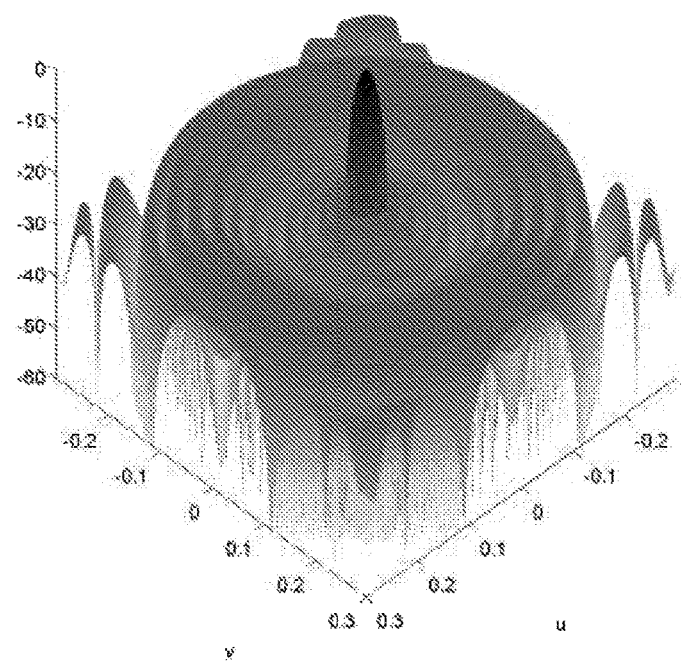

FIG. 8D shows a colour plot of the radiation pattern of the Aperiodic Array with Identical Radiating Elements of FIG. 8A and FIG. 8C; and FIG. 8E; and FIG. 8.F show three-dimensional views of the pattern.

Annular Ring Aperiodic Arrays with Maximum Efficiency Radiating Elements (Configurations C and D) [Invention]

All the following design examples refers to the preferred assumption of equal power per element.

FIG. 10A to FIG. 14F and FIG. 15 to FIG. 18F relates to the synthesis of an array according to Configuration C, i.e. without any constraint on the maximum radiating element dimensions.

FIG. 19 to FIG. 22F and FIG. 23 to FIG. 26F relates to the synthesis of an array according to Configuration D, i.e. with a constraint on the maximum radiating element dimensions accordingly to scan requirements.

Figure 9A:
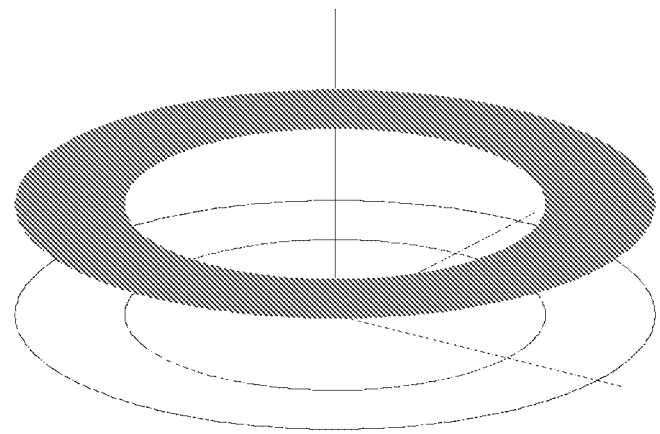
Figure 9B:
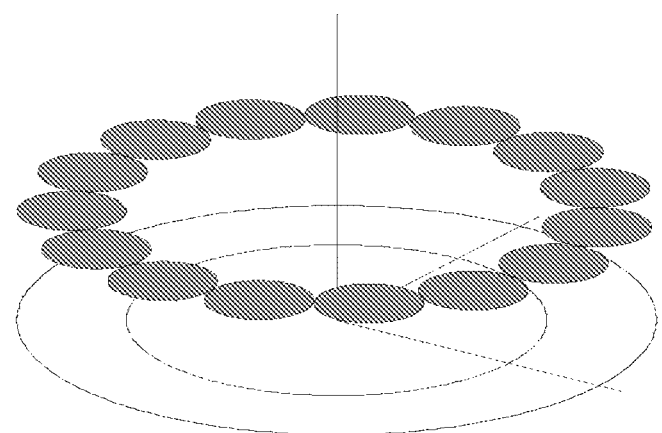

For each design example, we will report results related, first to the approximation with continuous maximum efficiency annular-rings (FIG. 9A), and then to the design with maximum efficiency circular radiating elements with element dimensions proportional to the annular ring size (FIG. 9B).

Configuration C (Unconstrained Size) [Invention]

Example C1 (Unconstrained Size—Cumulative Centre) [Invention]

FIG. 10A to FIG. 14F relates to the design choice of the annulus mid-radius accordingly to the Doyle-like optimality condition on the cumulative function (98).

Figure 10A:
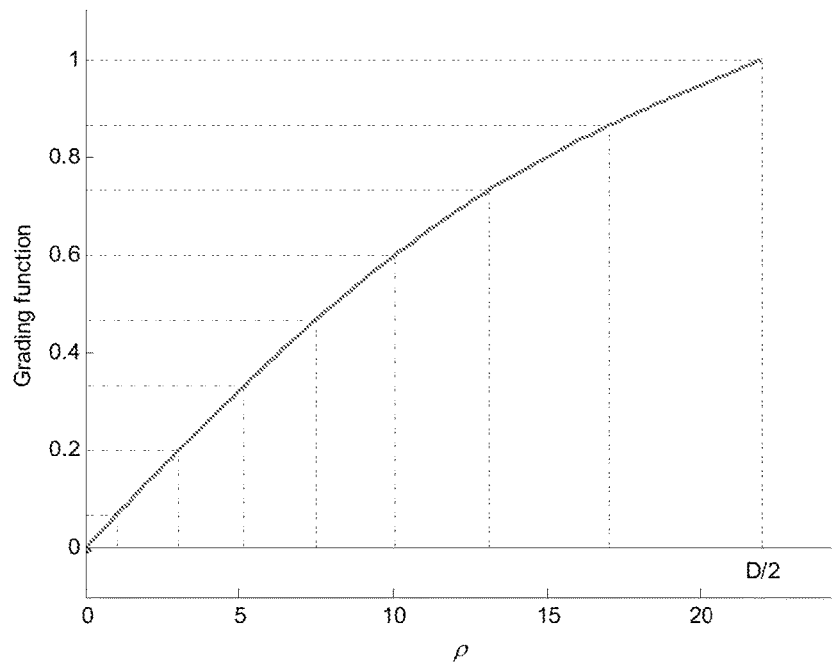

Assuming equal power per element, the boundaries $\rho_k$ of the elementary annuli are determined by inversion of the "grading function" of Equation (97) on a uniform scale (apart the first element in case of presence of the central element). This first step is shown in FIG. 10A.

Figure 10B:
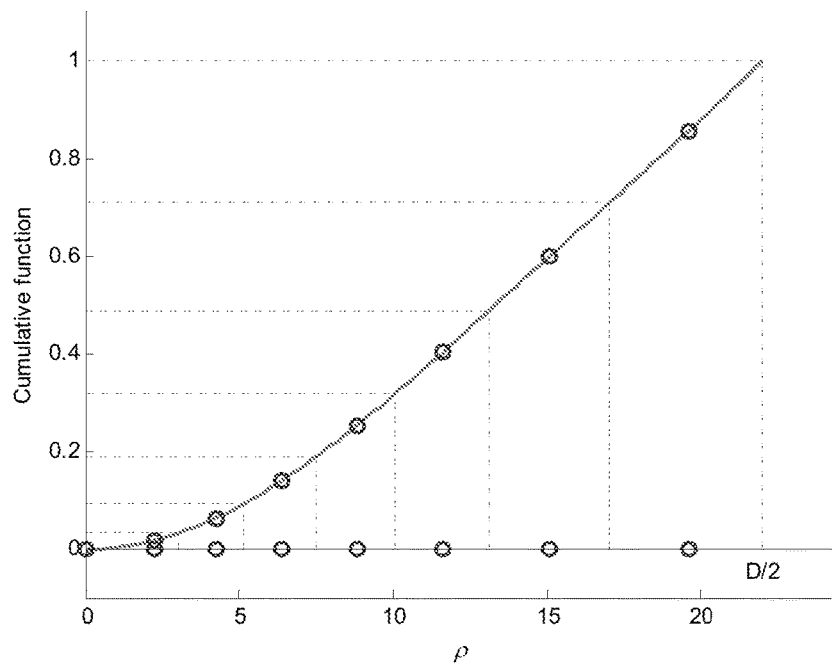

Second step of determining the maximum efficiency annuli radial centers accordingly to the cumulative function (98) is shown in FIG. 10B.

Figure 11:
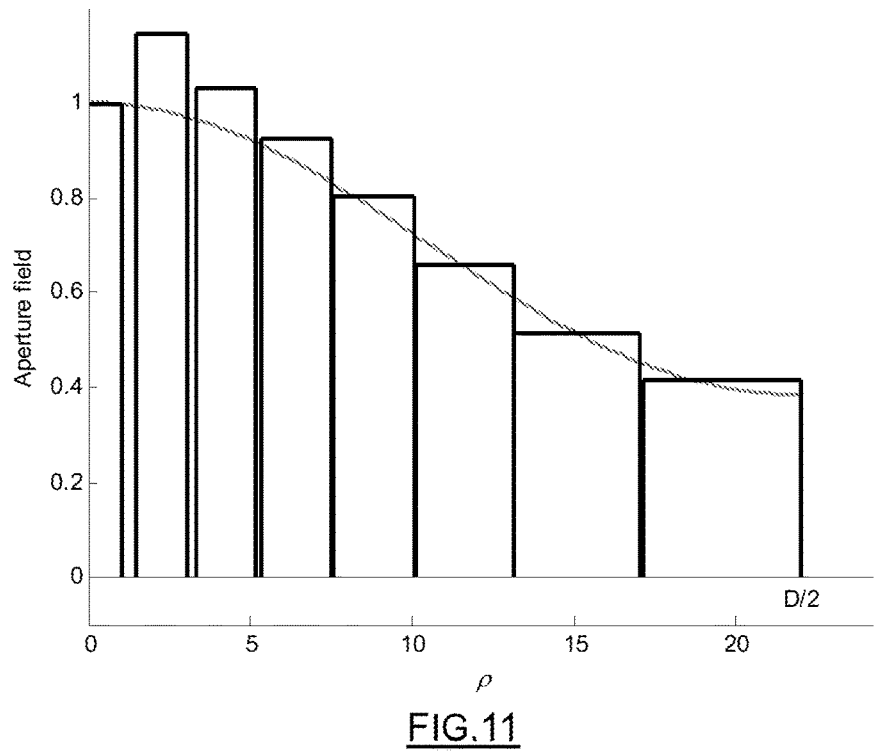
Figure 12:
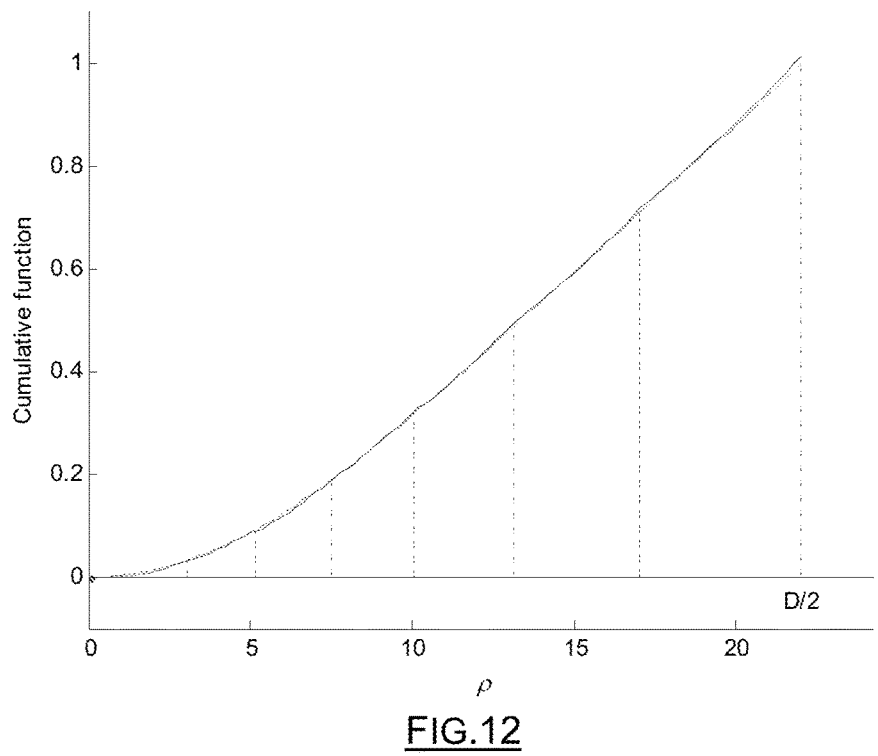

FIG. 11 and FIG. 12 show, respectively, the aperture fields and the cumulative functions of the array of maximum efficiency annular rings (in black) and reference circular aperture (in gray).

Figure 13A:
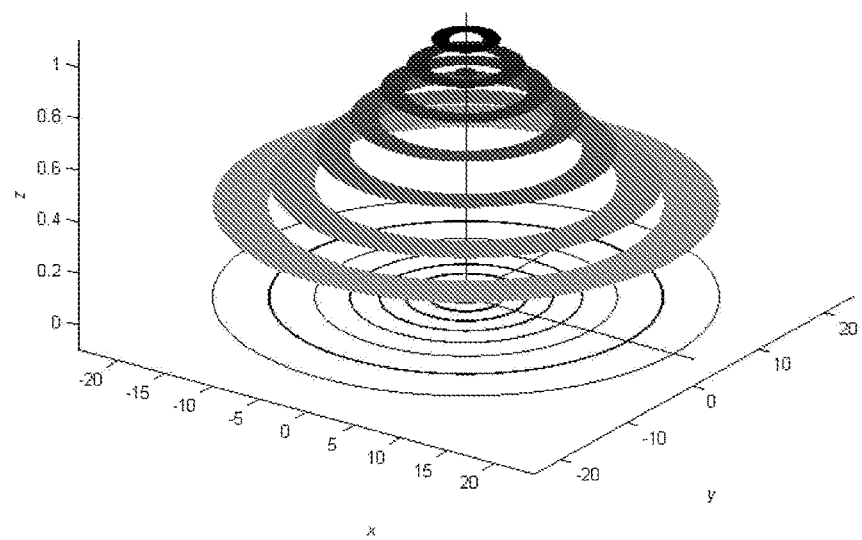

FIG. 13A shows a three-dimensional view of the aperture field of the Array of Maximum Efficiency Annular-Rings.

Figure 13B:
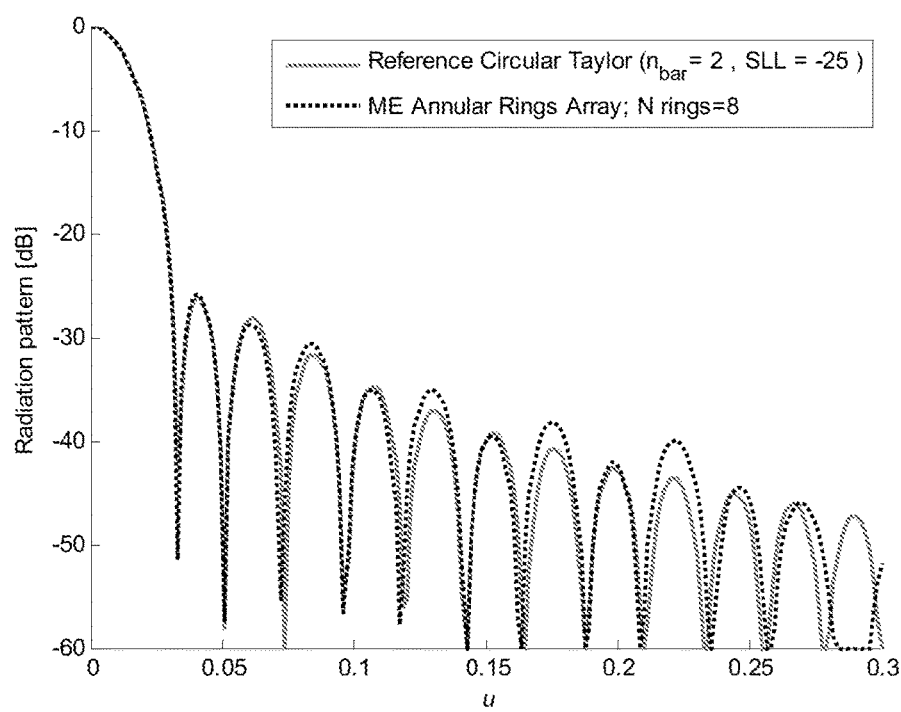

In FIG. 13B, azimuthal cuts of the radiation pattern of the Array of Maximum Efficiency Annular-Rings of FIG. 13A is compared with the desired radiation pattern of FIG. 4.

Figure 14A:
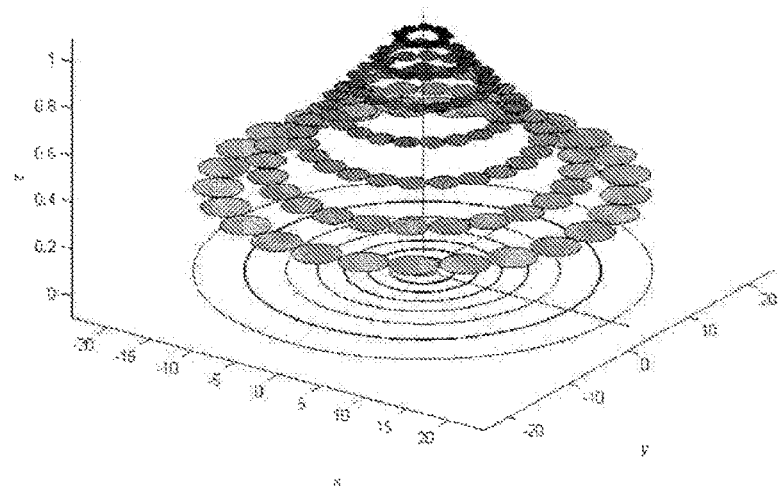
Figure 14B:
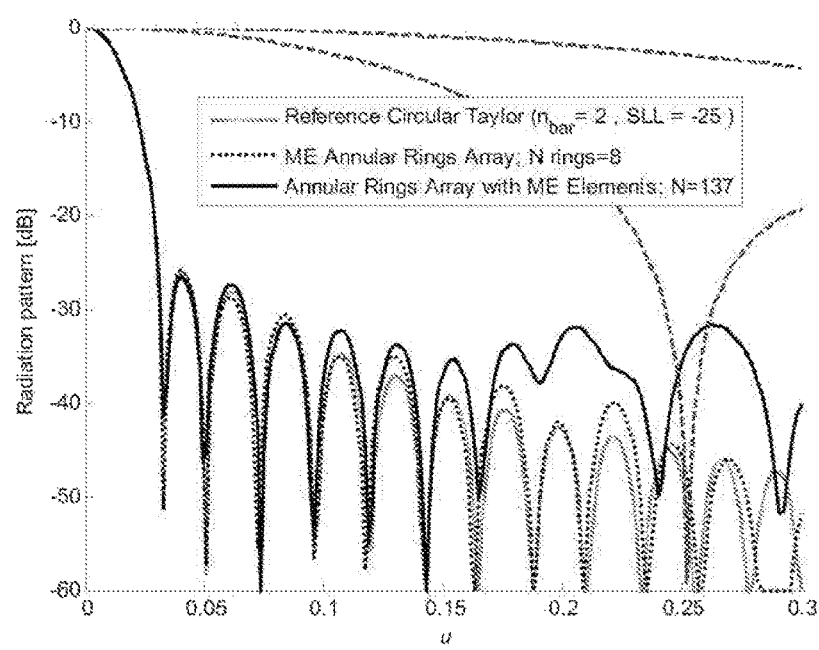
Figure 14C:
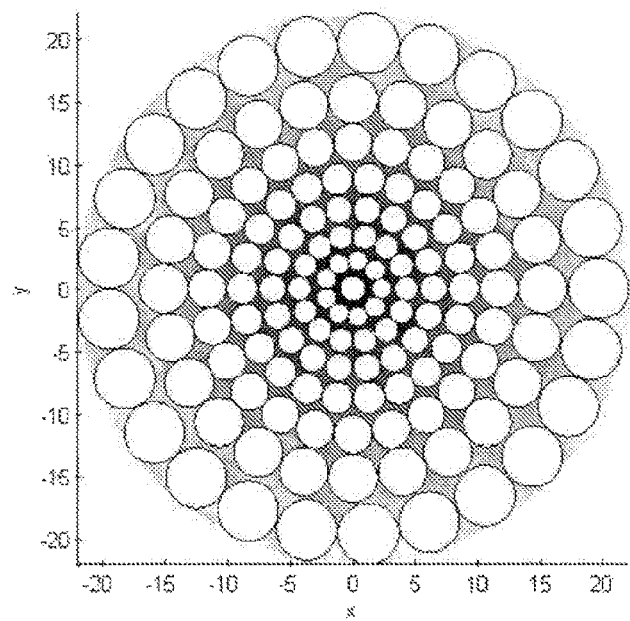

Substituting the with continuous maximum efficiency annular-rings (FIG. 13A) with a set of maximum efficiency circular radiating elements with element dimensions proportional to the annular ring size we obtain the aperture field of FIG. 14A and the array layout of FIG. 14C.

In FIG. 14B, azimuthal cuts of the radiation pattern of the Annular Ring Arrays with Maximum Efficiency Radiating Elements of FIG. 14A is compared with the desired radiation pattern of FIG. 4 (as well as with the radiation pattern of the Array of Maximum Efficiency Annular-Rings of FIG. 13A).

Figure 14D:
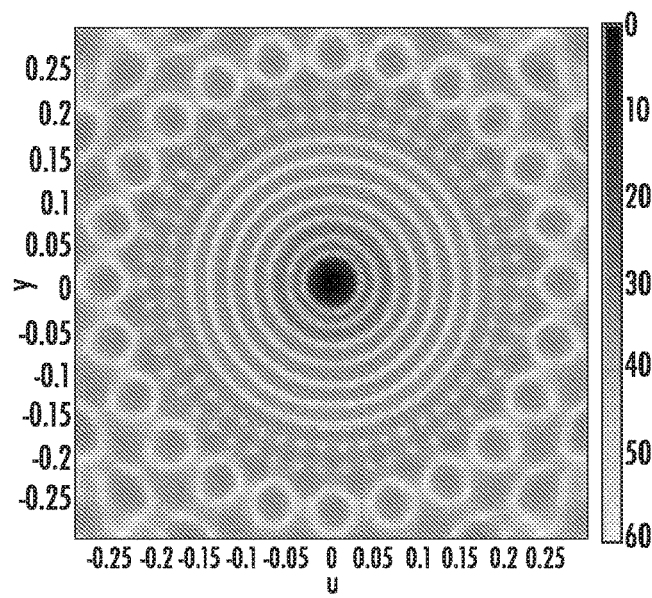
Figure 14E:
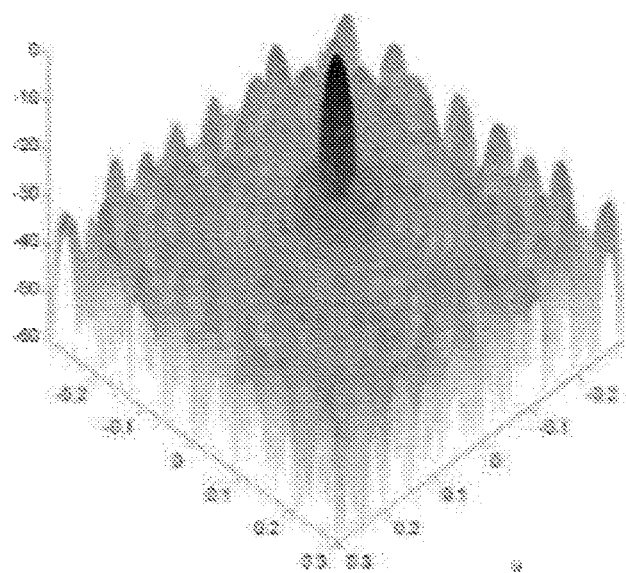

FIG. 14D shows a colour plot of the radiation pattern of the array of FIG. 14A and FIG. 14C; and FIG. 14E; and FIG. 14.F show three-dimensional views of the pattern.

Example C2 (Unconstrained Size—Mid-Centre) [Invention]

FIG. 15 to FIG. 18F relates to the design choice of the annular ring radial centre accordingly to the elementary annulus mid-radius.

Figure 15:
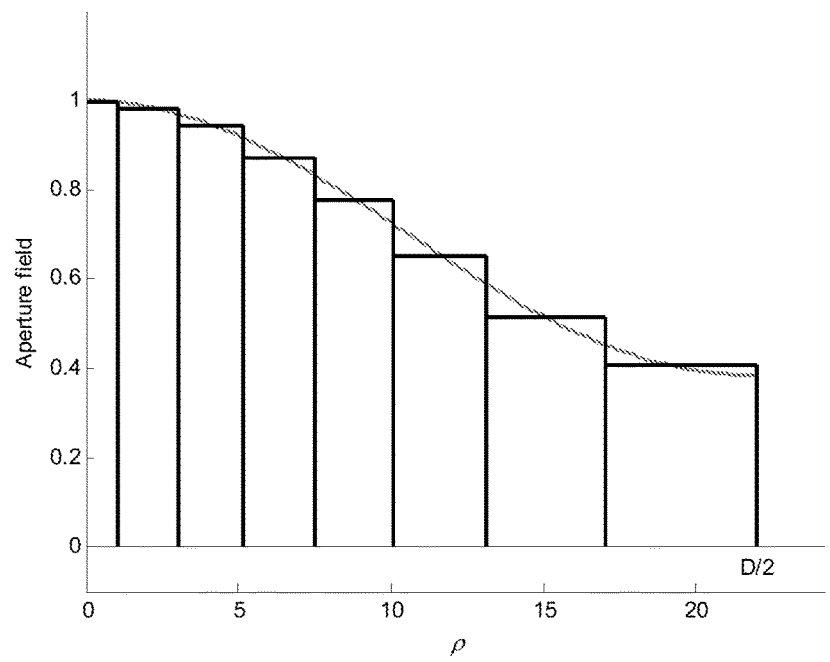
Figure 16:
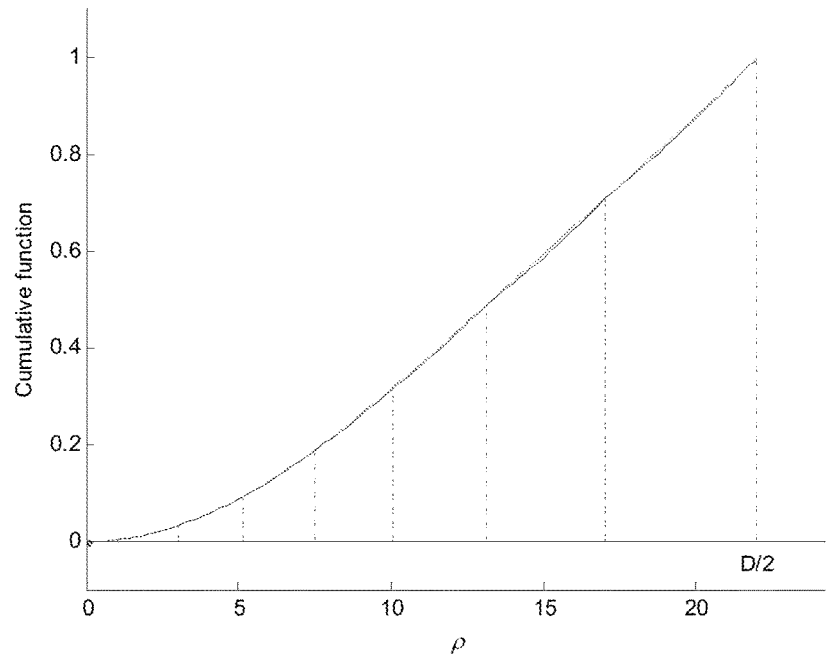

FIG. 15 and FIG. 16 show, respectively, the aperture fields and the cumulative functions of the circular array of maximum efficiency annular rings (in black) and reference circular aperture (in gray).

Figure 17A:
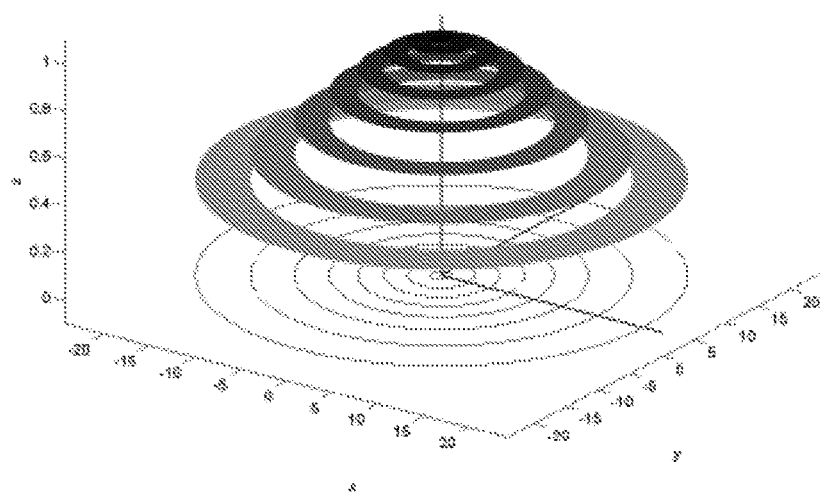

FIG. 17A shows a three-dimensional view of the aperture field of the Array of Maximum Efficiency Annular-Rings.

Figure 17B:
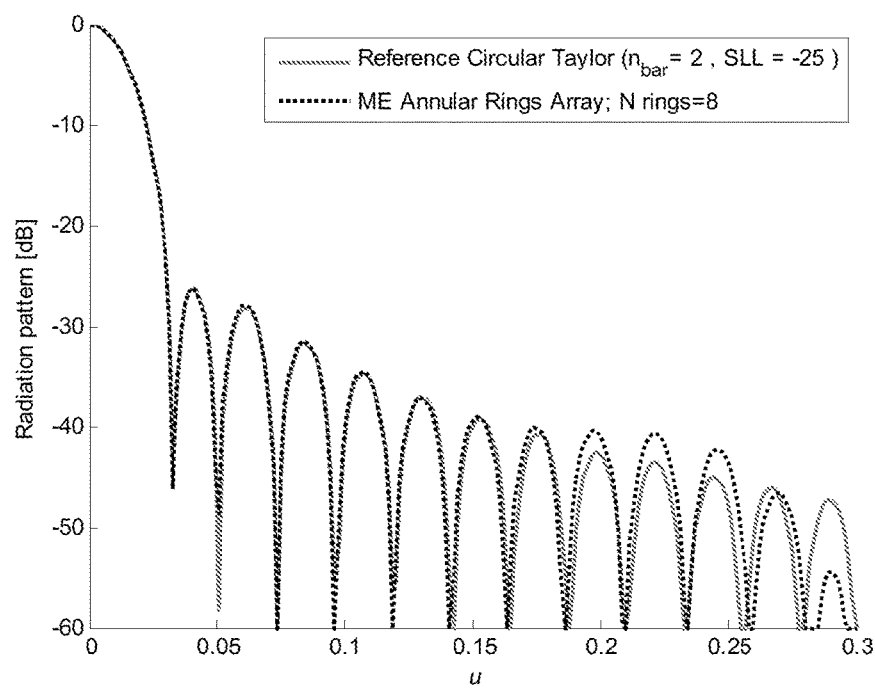

In FIG. 17B, azimuthal cuts of the radiation pattern of the Array of Maximum Efficiency Annular-Rings of FIG. 17A is compared with the desired radiation pattern of FIG. 4.

Figure 18A:
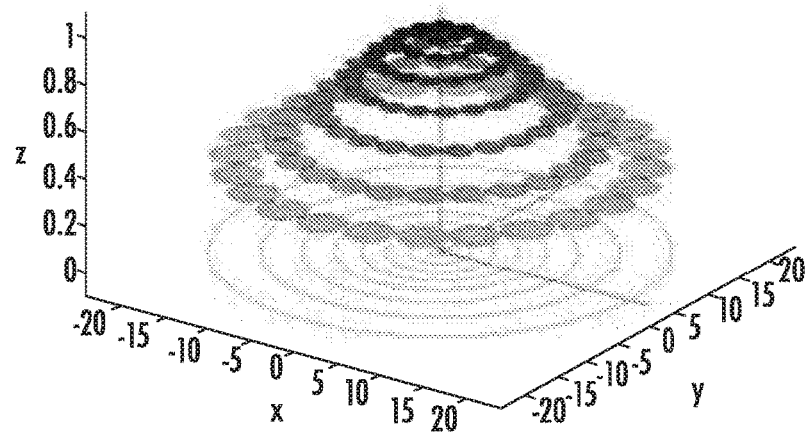
Figure 18B:
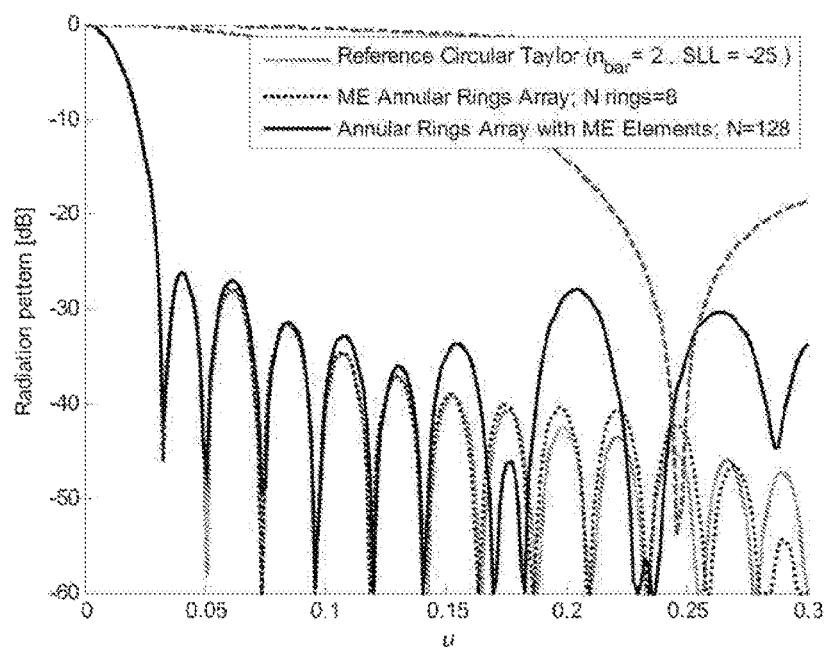
Figure 18C:
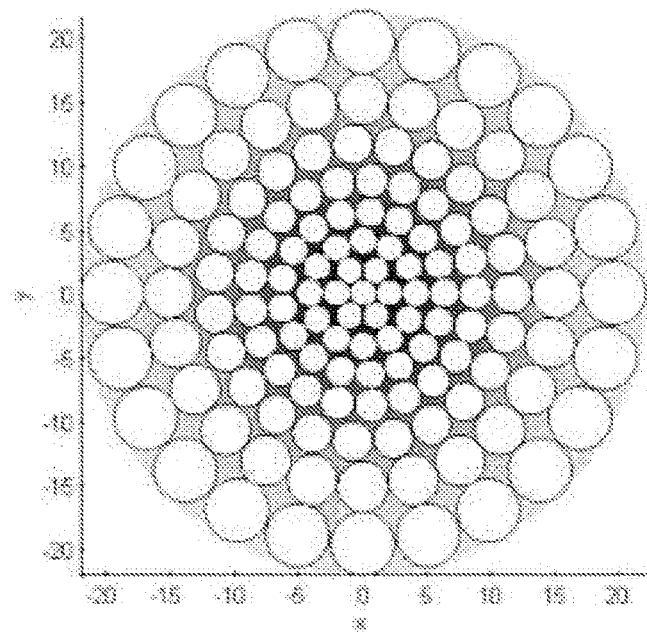

Substituting the continuous maximum efficiency annular-rings (FIG. 17A) with a set of maximum efficiency circular radiating elements with element dimensions proportional to the annular ring size we obtain the aperture field of FIG. 18A and the array layout of FIG. 18C.

In FIG. 18B, azimuthal cuts of the radiation pattern of the Annular Ring Arrays with Maximum Efficiency Radiating Elements of FIG. 18A is compared with the desired radiation pattern of FIG. 4 (as well as with the radiation pattern of the Array of Maximum Efficiency Annular-Rings of FIG. 17A).

Figure 18D:
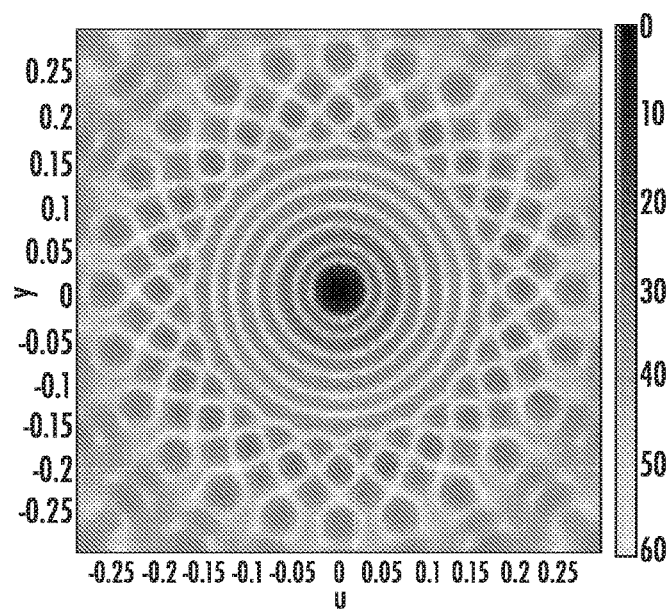
Figure 18E:
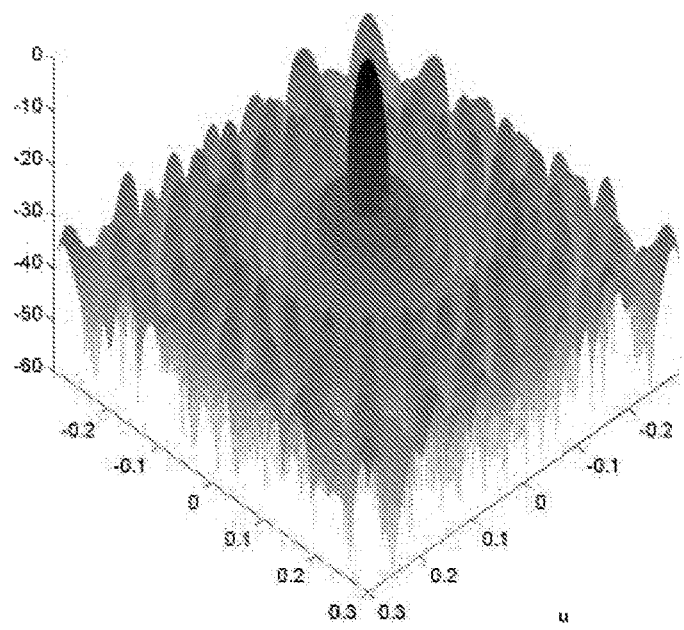
Figure 18F:
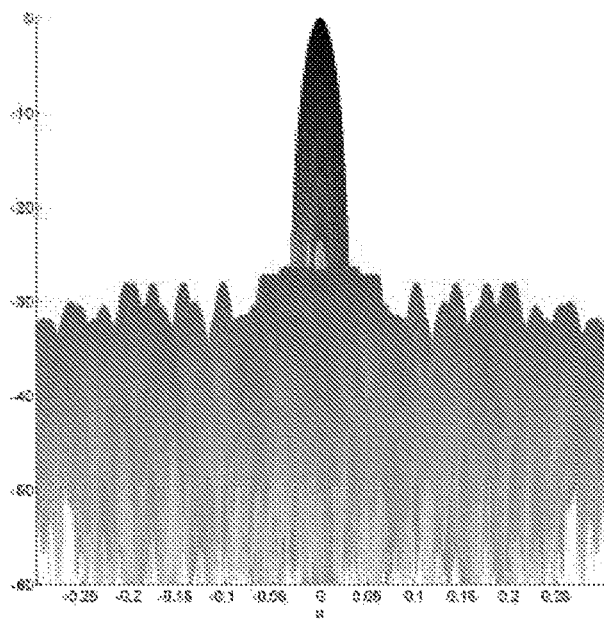

FIG. 18D shows a colour plot of the radiation pattern of the array of FIG. 18A and FIG. 18C; and FIG. 18E; and FIG. 18F show three-dimensional views of the pattern.

Configuration D (Constrained Size) [Invention]

The following design examples refers to the additional constraint of maximum element diameter of 3.4$\lambda$, compatible with antenna requirement of scanning of the beam over the full Earth as seen from a geostationary satellite.

Example D1 (Constrained Size—Cumulative Centre) [Invention]

FIG. 19 to FIG. 21B relates to the design choice of the annulus mid-radius accordingly to the Doyle-like optimality condition on the cumulative function (98).

The first two steps of the procedure are the same of the Example C1 (refer to FIG. 10A and FIG. 10B).

Figure 19:
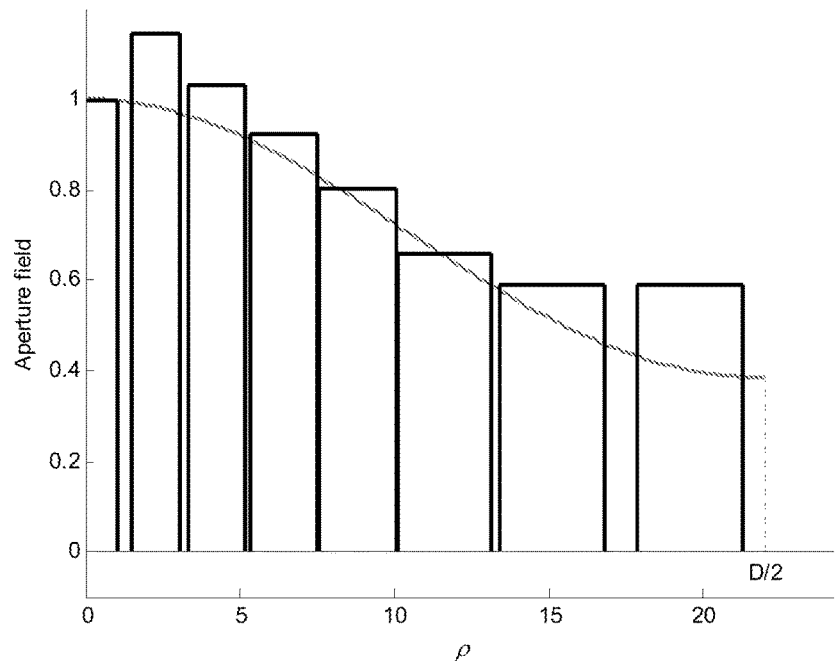
Figure 20:
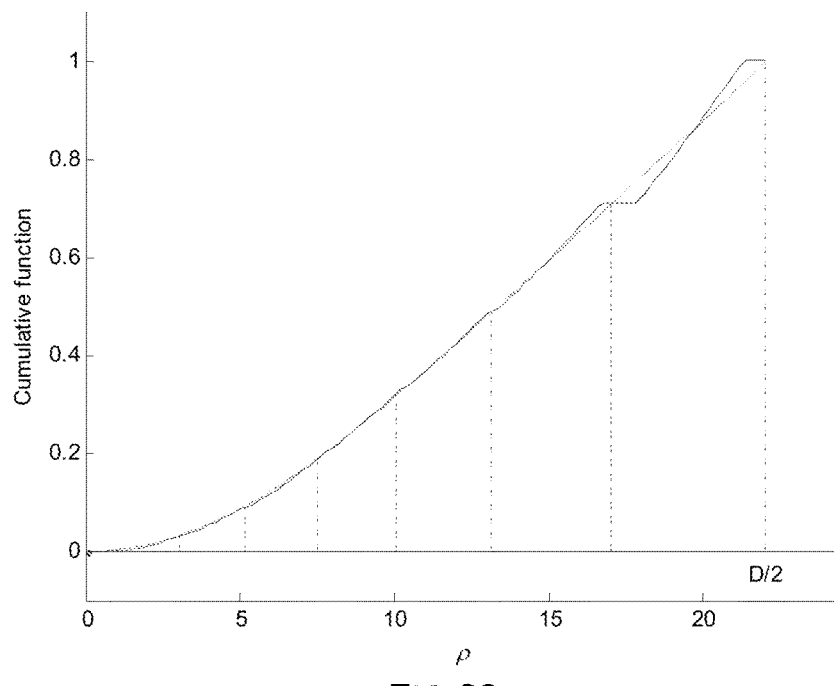

Imposing the additional constraint on the size of the annular ring we obtain, for the array of maximum efficiency annular rings, the aperture fields and the cumulative functions shown in FIG. 19 and FIG. 20, respectively.

Figure 21A:
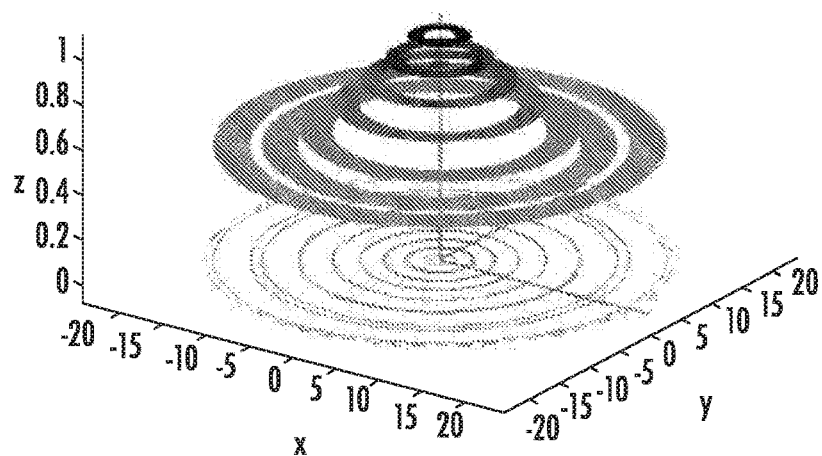

FIG. 21A shows a three-dimensional view of the aperture field of the Array of Maximum Efficiency Annular-Rings of Example D1.

Figure 21B:
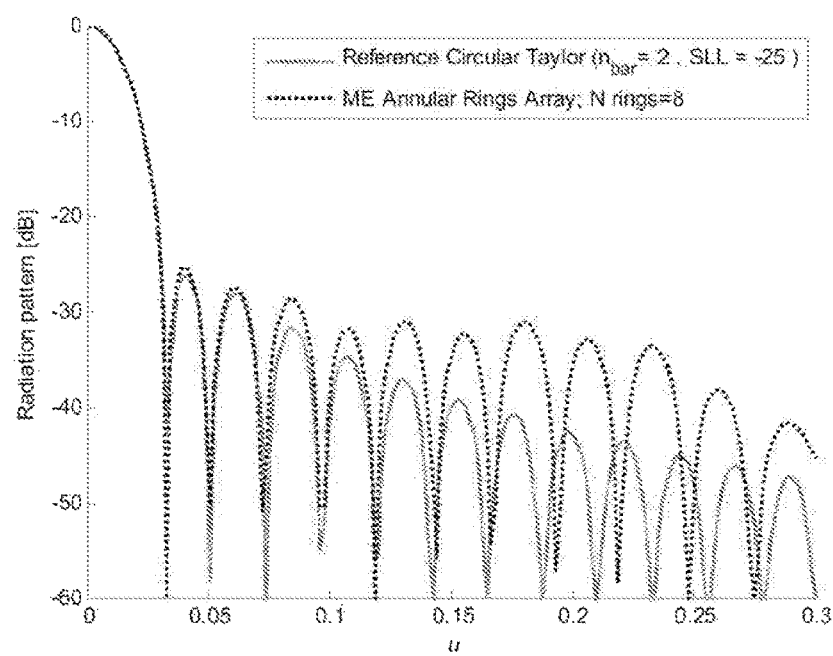

In FIG. 21B, azimuthal cuts of the radiation pattern of the Array of Maximum Efficiency Annular-Rings of FIG. 21A is compared with the desired radiation pattern of FIG. 4.

Substituting the continuous maximum efficiency annular-rings (FIG. 21A) with a set of maximum efficiency circular radiating elements with element dimensions proportional to the annular ring size we obtain the aperture field of FIG. 21A.

In FIG. 21B, azimuthal cuts of the radiation pattern of the Annular Ring Arrays with Maximum Efficiency Radiating Elements of FIG. 21A is compared with the desired radiation pattern of FIG. 4 (as well as with the radiation pattern of the Array of Maximum Efficiency Annular-Rings of FIG. 21A).

Example D2 (Constrained Size—Mid Centre)
[Invention]

FIG. 23 to FIG. 26F relates to the design choice of the annulus mid-radius accordingly to the Doyle-like optimality condition on the cumulative function (98).

The first two steps of the procedure are the same of the Example C2 (refer to FIG. 10A for the first step).

Figure 23:
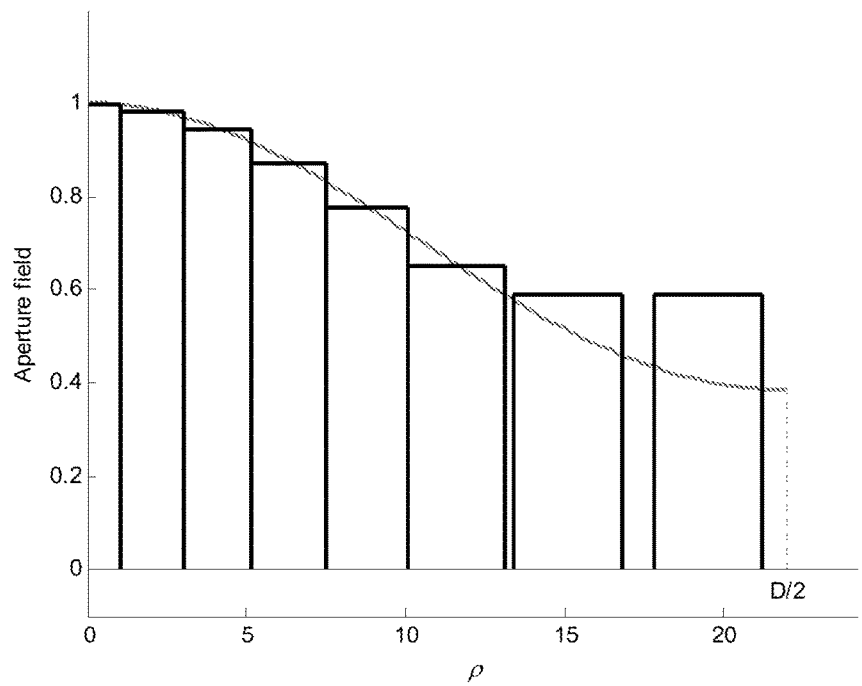
Figure 24:
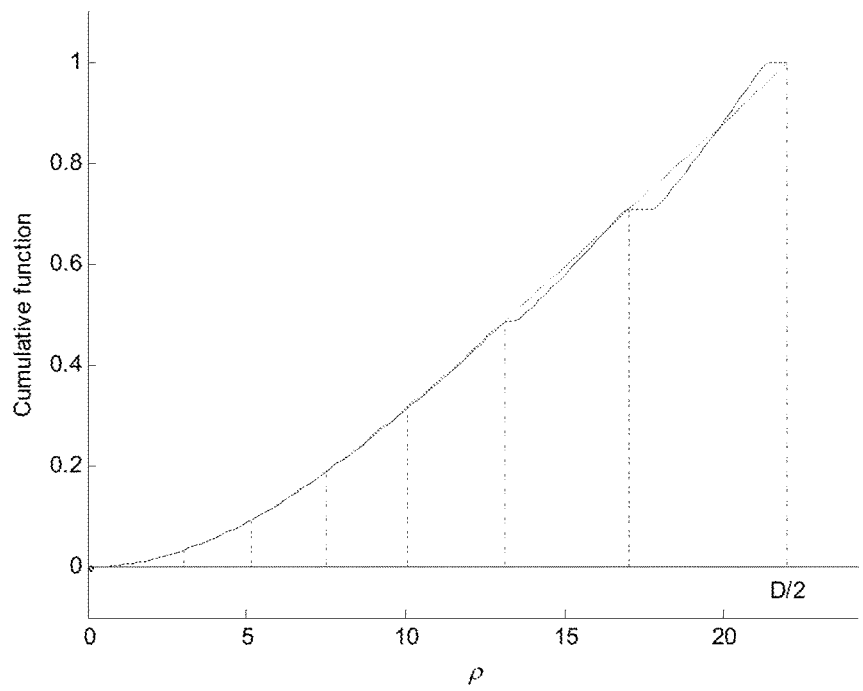

Imposing the additional constraint on the size of the annular ring we obtain, for the array of maximum efficiency annular rings, the aperture fields and the cumulative functions shown in FIG. 23 and FIG. 24, respectively.

Figure 25A:
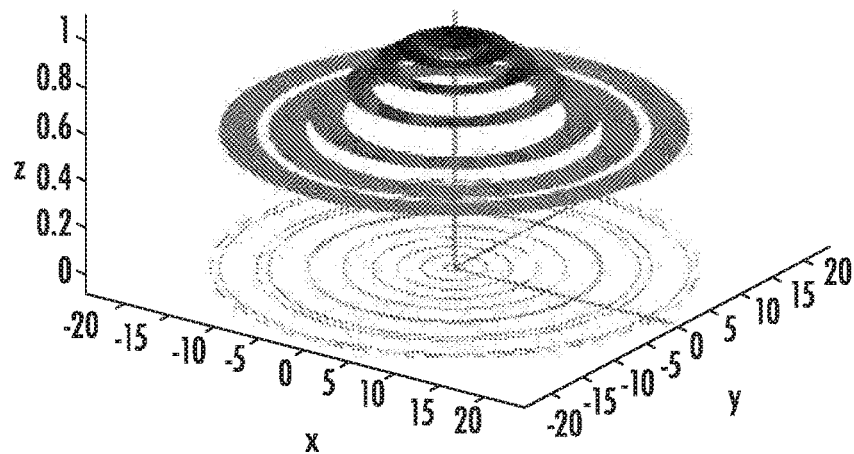

FIG. 25A shows a three-dimensional view of the aperture field of the Array of Maximum Efficiency Annular-Rings of Example D2.

Figure 25B:
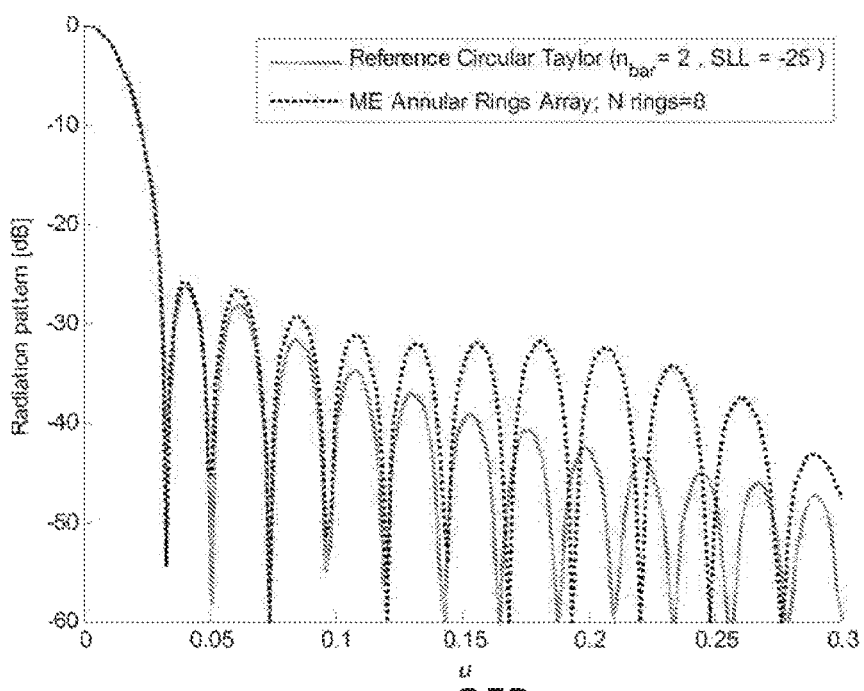

In FIG. 25B, azimuthal cuts of the radiation pattern of the Array of Maximum Efficiency Annular-Rings of FIG. 25A is compared with the desired radiation pattern of FIG. 4.

Figure 26A:
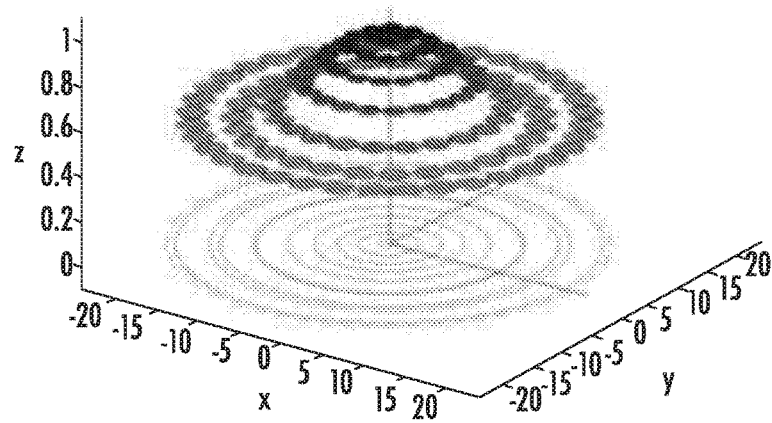
Figure 26B:
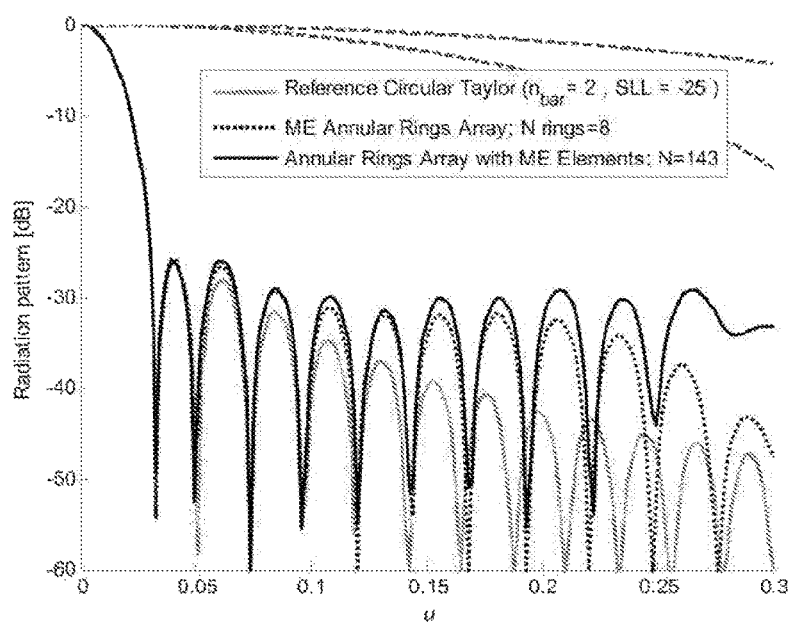
Figure 26C:
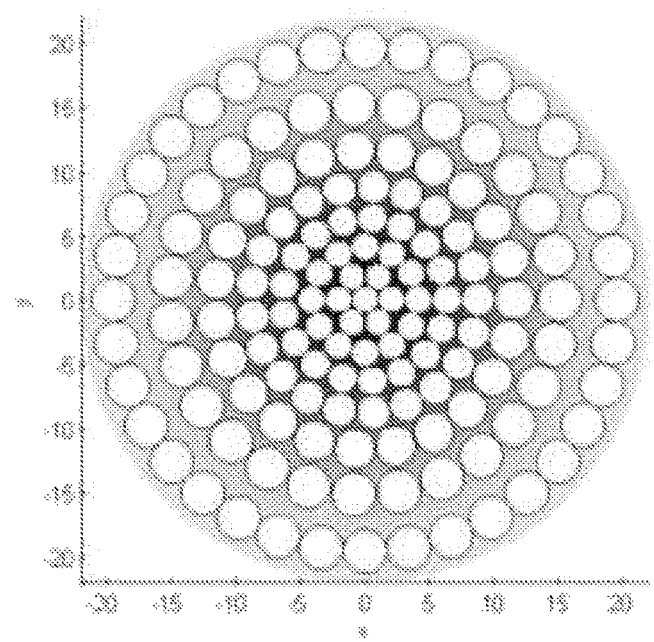

Substituting the continuous maximum efficiency annular-rings (FIG. 25A) with a set of maximum efficiency circular radiating elements with element dimensions proportional to the annular ring size we obtain the aperture field of FIG. 26A and the array layout of FIG. 26C.

In FIG. 26B, azimuthal cuts of the radiation pattern of the Annular Ring Arrays with Maximum Efficiency Radiating Elements of FIG. 26A is compared with the desired radiation pattern of FIG. 4 (as well as with the radiation pattern of the Array of Maximum Efficiency Annular-Rings of FIG. 25A).

Figure 26D:
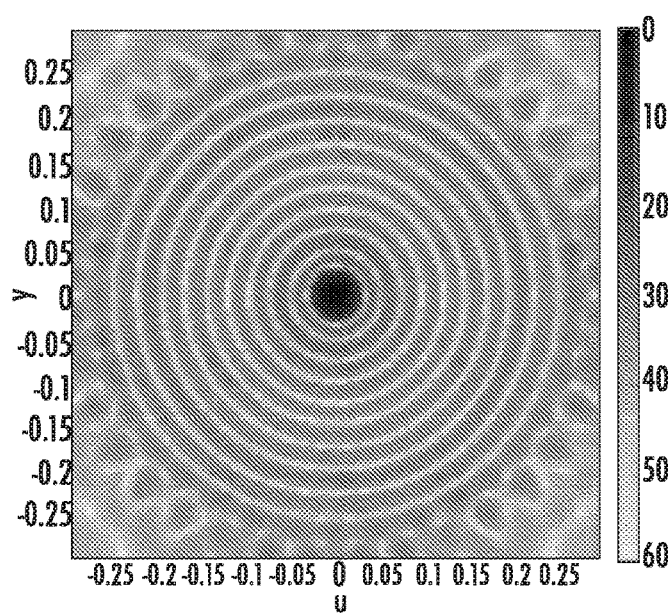
Figure 26E:
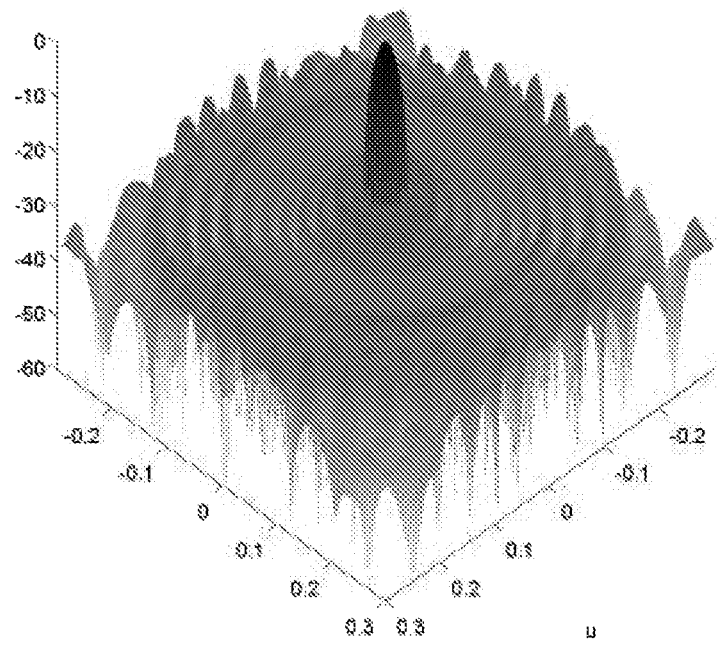

FIG. 26D shows a colour plot of the radiation pattern of the array of FIG. 26A and FIG. 26C; and FIG. 26E; and FIG. 26.F show three-dimensional views of the pattern.

Assessment of Achieved Improvements

Summary table in FIG. 27 compares array configurations known in prior art (Configuration A and B) with the array configurations disclosed in the present invention declaration (Configuration C and D).

The obtained improvements can be quantified in the following key figure of merit:
- 20-40% reduction in number of Radiating Elements (REs)/Power Amplifiers (PAs),
- 1.5-2 dB improvement in directivity and aperture efficiency, The achieved improvements constitute a key competitive advantage of the proposed configurations in terms both of performance and complexity reduction.

Design Example for Space Applications

Based on the described design methods, a preliminary design of an active array antenna has been performed.

Figure 28:
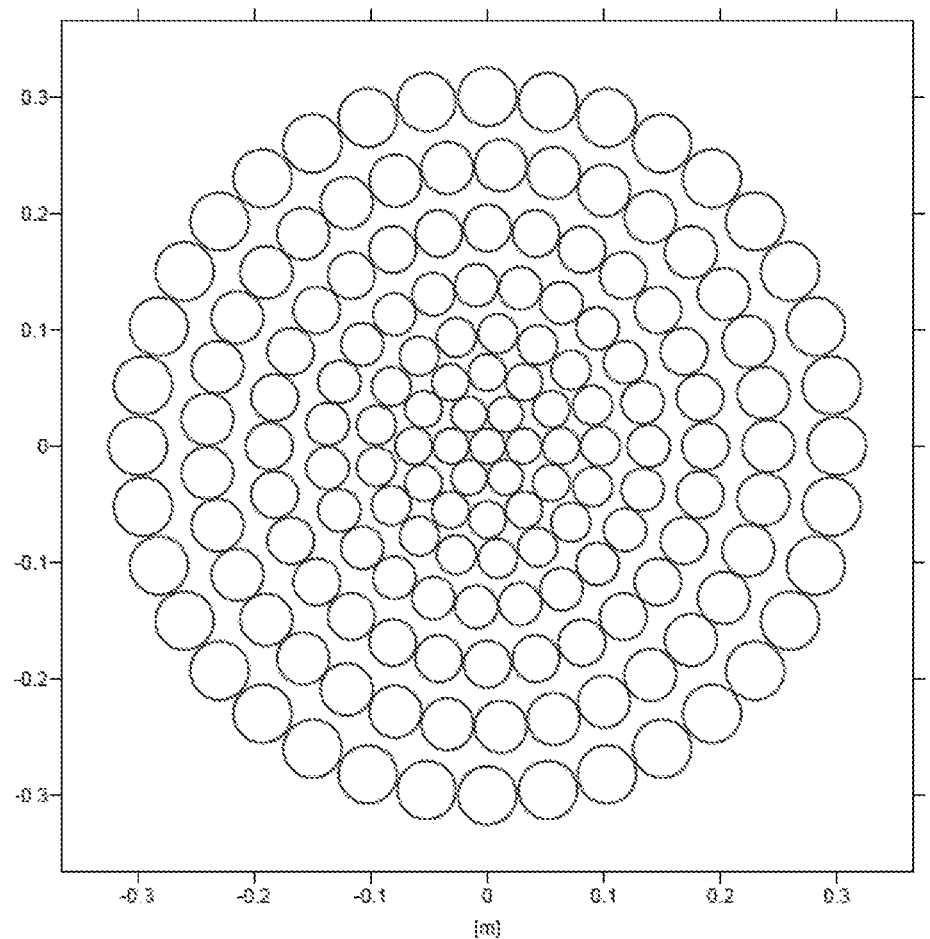

First, the geometry of an aperiodic and sparse front array able to radiate the required spot beam with a beam diameter of 1.75° and a side-lobe level lower than −23 dB has been synthesized. This front array includes 156 high-efficiency very-compact circular hornswith apertures ranging from 30 mm to 50 mm. FIG. 28 shows the front view of the array apertures.

Figure 29:
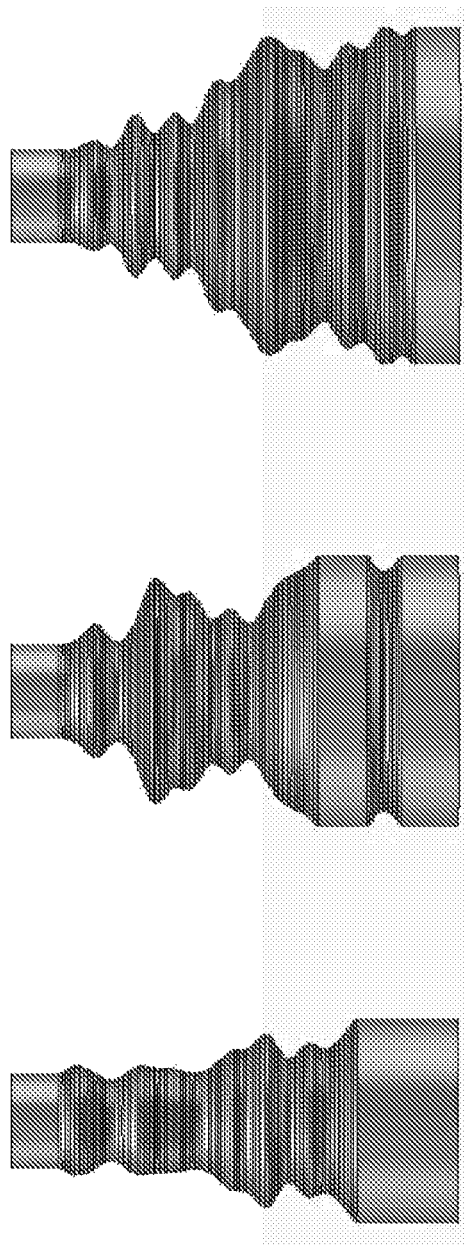

Design of Maximum Efficiency radiating elements has been performed and three of the eight horns are shown in FIG. 29. As all apertures have to be on the same plane to simplify electrical aspects, it follows that all the horns must have the same depth for mechanical reasons.

Figure 30:
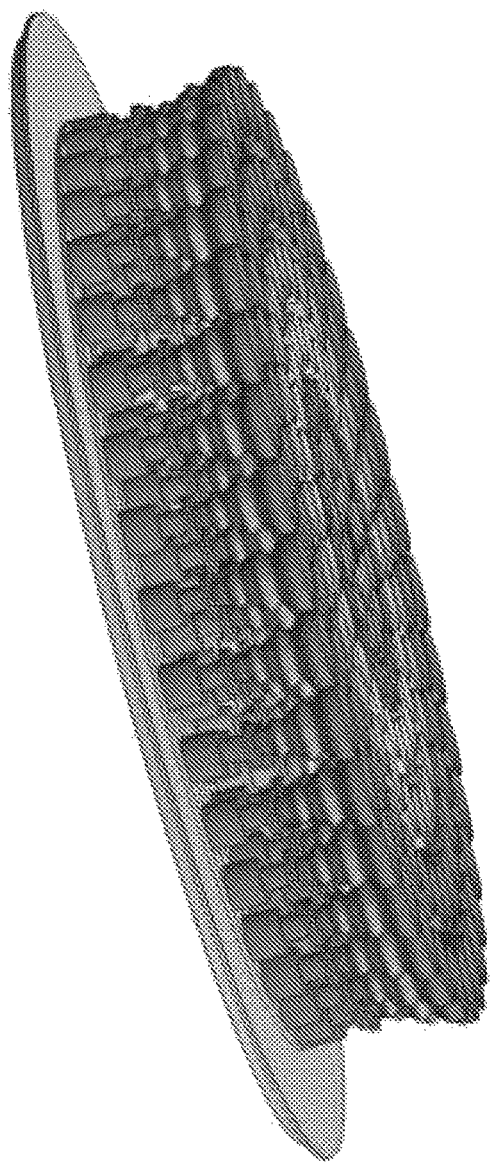

FIG. 30 shows an artistic view of the array of FIG. 28.

LIST OF FIGURES

FIG. 1A illustrates the block diagram of a generic array with amplitude tapering known in prior-art (Configuration A).

FIG. 1B shows a typical layout and amplitude tapering (in gray scale) of a generic array with amplitude tapering known in prior-art (Configuration A).

FIG. 1C illustrates the block diagram of a generic Aperiodic Array with Identical Radiating Elements known in prior-art (Configuration B).

FIG. 1D shows a typical layout of a generic Aperiodic Array with Identical Radiating Elements known in prior-art (Configuration B).

FIG. 2A and FIG. 2B show exemplificative block diagram and array layout, respectively, of an array accordingly to a first embodiment of the invention (Configuration. C).

FIG. 2C and FIG. 2D show exemplificative block diagram and array layout, respectively, of an array accordingly to a second embodiment of the invention (Configuration D).

Figure 3A:
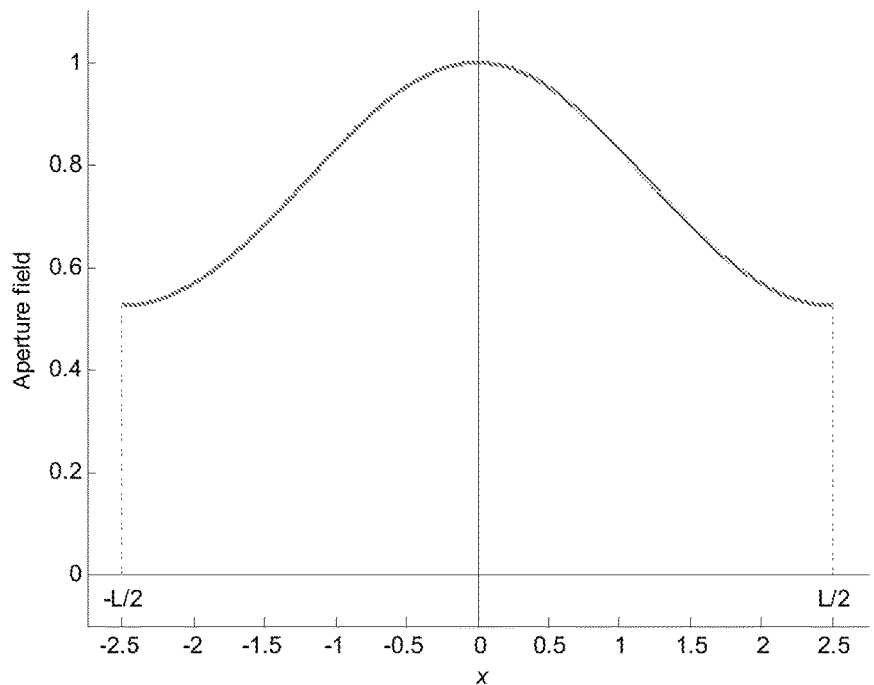

FIG. 3A shows an exemplificative reference linear aperture field related to a linear Taylor amplitude distribution law $(n_{bar}=3; SLL=-20)$.

Figure 3B:
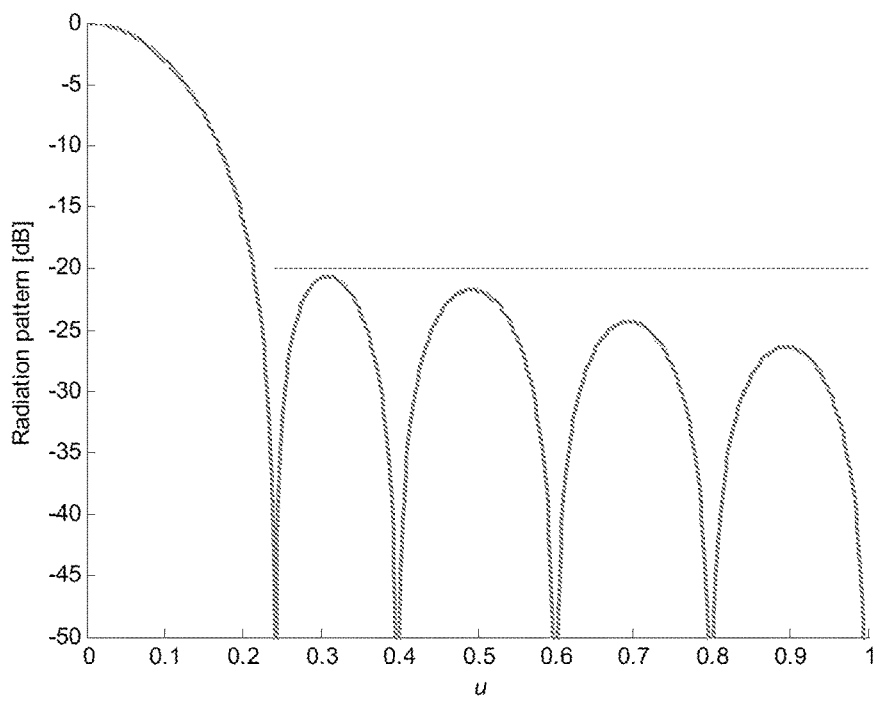

FIG. 3B shows an exemplificative desired radiation pattern achievable with the reference linear aperture field of FIG. 3A.

Figure 3C:
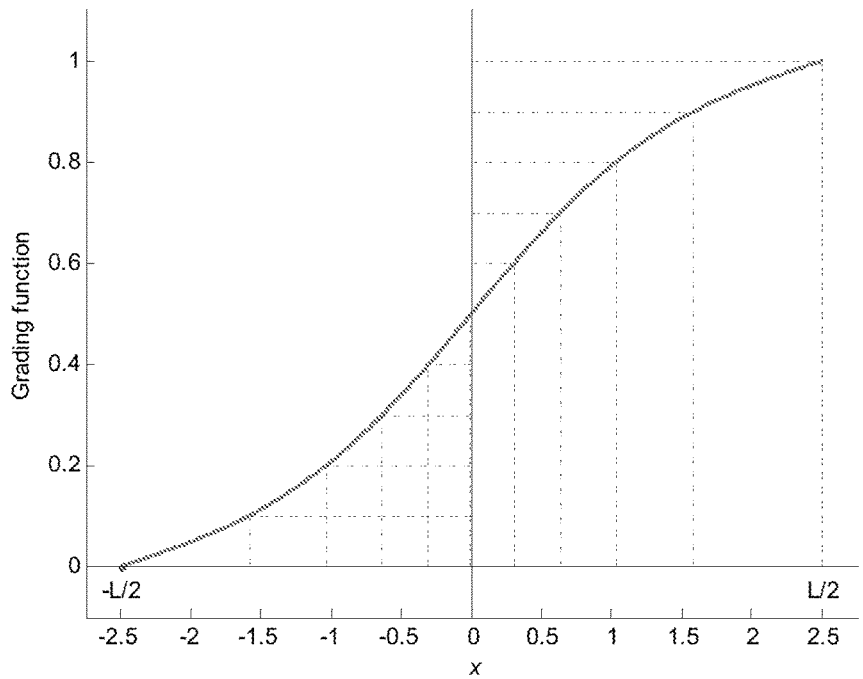

FIG. 3C shows a first step of the linear design procedure consisting in determining the elementary cells by inversion of a "grading function" and a "grading scale".

Figure 3D:
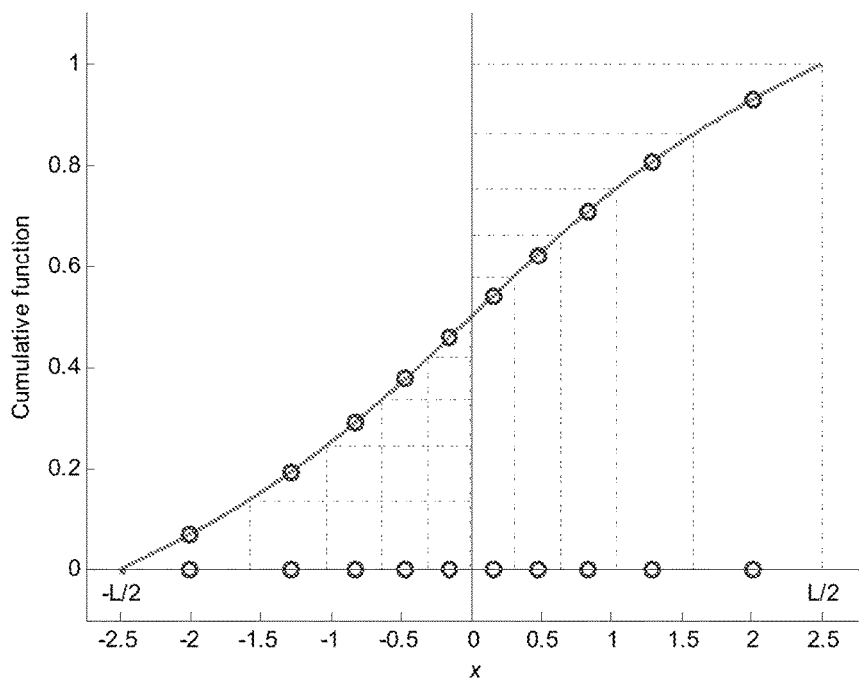

FIG. 3D shows a possible second step of the linear design procedure consisting in determining the element centres accordingly to the cumulative curve.

Figure 3E:
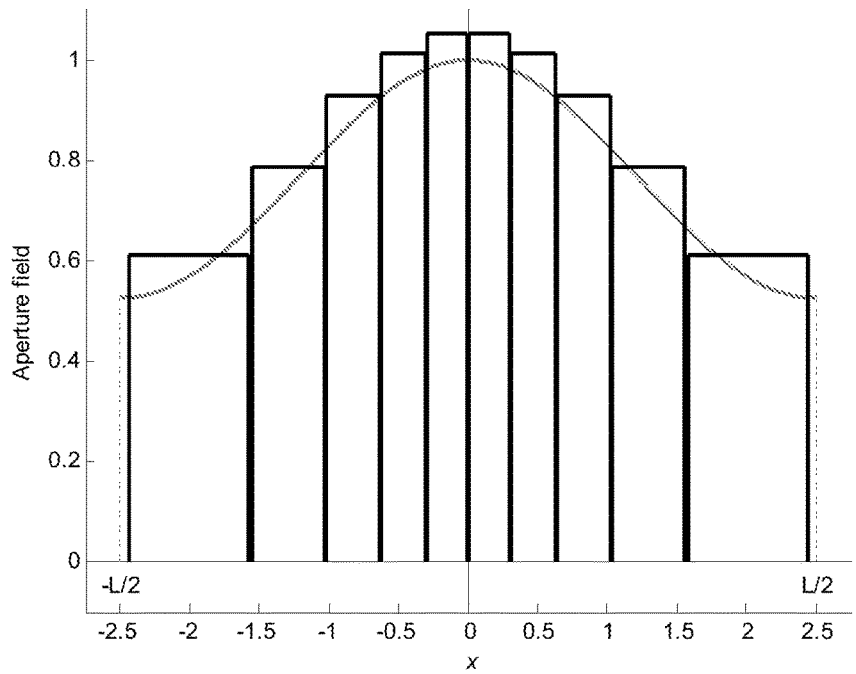
Figure 3F:
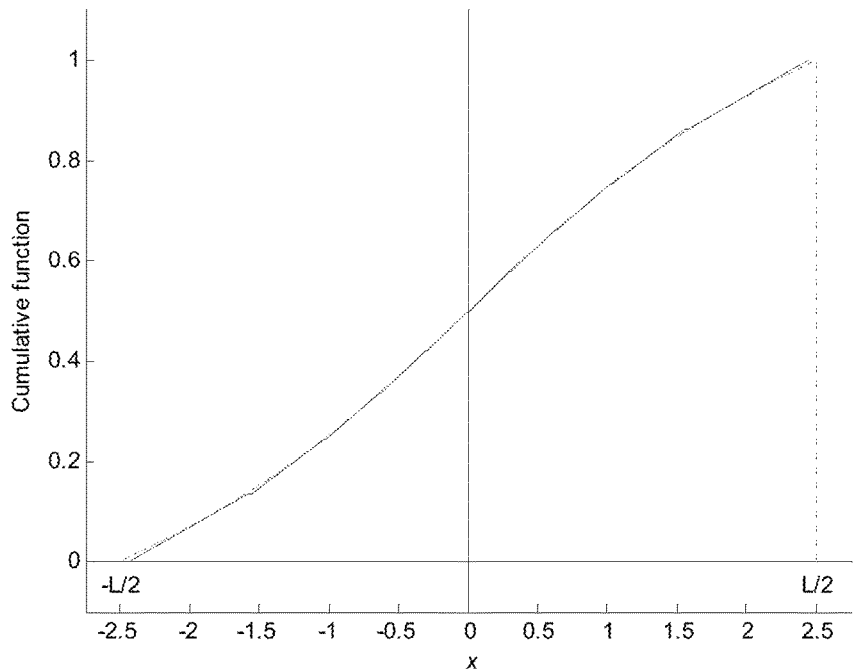

FIG. 3E and FIG. 3F show, respectively, the aperture fields and the cumulative functions of the linear array of maximum efficiency radiating elements (in black) and reference linear aperture (in gray).

Figure 3G:
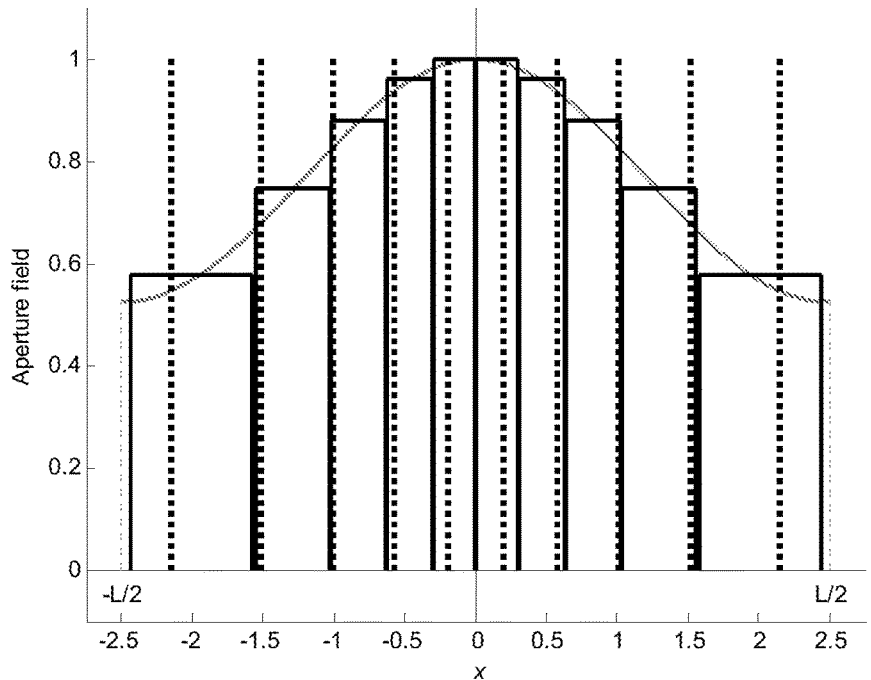
Figure 3H:
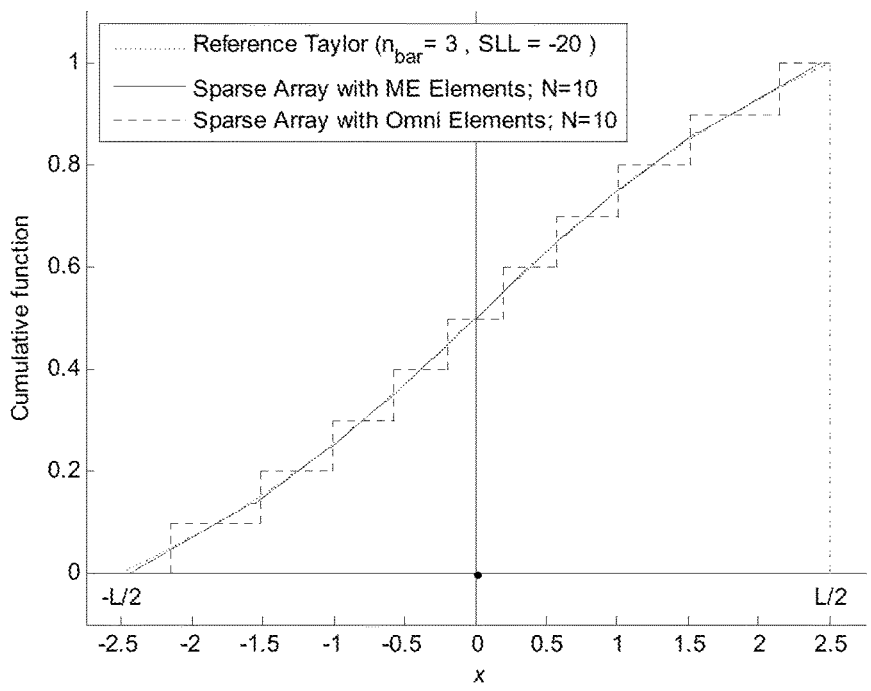

In FIG. 3G and FIG. 3H, the aperture fields and the cumulative functions, respectively, of the linear array of maximum efficiency radiating elements (in black) and reference linear aperture (in gray) are compared with the linear array of omnidirectional radiating elements (dotted line).

Figure 3I:
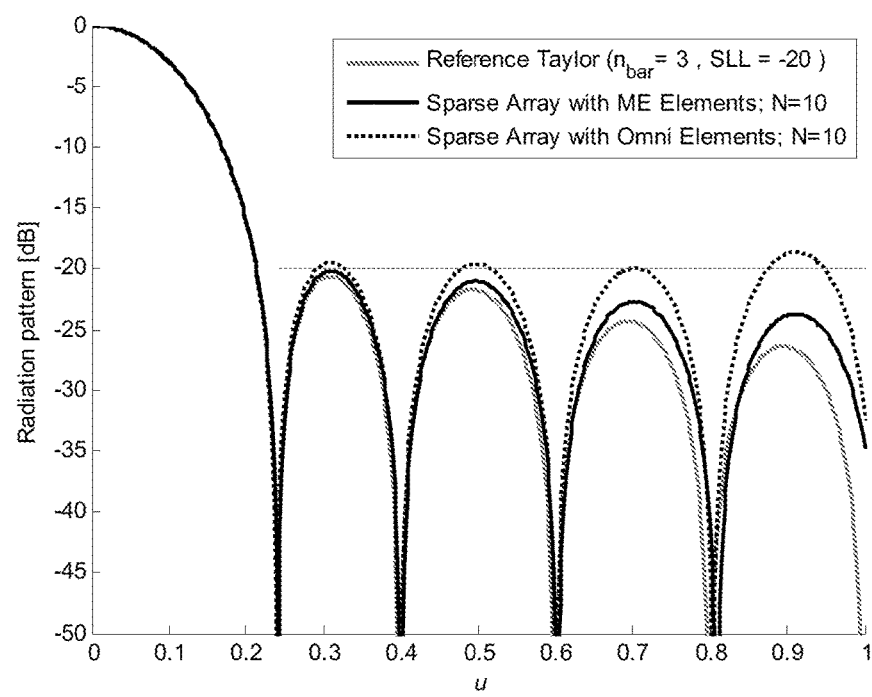

FIG. 3I compares the radiation patterns of the linear array of maximum efficiency radiating elements accordingly to the described design method (in black), the reference linear aperture (in gray) and the linear array of omnidirectional radiating elements accordingly to prior art (dotted line).

FIG. 4 shows a radial cut of an exemplificative circular reference aperture relevant to a circular Taylor amplitude distribution law $(n_{bar}=2; SLL=-25)$.

Figure 5A:
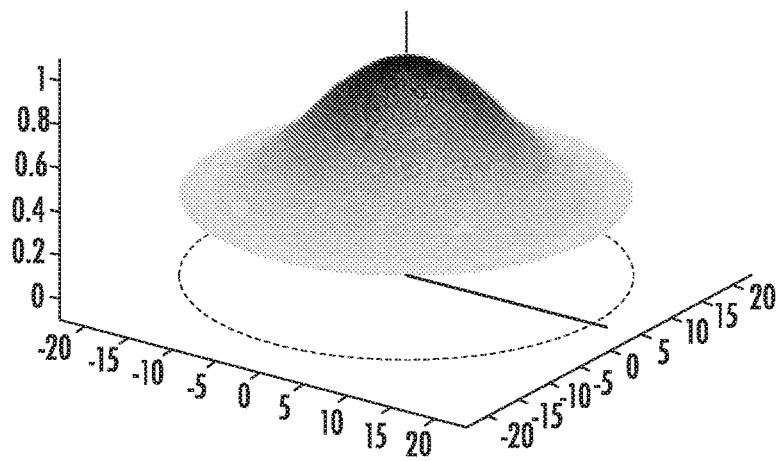
FIG. 5A and FIG. 5C show, respectively, a three-dimensional view and a colour plot of the aperture field of the reference circular aperture.

FIG. 5A shows a three-dimensional view of the aperture field of a reference circular aperture (FIG. 4).

Figure 5B:
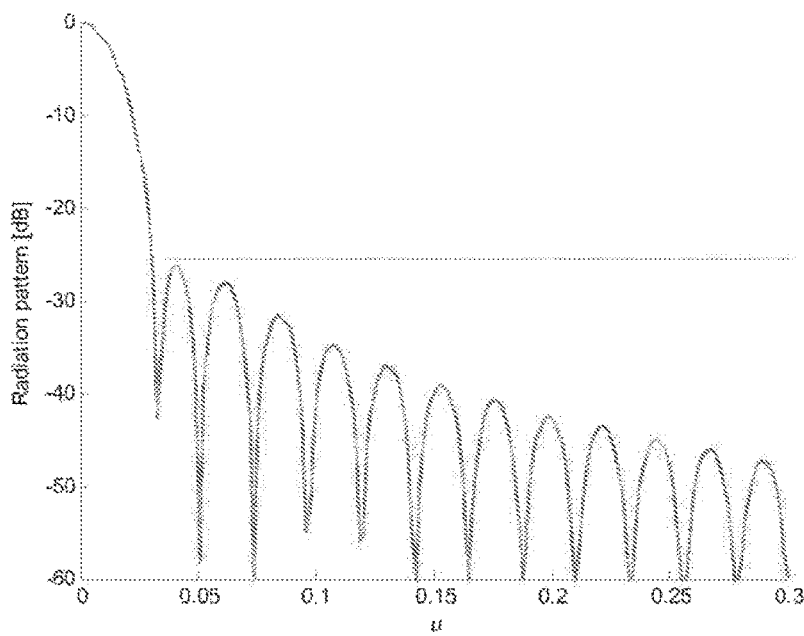
FIG. 5D shows a colour plot of the desired radiation pattern of FIG. 5.
FIG. 5E and FIG. 5F show three-dimensional views of the desired radiation pattern of FIG. 5.

FIG. 5B shows an azimuthal cut of the desired radiation pattern obtained with the reference aperture field of FIG. 4 and FIG. 5A.

Figure 5C:
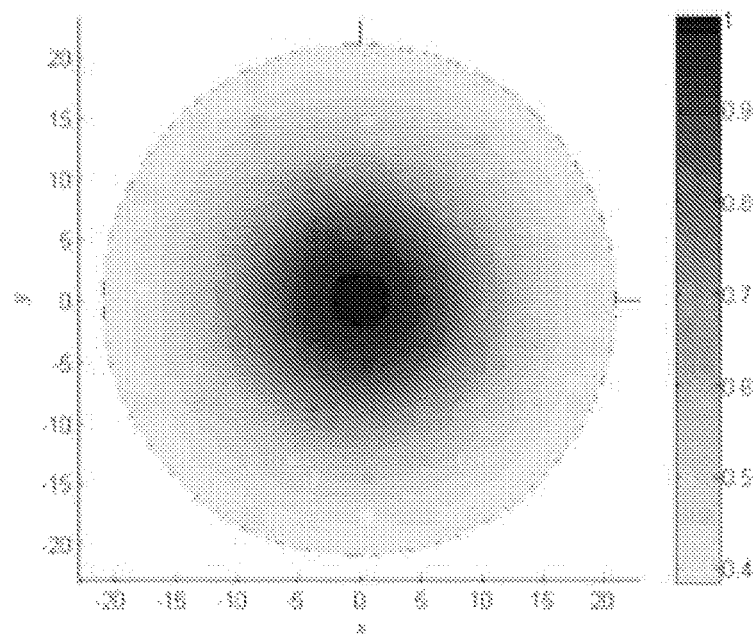

FIG. 5C shows colour plot of the aperture field of the reference circular aperture of of FIG. 4 and FIG. 5A.

Figure 5D:
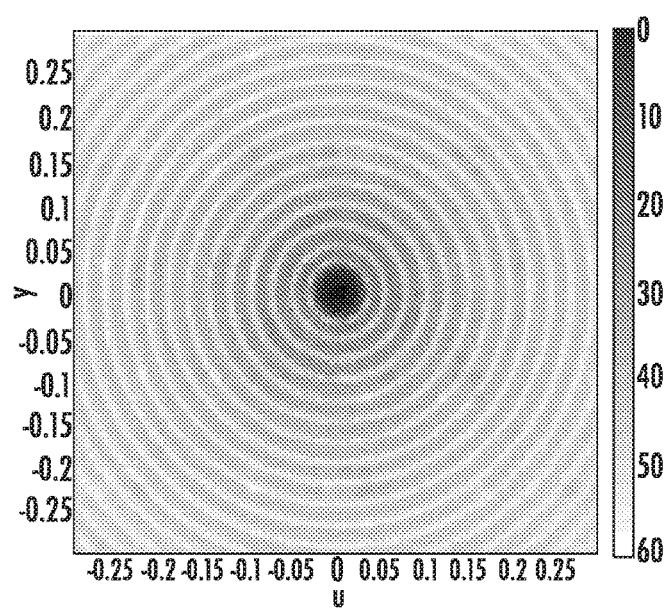

FIG. 5D shows a colour plot of the desired radiation pattern of FIG. 5.

Figure 5E:
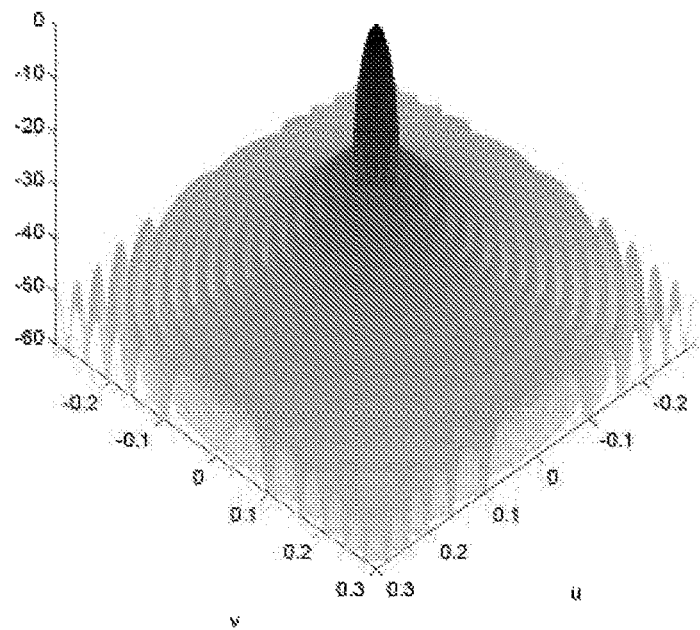
Figure 5F:
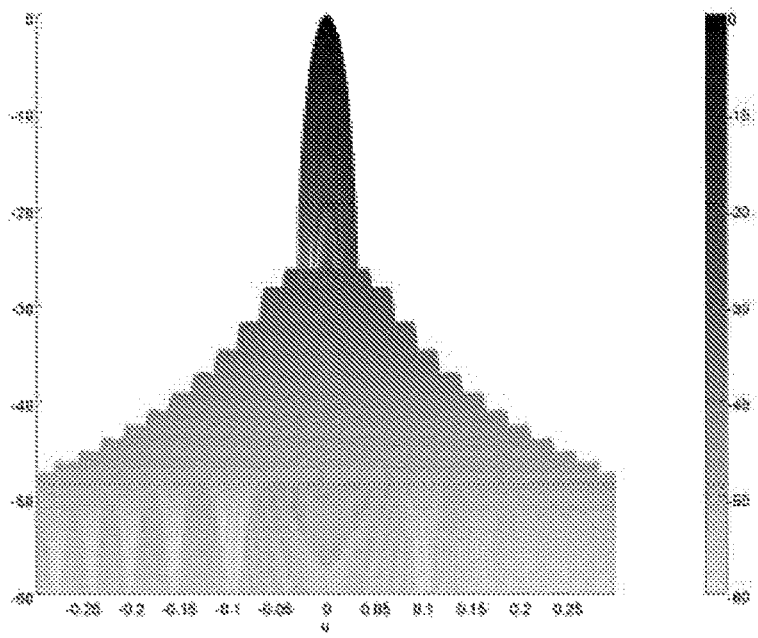

FIG. 5E and FIG. 5F show three-dimensional views of the desired radiation pattern of FIG. 5.

FIG. 6 shows how the reference circular aperture field of FIG. 4 can be radially sampled (at a period of 2λ) to derive the excitations of a ring array of equal sized elements (of 2λ diameter), according to prior art (Configuration A).

FIG. 7A shows a three-dimensional view of the aperture field of the Tapered Annular Rings Array according to prior art (Configuration A).

In FIG. 7B, azimuthal cuts of the radiation pattern of the Tapered Annular Rings Array of FIG. 7A is compared with the desired radiation pattern of FIG. 4.

FIG. 7C shows a colour plot of the aperture field of the Tapered Annular Rings Array according to prior art (Configuration A).

FIG. 7D shows a colour plot of the radiation pattern of the Tapered Annular Rings Array of FIG. 7A and FIG. 7C.

FIG. 7E; and FIG. 7F show three-dimensional views of the radiation pattern of the Tapered Annular Rings Array of FIG. 7A and FIG. 7C.

FIG. 8A shows a three-dimensional view of the aperture field of an exemplificative Aperiodic Array with Identical Radiating Elements disposed on concentric circular rings according to prior art (Configuration B).

In FIG. 8B, azimuthal cuts of the radiation pattern of the Aperiodic Array with Identical Radiating Elements of FIG. 8A is compared with the desired radiation pattern of FIG. 4.

FIG. 8C shows a colour plot view of the aperture field of an exemplificative Aperiodic Array with Identical Radiating Elements disposed on concentric circular rings according to prior art (Configuration B).

Figure 8F:
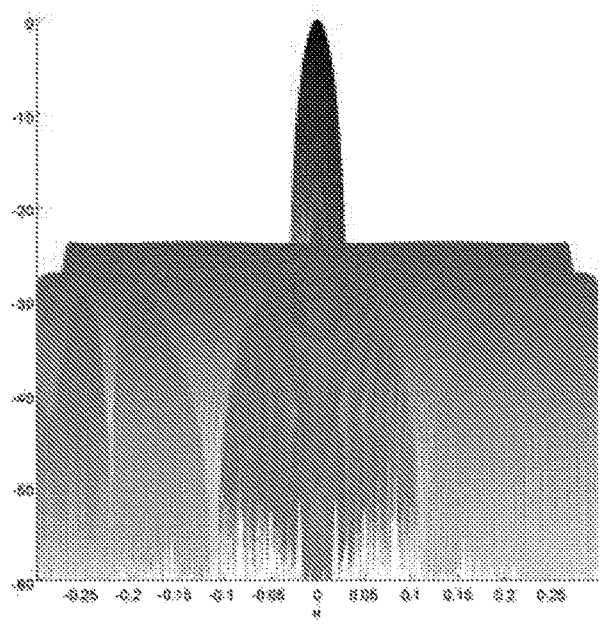

FIG. 8D shows a colour plot of the radiation pattern of the Aperiodic Array with Identical Radiating Elements of FIG. 8A and FIG. 8C. FIG. 8E; and FIG. 8F show three-dimensional views of the radiation pattern of the exemplificative Aperiodic Array with Identical Radiating Elements of FIG. 8A and FIG. 8C.

FIG. 9A shows the basic geometry of a Maximum Efficiency Annular Ring.

FIG. 9B shows how the continuous annular ring of FIG. 9A can be replaced by maximum efficiency circular radiating elements with element dimensions proportional to the annular ring size.

FIG. 10A to FIG. 14F relates to the synthesis of an array according to the first embodiment of the invention (Configuration C, i.e. without any constraint on the maximum radiating element dimensions) together with the design choice of the annular ring radial centre accordingly to the cumulative function optimality condition (Example C1).

FIG. 10A shows a first step of the circular design procedure consisting in determining the elementary annuli by inversion of a "grading function" and a "grading scale".

FIG. 10B shows a possible second step of the circular design procedure consisting in determining the annular rings radial centres accordingly to the cumulative curve.

FIG. 11 and FIG. 12 show, respectively, the aperture fields and the cumulative functions of the array of maximum efficiency annular rings (in black) and reference circular aperture (in gray).

FIG. 13A shows a three-dimensional view of the aperture field of the Array of Maximum Efficiency Annular-Rings.

In FIG. 13B, azimuthal cuts of the radiation pattern of the Array of Maximum Efficiency Annular-Rings of FIG. 13A is compared with the desired radiation pattern of FIG. 4.

FIG. 14A shows the aperture field of an exemplificative array according to the first embodiment (Configuration C) obtained substituting the continuous maximum efficiency annular-rings of FIG. 13A with a set of maximum efficiency circular radiating elements with element dimensions proportional to the annular ring size.

In FIG. 14B, azimuthal cuts of the radiation pattern of the Annular Ring Arrays with Maximum Efficiency Radiating Elements of FIG. 14A is compared with the desired radiation pattern of FIG. 4 (as well as with the radiation pattern of the Array of Maximum Efficiency Annular-Rings of FIG. 13A).

FIG. 14C shows the layout of an exemplificative array according to the first embodiment (Configuration C).

FIG. 14D shows a colour plot of the radiation pattern of the array of FIG. 14A and FIG. 14C.

Figure 14F:
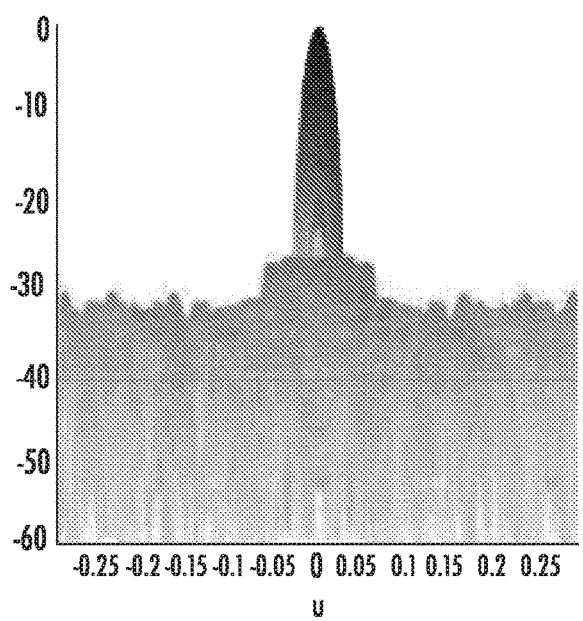

FIG. 14E; and FIG. 14F show three-dimensional views of the pattern of the array of FIG. 14A and FIG. 14C.

FIG. 15 to FIG. 18F relates to the synthesis of an array according to the first embodiment of the invention (Configuration C, i.e. without any constraint on the maximum radiating element dimensions) together with the design choice of annular ring radial centre accordingly to the elementary annulus mid-radius (Example C2).

FIG. 15 and FIG. 15 show, respectively, the aperture fields and the cumulative functions of the circular array of maximum efficiency annular rings (in black) and reference circular aperture (in gray).

FIG. 17A shows a three-dimensional view of the aperture field of the Array of Maximum Efficiency Annular-Rings.

In FIG. 17B, azimuthal cuts of the radiation pattern of the Array of Maximum Efficiency Annular-Rings of FIG. 17A is compared with the desired radiation pattern of FIG. 4.

FIG. 18A shows the aperture field of an exemplificative array according to the first embodiment (Configuration C) obtained substituting the continuous maximum efficiency annular-rings of FIG. 17A with a set of maximum efficiency circular radiating elements with element dimensions proportional to the annular ring size.

In FIG. 18B, azimuthal cuts of the radiation pattern of the Annular Ring Arrays with Maximum Efficiency Radiating Elements of FIG. 18A is compared with the desired radiation pattern of FIG. 4 (as well as with the radiation pattern of the Array of Maximum Efficiency Annular-Rings of FIG. 17A).

FIG. 18C shows the layout of a second exemplificative array according to the first embodiment (Configuration D).

FIG. 18D shows a colour plot of the radiation pattern of the array of FIG. 18A and FIG. 18C.

FIG. 18E; and FIG. 18F show three-dimensional views of the pattern of the array of FIG. 18A and FIG. 18C.

FIG. 19 to FIG. 21B relates to the synthesis of an array according to the second embodiment of the invention (Configuration D, i.e. with the additional constraint of maximum element diameter: 3.4λ in the example) together with the design choice of the annular ring radial centre accordingly to the cumulative function optimality condition (Example D1).

FIG. 19 and FIG. 20 show, respectively, the aperture fields and the cumulative functions of the array of maximum efficiency annular rings (in black) and reference circular aperture (in gray).

FIG. 21A shows a three-dimensional view of the aperture field of the Array of Maximum Efficiency Annular-Rings.

In FIG. 21B, azimuthal cuts of the radiation pattern of the Array of Maximum Efficiency Annular-Rings of FIG. 21A is compared with the desired radiation pattern of FIG. 4.

Figure 22A:
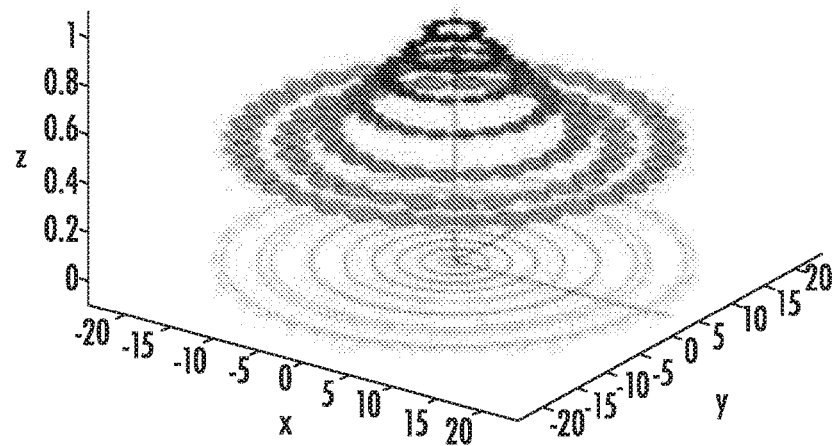

FIG. 22A shows the aperture field of an exemplificative array according to the second embodiment (Configuration D) obtained substituting the continuous maximum efficiency annular-rings of FIG. 21A with a set of maximum efficiency circular radiating elements with element dimensions proportional to the annular ring size.

Figure 22B:
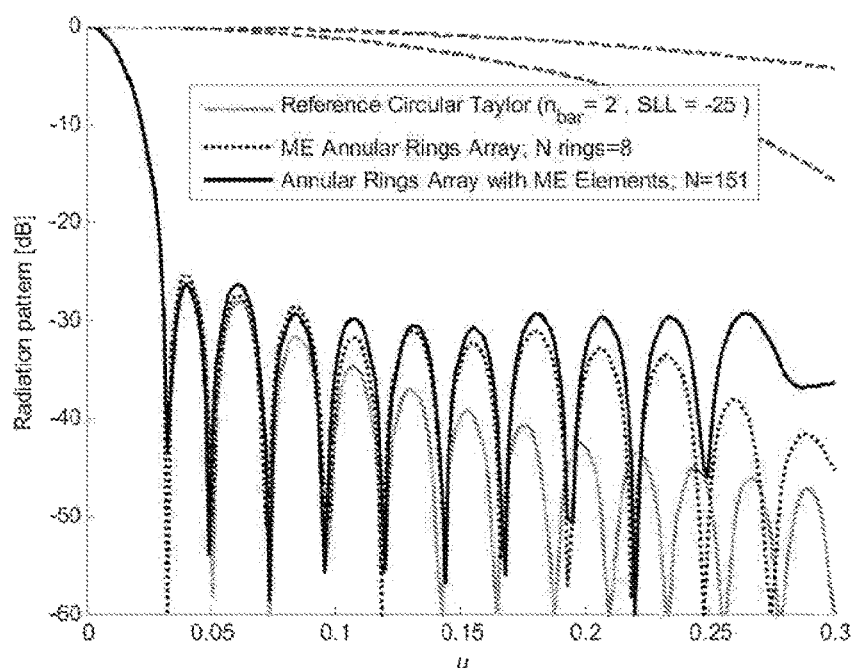

In FIG. 22B, azimuthal cuts of the radiation pattern of the Annular Ring Arrays with Maximum Efficiency Radiating Elements of FIG. 22A is compared with the desired radiation pattern of FIG. 4 (as well as with the radiation pattern of the Array of Maximum Efficiency Annular-Rings of FIG. 21A).

Figure 22C:
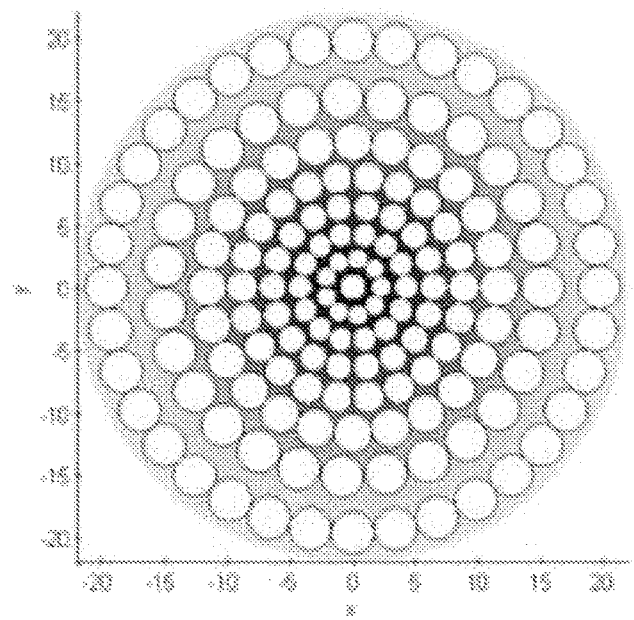

FIG. 22C shows the layout of an exemplificative array according to the second embodiment (Configuration D).

Figure 22D:
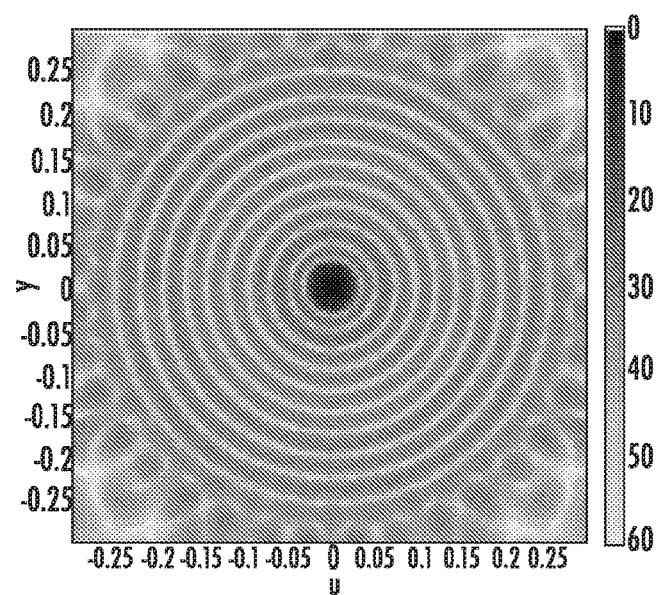

FIG. 22D shows a colour plot of the radiation pattern of the array of FIG. 22A and FIG. 22C.

Figure 22E:
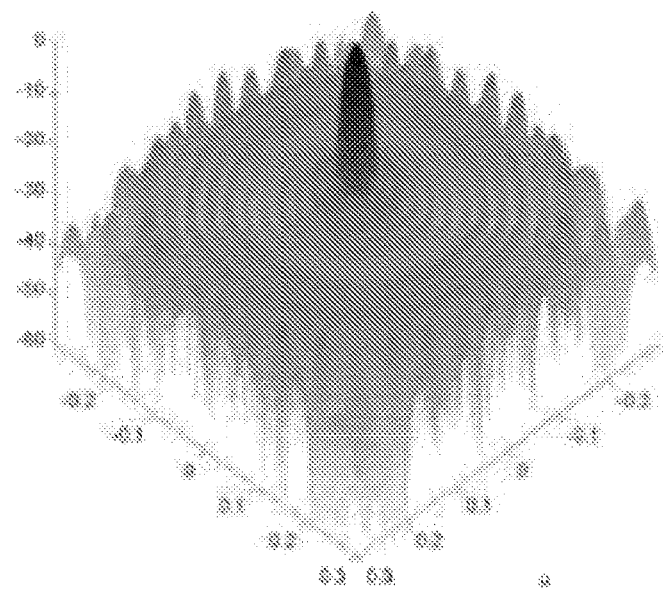
Figure 22F:
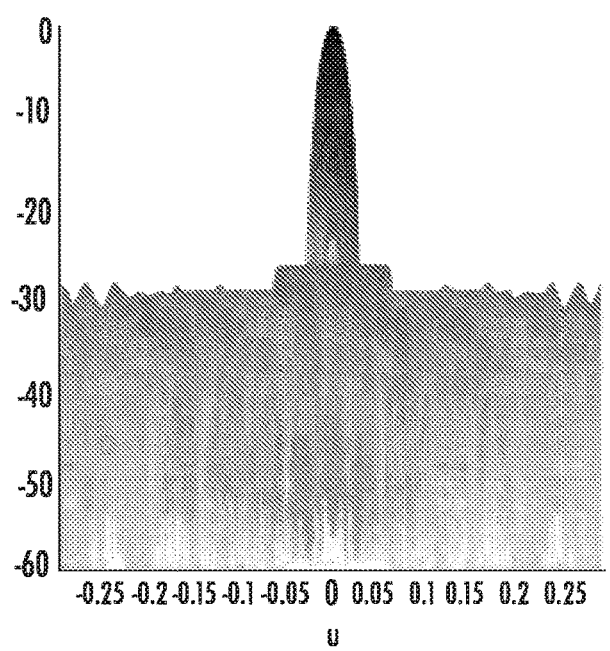

FIG. 22E; and FIG. 22F show three-dimensional views of the pattern of the array of FIG. 22A and FIG. 22C.

FIG. 23 to FIG. 26F relates to the synthesis of an array according to the second embodiment of the invention (Configuration D, i.e. with the additional constraint of maximum element diameter: 3.4λ in the example) together with the design choice of annular ring radial centre accordingly to the elementary annulus mid-radius (Example D2).

FIG. 23 and FIG. 24 show, respectively, the aperture fields and the cumulative functions of the array of maximum efficiency annular rings (in black) and reference circular aperture (in gray).

FIG. 25A shows a three-dimensional view of the aperture field of the Array of Maximum Efficiency Annular-Rings.

In FIG. 25B, azimuthal cuts of the radiation pattern of the Array of Maximum Efficiency Annular-Rings of FIG. 25A is compared with the desired radiation pattern of FIG. 4.

FIG. 26A shows the aperture field of an exemplificative array according to the second embodiment (Configuration D) obtained substituting the continuous maximum efficiency annular-rings of FIG. 25A with a set of maximum efficiency circular radiating elements with element dimensions proportional to the annular ring size.

In FIG. 26B, azimuthal cuts of the radiation pattern of the Annular Ring Arrays with Maximum Efficiency Radiating Elements of FIG. 26A is compared with the desired radiation pattern of FIG. 4 (as well as with the radiation pattern of the Array of Maximum Efficiency Annular-Rings of FIG. 25A).

FIG. 26C shows the layout of an exemplificative array according to the second embodiment (Configuration D).

FIG. 26D shows a colour plot of the radiation pattern of the array of FIG. 26A and FIG. 26C.

Figure 26F:
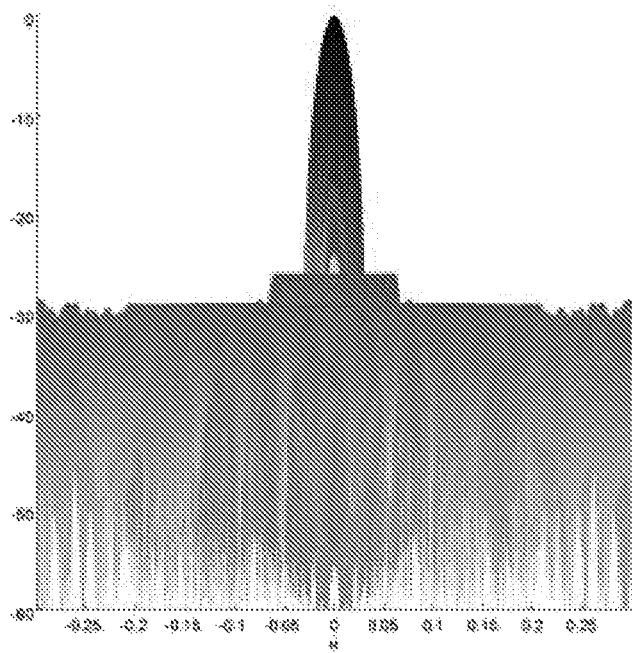

FIG. 26E; and FIG. 26F show three-dimensional views of the pattern of the array of FIG. 26A and FIG. 26C.

FIG. 27 summarizes performances of the reported design examples.

FIG. 28 shows the front view of an array, designed accordingly to the described design methods, required to radiate spot beams with a beam diameter of 1.75° and a side-lobe level lower than −23 dB. The array includes 156 high-efficiency very-compact circular hornswith apertures ranging from 30 mm to 50 mm.

FIG. 29 reports the exemplificative design of three of the eight horns with Maximum Efficiency as required for the array of FIG. 28. As all apertures have to be on the same plane to simplify electrical aspects, it follows that all the horns must have the same depth for mechanical reasons.

FIG. 30 shows an exemplificative three-dimensional drawing of the array of FIGS. 28 and 29.

Figure 31A:
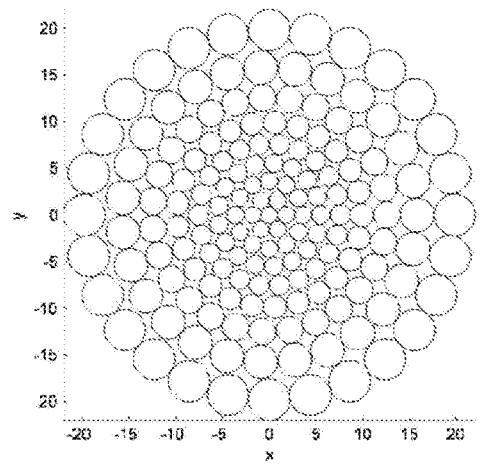
Figure 31B:
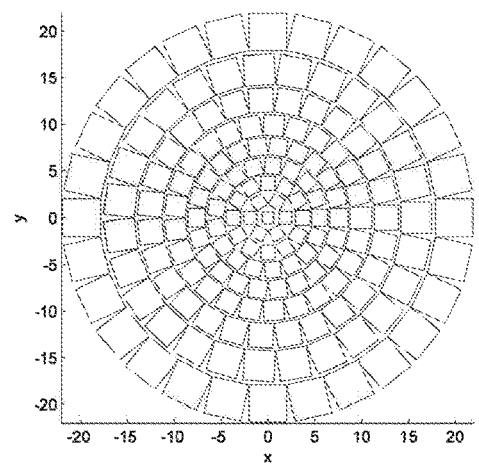
Figure 31C:
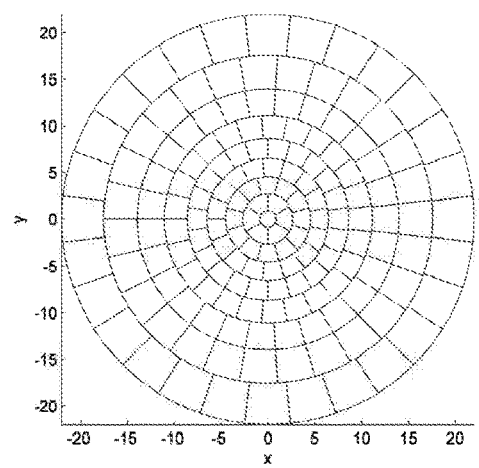

FIG. 31A to FIG. 31C show exemplificative layouts of arrays designed accordingly to the present invention and employing radiating elements with different apertures (i.e. circular—FIG. 31A, square—FIG. 31B and annulus sector—FIG. 31C)

REFERENCES

[1] R. J. Mailloux, *Phased Array Antenna Handbook*, 2nd Edition, Artech House, 2005, pp. 109-184

[2] H. Unz, "Linear arrays with arbitrarily distributed elements", IRE Transactions on Antennas and Propagation, Vol. 8, pp. 222-223, March 1960.

[3] M. Skolnik, G. Nemhauser, J. Sherman III, "Dynamic programming applied to unequally spaced arrays", IEEE Transactions on Antennas and Propagation, 12, 1, pp. 35-43, 1964.

[4] A. Ishimaru, Y.-S. Chen, "Thinning and broadbanding antenna arrays by unequal spacings", IEEE Transactions on Antennas and Propagation, 13, 1, pp. 34-42, 1965.

[5] R. E. Willey, "Space Tapering of Linear and Planar Arrays", IRE Transactions on Antenna and Propagation, 10, pp. 369-377, 1962.

[6] W. Doyle, "On approximating Linear Array Factors", RAND Corp Mem RM-3530-PR, February 1963.

[7] M. I. Skolnik, "Chapter 6. Nonuniform Arrays" in R. E. Collin and F. Zucker (Eitors), Antenna Theory, Part I, New York, McGraw-Hill, 1969.

[8] R. F. Harrington, "Sidelobe reduction by non-uniform element spacing," IRE Transactions on Antennas and Propagation, 9, pp. 187-192, 1961

[9] Y. T. La, "A Study of Space-Tapered Arrays", IEEE Transactions on Antennas and Propagation, 14, 2, pp. 22-30, 1966.

[10] G. Toso, M. C. Vigana, P. Angeletti, "Null-Matching for the design of linear aperiodic arrays", IEEE International Symposium on Antennas and Propagation 2007, Honolulu Hi. USA, Jun. 10-15 2007.

[11] M. Vicente-Lozano, F. Ares-Pena, E. Moreno, "Pencil-beam pattern synthesis with a uniformly excited multi-ring planar antenna," IEEE Antennas and Propagation Magazine, Vol. 42, No. 6, pp. 70-74, December 2000, doi: 10.1109/74.894183

[12] C. H. Chen, S. S. Kuo, T. K. Wu, Density tapered transmit phased array, U.S. Pat. No. 6,404,404, Filed on 31 Jun. 200

[13] S. S. Kuo, G. P. Junker, T. K. Wu, C. H. Chen, "A density taper technique for low side lobe applications of hex array antennas", IEEE International Conference on Phased Array Systems and Technology, pp. 493-496, 2000

[14] T. M. Milligan, "Space-tapered circular (ring) array", IEEE Antennas and Propagation Magazine, Vol. 46, No. 3, pp. 70-73, October 2004.

[15] G. Toso, P. Angeletti, Method of designing and manufacturing an array antenna, European patent No: EP2090995, Filed on 18 Feb. 2008 and U.S. patent No US20090211079, Filed on 21 Feb. 2008

[16] M. C. Viganó, G. Toso, G. Caille, C. Mangenot, I E. Lager, "Sunflower Array Antenna with Adjustable Density Taper", International Journal of Antennas and Propagation, vol. 2009, Article ID 624035, 2009. doi:10.1155/2009/624035

[17] P. J. Bevelacqua, C. A. Balanis, "Geometry and weight optimization for minimizing sidelobes in wideband planar arrays", IEEE Transactions on Antennas and Propagation, Vol. 57, pp. 1285-1289, April. 2009.

[18] O. M. Bucci, M. D'Urso, T. Isernia, P. Angeletti, and G. Toso, "Deterministic synthesis of uniform amplitude sparse arrays via new density taper techniques", IEEE Transactions on Antennas and Propagation, Vol. 58, No. 6, pp. 1949-1958, June 2010.

[19] P. Angeletti, G. Toso, "Aperiodic Arrays for Space Applications: a combined Amplitude/Density Synthesis Approach", 3rd European Conference on Antennas and Propagation, EUCAP 2009, Berlin, Germany, 2009.

[20] O. M. Bucci, T. Isernia, A. F. Morabito, S. Perna, D. Pinchera, "Aperiodic arrays for space applications: An effective strategy for the overall design", 3rd European Conference on Antennas and Propagation, EUCAP 2009, Berlin, Germany, 2009.

[21] P. Angeletti, G. Toso, "Synthesis of Circular and Elliptical Sparse Arrays", Electronics Letters, Vol. 47, No. 5, pp. 304-305, March 2011

[22] O. M. Bucci, S. Perna, "A deterministic two dimensional density taper approach for fast design of uniform amplitude pencil beams arrays", IEEE Transactions on Antennas and Propagation, Vol. 59, No. 8, pp. 2852-2861, August 2011.

[23] W. N. Klimczak, Deterministic Thinned Aperture Phased Antenna Array, U.S. Pat. No. 4,797,682, Filed on 8 Jun. 1987

[24] O. M. Bucci, T. Isernia, A. F. Morabito, S. Perna, and D. Pinchera, "Density and element-size tapering for the design of arrays with a reduced number of control points and high efficiency", 4th European Conference on Antennas and Propagation, EUCAP 2010, Barcelona, Spain, 2010.

[25] O. M. Bucci, D. Pinchera, "A generalized hybrid approach for the synthesis of uniform amplitude pencil beam ring-arrays", IEEE Transactions on Antennas and Propagation, Vol. 60, No. 1, pp. 174-183, January 2012.

[26] O. M. Bucci, S. Perna, D. Pinchera, "Advances in the deterministic synthesis of uniform amplitude pencil beam concentric ring arrays", IEEE Transactions on Antennas and Propagation, Vol. 60, No. 7, pp. 3504-3509, July 2012.

[27] T. T. Taylor, "Design of Line Source Antennas for Narrow Beamwidth and Low Sidelobes", IEEE Transactions on Antennas and Propagation, Vol. 3, pp. 16-28, January 1955.

[28] T. T. Taylor, "Design of Circular Apertures for Narrow Beamwidth and Low Sidelobe", IRE Trans. on Antennas and Propagation, Vol. AP-8 pp. 17-22, 1960

[29] G. B. Arfken, H. J. Weber, Mathematical Methods for Physicists, 6th Edition, Elsevier, San Diego, 2005). ISBN 0-12-059876-0.

[30] E. Jahnke, F. Emde, Tables of Functions with Formulae and Curves, 4th Ed., Dover, N.Y., 1945

The invention claimed is:

1. A method of manufacturing an array antenna comprising:
   a design phase, comprising synthesizing an array layout of said array antenna and choosing or designing radiating elements to be arranged according to said array layout; and
   a phase of physically making said array antenna, comprising arranging said radiating elements according to said array layout;
   wherein said radiating elements are maximum efficiency elements, having uniform amplitude excitation;
   the method being characterized in that said design phase comprises the steps of:
   a. defining a continuous reference aperture;
   b. subdividing said continuous reference aperture into a plurality of elementary cells with assigned power levels;
   c. determining, within each said elementary cell, a position for at least one maximum efficiency radiating element;
   d. determining a size and an aperture field amplitude of each said maximum efficiency radiating element, such that a variation of a cumulative field distribution of the resulting array antenna aperture over each said elementary cell is substantially equal to a variation of a cumulative field distribution of said reference aperture over the same elementary cell, subject to size constraints.

2. A method according to claim 1, wherein:
   said array antenna is an aperiodic linear array antenna, comprising a plurality of maximum efficiency radiating elements arranged along a line;
   each said elementary cell, identified by index "k", is defined by a first boundary point $t_{k-1}$ and a second boundary point $t_k$;
   said cumulative field distributions are defined as $$I_{0,a}(x) = \int_{-\infty}^{x} i_{0,a}(\xi) d\xi,$$

wherein $I_{0,a}(x)$ is the cumulative field distribution function, X is a coordinate defining the position of a point of the linear array antenna, i is the aperture field, index "0" refers to the reference aperture and index "a" refers to the aperture of the array antenna.

3. A method according to claim 2, wherein said step b. comprises determining the boundary points of said elementary cells as:

$$\left\{ t_k : \frac{\int_{-\infty}^{t_k} i_0^2(x)dx}{\int_{-\infty}^{\infty} i_0^2(x)dx} = \frac{\sum_{n=1}^{k} p_n}{\sum_{n=1}^{N} p_n} ; k = 1 \div N \right\}$$

wherein $t_k$ is the boundary point identified by index k, i is the reference aperture field, index "0" refers to the reference aperture, $p_n$ is the power level assigned to the elementary cell identified by index "n" and N is the number of elementary cells.

4. A method according to claim 2, comprising arranging one maximum efficiency radiating element within each elementary cell and wherein said step c. comprises determining the position of the centre of said element.

5. A method according to claim 4, wherein said step d. comprises determining a linear size of each said maximum efficiency radiating element, measured along said line, as:

$$\Delta x_k = \frac{\frac{a_k^2}{p_k}}{\max\left(\frac{1}{\Delta x_k^{max}}, \frac{a_k^2}{p_k}\right)}$$

wherein $p_k$ is the power level assigned to the radiating element identified by index "k", $a_k \triangleq I_0(t_k) - I_s(t_{k-1}) = I_s(t_k) - I_s(t_{k-1}) =$ is a cumulative field distribution approximation, $a_k$ being ordinate values identified by index k, and $\Delta x_k^{max}$ is an upper limit for said size; the method further comprising determining the aperture field amplitude associated to said radiating element as:

$$b_k = \frac{a_k}{\Delta x_k}$$

wherein $b_k$ are aperture field amplitude coefficients.

6. A method according to claim 5, wherein $\Delta x_k^{max} \triangleq 2 \min((x_k-t_{k-1});(t_k-x_k))$, $\Delta x_k^{max}$ is an upper limit for said size $x_k$ being the position of the centre of the radiating element identified by index "k".

7. A method according to claim 5, comprising determining said upper limit $\Delta x_k^{max}$ for the size of each said radiating element on the basis of beam coverage requirements.

8. A method according to claim 4, wherein said step c. comprises determining the position $x_k$ of the centre of each maximum efficiency radiating element by inverting the following equation:

$$I_0(x_k) = \frac{I_0(t_k) + I_0(t_{k-1})}{2}.$$

9. A method according to claim 4, wherein said step c. comprises determining the position $x_k$ of the centre of each said maximum efficiency radiating element so that it coincides with the centre of the corresponding elementary cell.

10. A method according to claim 1, wherein:
said array antenna is an aperiodic two-dimensional array antenna, constituted by radiating elements arranged on concentric rings of incommensurable radii;
each said elementary cell, identified by index "k", is constituted by a concentric annulus comprised between an inner radius $\beta_{k-1}$ and an outer radius $\beta_k$;
said cumulative field distributions are defined as $$I_{0,a}(\rho) = \int_0^\rho i_{0,a}(\xi)\xi d\xi,$$

wherein $\rho$ is a radial coordinate, i is the aperture field, index "0" refers to the reference aperture and index "a" refers to the aperture of the array antenna.

11. A method according to claim 10, comprising arranging one annular maximum efficiency radiating element within each said annulus, and wherein said step c. comprises determining a mean radius for each said annular maximum efficiency radiating element.

12. A method according to claim 11, wherein said step b. comprises determining the inner and outer radii of said concentric annuli as:

$$\left\{ \rho_k : \frac{\int_0^{\rho_k} \rho i_0^2(\rho) d\rho}{\int_0^\infty \rho i_0^2(\rho) d\rho} = \frac{\sum_{n=1}^k p_n}{\sum_{n=1}^N p_n} ; k = 1 \div N \right\}$$

wherein i is the aperture field, index "0" refers to the reference aperture, index "0" refers to the reference aperture, $\rho_k$ is a radial boundary point of the elementary cell identified by index k, $p_n$ is the power level assigned to the annulus identified by index "n" and N is the number of said concentric annuli.

13. A method according to claim 11, wherein said step d. comprises determining a radial width of each said annular maximum efficiency radiating element as:

$$\Delta r_k = \frac{\frac{a_k^2}{p_k r_k}}{\max_k\left(\frac{1}{\Delta r_k^{max}} \frac{a_k^2}{p_k r_k}\right)}$$

wherein $p_k$ is the power level assigned to the annular maximum efficiency radiating element identified by index "k", $a_k \triangleq I_0(\rho_k)-I_0(\rho_{k-1})=I_a(\rho_k)-I_a(\rho_{k-1})$, is a cumulative field distribution approximation, $a_k$ being ordinate values identified by index k, $\rho_{k-1}$ and $\rho_k$ are respectively an inner radius and an outer radius of a concentric annulus constituting the elementary cell, $r_k$ is the mean radius of said annular maximum efficiency radiating element and $\Delta r_k^{max}$ is an upper limit for said radial width; the method further comprising determining the aperture field amplitude associated to said radiating element as:

$$b_k = \frac{a_k}{r_k \Delta r_k},$$

wherein $b_k$ are aperture field amplitude coefficients.

14. A method according to claim 13, wherein $$\Delta r_k^{max} = 2\min\{(r_k-\rho_{k-1}),(\rho_k-r^k)\},$$

$r_k$ being the central radius of the annular maximum efficiency radiating element arranged within annulus "k" and $\rho_{k-1}$ and $\rho_k$ being respectively an inner radius and an outer radius of a concentric annulus constituting the elementary cell.

15. A method according to claim 13, comprising determining said upper limit $\Delta r_k^{max}$ for the radial width of each said annular maximum efficiency radiating element on the basis of beam coverage requirements.

16. A method according to claim 11, wherein said step c. comprises determining the mean radius $r_k$ of each annular maximum efficiency radiating element by inverting the following equation:

$$I_0(r_k) = \frac{I_0(\rho_k) + I_0(\rho_{k-1})}{2}$$

wherein i is the aperture field, index "0" refers to the reference aperture, $\rho_{k-1}$ and $\rho_k$ are respectively an inner radius and an outer radius of a concentric annulus constituting the elementary cell.

17. A method according to claim 11, wherein said step c. comprises determining the mean radius $r_k$ of each said annular maximum efficiency radiating element so that it coincides with the mean radius of the corresponding annulus.

18. A method according to claim 11, comprising associating to each said annular maximum efficiency radiating element a power level proportional to its mean radius.

19. A method according to claim 10, comprising arranging, within each said annulus, a plurality of maximum efficiency radiating elements having a same area and a same excitation power level and whose centres are arranged on a ring concentric with said annulus, wherein said step c. comprises determining the radius of each said ring.

20. A method according to claim 19, wherein said step b. comprises determining the inner and outer radii of said concentric annuli as:

$$\left\{ \rho_k : \frac{\int_0^{\rho_k} i_0(\rho)d\rho}{\int_0^{\infty} i_0(\rho)d\rho} = \frac{\sum_{n=1}^{k} \sqrt{q_n}}{\sum_{n=1}^{N} \sqrt{q_n}}; k = 1 \div N \right\}$$

wherein i is the aperture field, index "0" refers to the reference aperture, index "0" refers to the reference aperture, $\rho_k$ is a radial boundary point of the elementary cell identified by index k, $q_k$ is the power level of each of the maximum efficiency radiating elements located within the annulus identified by index "k" and N is the number of said concentric annuli.

21. A method according to claim 19 wherein said step c. comprises determining the radius $r_k$ of each said ring by inverting the following equation:

$$I_0(r_k) = \frac{I_0(\rho_k) + I_0(\rho_{k-1})}{2}$$

wherein i is the aperture field, index "0" refers to the reference aperture, $\rho_{k-1}$ and $\rho_k$ are respectively an inner radius and an outer radius of a concentric annulus constituting the elementary cell.

22. A method according to claim 19, wherein said step c. comprises determining the radius $r_k$ of each said ring so that it coincides with the mean radius of the corresponding annulus.

23. A method according to claim 19, wherein said maximum efficiency radiating elements are chosen to have a radial width smaller than or equal to the radial width of the corresponding annulus.

24. A method according to claim 19, comprising determining an upper limit for said radial width of said maximum efficiency radiating elements on the basis of beam coverage requirements.

25. A method according to claim 19, wherein the number of maximum efficiency radiating elements arranged on each said ring is proportional to the ratio between the radius of said ring and the radial width of said maximum efficiency radiating elements.

26. A method according to claim 19, further comprising arranging a maximum efficiency radiating element at the centre of the antenna.

* * * * *

UNITED STATES PATENT AND TRADEMARK OFFICE
CERTIFICATE OF CORRECTION

PATENT NO. : 10,431,900 B2  
APPLICATION NO. : 14/761162  
DATED : October 1, 2019  
INVENTOR(S) : Angeletti et al.

Page 1 of 1

It is certified that error appears in the above-identified patent and that said Letters Patent is hereby corrected as shown below:

In the Claims

Column 31,  
Line 30, should appear as follows:  
"an inner radius $\rho_{k-1}$ and an outer radius $\rho_k$;"

Column 32,  
Line 27, the equation should appear as follows:  
"$\Delta r_k^{max} = 2\min\{(r_k - \rho_{k-1}),(\rho_k - r_k)\}$,"

Signed and Sealed this  
Seventeenth Day of March, 2020

Andrei Iancu  
*Director of the United States Patent and Trademark Office*